(12) United States Patent
Kitazato

(10) Patent No.: US 10,264,328 B2
(45) Date of Patent: Apr. 16, 2019

(54) RECEIVING DEVICE, RECEIVING METHOD, TRANSMITTING DEVICE, AND TRANSMITTING METHOD

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/917,209

(22) PCT Filed: Nov. 19, 2014

(86) PCT No.: PCT/JP2014/005823
§ 371 (c)(1),
(2) Date: Mar. 7, 2016

(87) PCT Pub. No.: WO2015/079658
PCT Pub. Date: Jun. 4, 2015

(65) Prior Publication Data
US 2016/0198241 A1    Jul. 7, 2016

(30) Foreign Application Priority Data

Nov. 27, 2013  (JP) ................................. 2013-244950

(51) Int. Cl.
*H04N 21/81* (2011.01)
*H04N 21/434* (2011.01)
(Continued)

(52) U.S. Cl.
CPC ....... *H04N 21/814* (2013.01); *H04N 21/2362* (2013.01); *H04N 21/4345* (2013.01);
(Continued)

(58) Field of Classification Search
CPC ............. H04N 21/814; H04N 21/4882; H04N 21/235; H04N 21/25841; H04N 21/6543;
(Continued)

(56) References Cited

U.S. PATENT DOCUMENTS

| | | | |
|---|---|---|---|
| 5,818,440 A * | 10/1998 | Allibhoy | .............. H04N 7/0888 |
| | | | 348/E7.037 |
| 2003/0069002 A1* | 4/2003 | Hunter | .................... G09F 27/00 |
| | | | 455/404.2 |

(Continued)

FOREIGN PATENT DOCUMENTS

| JP | 2012-156712 A | 8/2012 |
|---|---|---|
| JP | 2014-11715 A | 1/2014 |
| RU | 130 110 U1 | 7/2013 |

OTHER PUBLICATIONS

"ATSC Mobile DTV Standard: A/153 Part 3, Service Multiplex and Transport Subsystem Characteristics", Advanced Television Systems Committee, Total 80 Pages, (Oct. 29, 2013), XP55180150.
(Continued)

*Primary Examiner* — Nathan J Flynn
*Assistant Examiner* — Cynthia M Fogg
(74) *Attorney, Agent, or Firm* — Oblon, McClelland, Maier & Neustadt, L.L.P.

(57) ABSTRACT

To provide more advanced emergency notification service. An emergency notification control unit controls operations of respective units corresponding to an emergency notification service based on an emergency notification control signal transmitted through a broadcast wave of digital broadcasting using an IP transmission scheme, and thus a more advanced emergency notification service can be provided in digital broadcasting using an IP transmission scheme. The present technology can be applied to, for example, a broadcasting system including a transmitter and a receiver.

20 Claims, 67 Drawing Sheets

(51) Int. Cl.
*H04N 21/488* (2011.01)
*H04N 21/2362* (2011.01)
*H04N 21/61* (2011.01)
*H04N 21/643* (2011.01)

(52) U.S. Cl.
CPC ....... *H04N 21/488* (2013.01); *H04N 21/6112* (2013.01); *H04N 21/6125* (2013.01); *H04N 21/64322* (2013.01)

(58) Field of Classification Search
CPC ......... H04N 21/6405; H04N 21/23614; H04N 21/4524; H04N 21/488; H04N 21/2362; H04N 21/4345; H04N 21/6112; H04N 21/6125; H04N 21/64322; H04N 21/8545
USPC ...................................................... 725/32–33
See application file for complete search history.

(56) References Cited

U.S. PATENT DOCUMENTS

| | | | | |
|---|---|---|---|---|
| 2006/0005219 | A1* | 1/2006 | Owens | G08B 27/008 725/33 |
| 2007/0136743 | A1* | 6/2007 | Hasek | G08B 25/085 725/33 |
| 2010/0289943 | A1* | 11/2010 | Tokoro | H04H 40/27 348/425.2 |
| 2011/0212700 | A1* | 9/2011 | Petite | H04W 4/12 455/404.1 |
| 2012/0030703 | A1* | 2/2012 | Strong | H04H 20/59 725/33 |
| 2012/0159533 | A1 | 6/2012 | Reddy et al. | |
| 2013/0242847 | A1 | 9/2013 | Oh et al. | |
| 2013/0247094 | A1* | 9/2013 | Hardin | H04N 21/2385 725/33 |
| 2014/0150015 | A1* | 5/2014 | Matsumura | H04H 20/59 725/33 |
| 2015/0036586 | A1 | 2/2015 | Oh et al. | |
| 2016/0192033 | A1* | 6/2016 | Kitahara | H04N 21/41415 725/33 |
| 2016/0360014 | A1* | 12/2016 | Kwak | H04L 65/80 |

OTHER PUBLICATIONS

"ATSC Mobile DTV Standard: A/153 Part 1, ATSC Mobile DTV System (A/153 Part 1:2013)" Advanced Television Systems Committee, Total 20 Pages, (Mar. 11, 2013), XP055180233.

"ATSC Mobile DTV Standard: A/153 Part 10, Mobile Emergency Alert System (A/153 Part 10:2013)", Advanced Television Systems Committee, Total 20 Pages, (Mar. 11, 2013), XP055178642.

"An Overview of Research at NHK STRL on Technologies for Fusing Broadcasting and Communications", Broadcast Technology, No. 43, Total 4 Pages, (Mar. 31, 2011), XP55180045.

International Search Report dated Apr. 17, 2015 in PCT/JP14/005823 Filed Nov. 19, 2014.

Office Action dated Jul. 2, 2018 in Russian Patent Application No. 2016119632, 9 pages.

* cited by examiner

FIG. 1

| AV (HEVC, AAC, etc.), SubTitle, RealTimeEvent | Interactive, Meta, etc. | HLS (ESG) | MLS (SCS) | LLS |
| --- | --- | --- | --- | --- |
| RTP | fMP4 | | | |
| | FLUTE/ALC | | | |
| UDP | | | | |
| IP | | | | |
| GSE | | | | |
| Phy | | | | |

FIG. 6

| | | | | |
|---|---|---|---|---|
| Video/Audio | fMP4 Including Video or Audio | General File Data (ESG/Application/NRT Content) | NTP | MLS |
| RTP | LCT | LCT | | |
| UDP | UDP | UDP | UDP | UDP |
| IP | IP | IP | IP | IP |
| GSE | GSE | GSE | GSE | GSE |

FIG. 9

NIT

| | No. of Bits | Identifier |
|---|---|---|
| network_information_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved_future_use | 2 | uimsbf |
|   version_number | 5 | uimsbf |
|   current_next_indicator | 1 | |
|   section_number | 8 | uimsbf |
|   last_section_number | 8 | uimsbf |
|   reserved_future_use | 4 | bslbf |
|   network_descriptor_length | 12 | bslbf |
|   for(i=0;i<N;i++) { | | |
|     descriptor() | | uimsbf |
|   } | | |
|   reserved_future_use | 4 | bslbf |
|   transport_stream_loop_length | 12 | uimsbf |
|   for(i=0;i<N;i++) { | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<M;j++) { | | |
|       descriptor() | | |
|     } | | |
|   } | | |
|   CRC_32 | 32 | rpchof |
| } | | |

FIG. 10

NIT Descriptors Usage

| Descriptors | Network loop | TransportStream loop |
|---|---|---|
| Name_descriptor | ○ | ○ |
| Service_list_decriptor | — | ◎ |
| ATSC3_delivery_system_descriptor | — | ◎ |
| Transport_stream_protocol_descriptor | — | ◎ |
| ESG_bootstrap_descriptor | — | ○ |

FIG. 11

AMT

| | No. of Bits | Identifier |
|---|---|---|
| address_map_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved_future_use | 2 | uimsbf |
|   version_number | 5 | uimsbf |
|   current_next_indicator | 1 | |
|   section_number | 8 | uimsbf |
|   last_section_number | 8 | uimsbf |
|   reserved_future_use | 6 | bslbf |
|   number_of_services | 10 | uimsbf |
|   for(i=0;i<N;i++) { | | |
|     service_id | 16 | uimsbf |
|     IP_version_flag | 1 | bslbf |
|     reserved_future_use | 7 | bslbf |
|     if(IP_version_flag==0) { | | |
|       source_IP_address_for_v4 | 32 | uimsbf |
|       destination_IP_address_for_v4 | 32 | uimsbf |
|     } | | |
|     else { | | |
|       source_IP_address_for_v6 | 128 | uimsbf |
|       destination_IP_address_for_v6 | 128 | uimsbf |
|     } | | |
|   } | | |
|   CRC32 | 32 | rpchof |
| } | | |

FIG. 12

SAT

| | No. of Bits | Identifier |
|---|---|---|
| service_association_section() { | | |
| table_id | 8 | uimsbf |
| section_syntax_indicator | 1 | bslbf |
| reserved_future_use | 1 | bslbf |
| reserved | 2 | bslbf |
| section_length | 12 | uimsbf |
| transport_stream_id | 16 | uimsbf |
| reserved_future_use | 2 | bslbf |
| version_number | 5 | uimsbf |
| current_next_indicator | 1 | bslbf |
| section_number | 8 | uimsbf |
| last_section_number | 8 | uimsbf |
| for (i=0; I<N; i++) { | | |
| service_id | 16 | uimsbf |
| } | | |
| CRC32 | 32 | rpchof |
| } | | |

FIG. 13

EAT

| DATA STRUCTURE | NUMBER OF BITS | BIT STRING NOTATION |
|---|---|---|
| emergency_alert_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   EA_category | 16 | uimsbf |
|   reserved_future_use | 2 | uimsbf |
|   version_number | 5 | uimsbf |
|   current_next_indicator | 1 | "1" |
|   section_number | 8 | uimsbf |
|   last_section_number | 8 | uimsbf |
|   automatic_tuning_flag | 1 | bslbf |
|   num_EAS_messages | 7 | uimsbf |
|   if(automatic_tuning_flag==1) { | | |
|     network_id | 16 | uimsbf |
|     transport_stream_id | 16 | uimsbf |
|     service_id | 16 | uimsbf |
|   } | | |
|   for (n-0; 0<num_EAS_messages;n++) { | | |
|     EAS_message_id | 32 | uimsbf |
|     EAS_priority | 8 | |
|     EAS_enforcement_flag | 1 | bslbf |
|     EAS_IP_version_flag | 1 | bslbf |
|     EAS_message_transfer_type | 3 | uimsbf |
|     EAS_message_encoding_type | 3 | uimsbf |
|     if(EAS_message_transfer_type==0x02) { | | |
|       reserved | 4 | bslbf |
|       EAS_message_length/*N*/ | 12 | uimsbf |
|       EAS_message_bytes() | 8×N | uimsbf |
|     } | 8 | uimsbf |
|     else if(EAS_message_transfer_type==0x03) { | 1 | bslbf |
|       IP_address | 32or128 | uimsbf |
|       UDP_port_num | 16 | uimsbf |
|     } | | |
|     else if(EAS_message_transfer_type==0x04) { | | |
|       EAS_application_indentifier | 32 | uimsbf |
|     } | | |
|     else if(EAS_message_transfer_type==0x05) { | | |
|       EAS_shared_service_type | 8 | |
|       EAS_shared_service_id | 16 | uimsbf |
|     } | | |
|     EAS_NRT_service_id | 16 | uimsbf |
|   } | | |
| } | | |

FIG. 14

| Field | Description |
|---|---|
| EA_category | REPRESENT CATEGORY CODE OF Emergency Alert. USED FOR FILTERING. |
| Automatic_tuning_flag | REPRESENT WHETHER SERVICE TO BE TUNED TO IS DESIGNATED WHEN COMPULSORY EMERGENCY ACTIVATION FLAG IS SET TO ON. IN CASE OF ON, SERVICE DESIGNATED BELOW IS TUNED TO. |
| num_EAS_messages | REPRESENT NUMBER OF EAS MESSAGES INCLUDED IN THIS TABLE. |
| network_id/transport_stream_id/service_id | REPRESENT SERVICE TO BE TUNED TO WHEN Automatic_tuning_flag=1. |
| EAS_message_id | REPRESENT IDENTIFIER OF EAS MESSAGE. |
| EAS_priority | REPRESENT PRIORITY OF EAS MESSAGE. |
| EAS_enforcement_flag | REPRESENT EAS MESSAGE TO BE DISPLAYED WHEN COMPULSORY ACTIVATION FLAG IS SET TO ON. |
| EAS_IP_version_flag | REPRESENT IP VERSION OF IP STREAM WHEN EAS_message_transport_type=3 (EAS MESSAGE DEDICATED IP STREAM TRANSMISSION). 0: IPv4, 1: IPv6 |
| EAS_message_transfer_type | REPRESENT TYPE OF TRANSMISSION SCHEME OF EAS MESSAGE.<br>1: NRT PORTAL SERVICE<br>2: TRANSMISSION OF EAS MESSAGE INCLUDING CAP INFORMATION<br>3: TRANSMISSION OF CAP INFORMATION THROUGH STREAM OTHER THAN EAS<br>4: TRANSMISSION AS APPLICATION THAT IS IN TANDEM WITH PROGRAM<br>5: TRANSMISSION THROUGH ANOTHER DESIGNATED SHARED COMPONENT SERVICE |
| EAS_message_encoding_type | REPRESENT ENCODING SCHEME OF EAS MESSAGE. |
| EAS_message_length | REPRESENT EAS MESSAGE LENGTH. |
| EAS_message_bytes() | REPRESENT NUMBER OF BYTES OF EAS MESSAGE. |
| EAS_application_identifier | REPRESENT IDENTIFIER OF APPLICATION INCLUDING EAS MESSAGE MAIN BODY. |
| EAS_shared_service_type | REPRESENT SIGNAL CONFIGURATION TYPE WHEN EAS MESSAGE IS TRANSMITTED THROUGH EAS_shared_service.<br>1: ONLY Audio, 2: ONLY Video, 3: Video+Audio |
| EAS_shared_service_id | REPRESENT SERVICE ID WHEN EAS MESSAGE IS TRANSMITTED THROUGH EITHER OR BOTH OF Audio AND Video. |
| EAS_NRT_service_id | REPRESENT SERVICE ID OF NRT SERVICE (NRT PORTAL SERVICE) INCLUDING EAS MESSAGE MAIN BODY OR DETAILED INFORMATION. |

FIG. 17

```
<?xml version = "1.0" encoding = "UTF-8" ?>
<alert xmlns = "urn:oasis:names:tc:emergency:cap:1.2" >
    <identifier>43b080713727</identifier>
    <sender>hsas@dhs.gov</sender>
    <sent>2003-04-02T14:39:01-05:00</sent>
    <status>Actual</status>
    <msgType>Alert</msgType>
    <scope>Public</scope>
    <info>
        <category>Security</category>
        <event>Homeland Security Advisory System Update</event>
        <urgency>Immediate</urgency>
        <severity>Severe</severity>
        <certainty>Likely</certainty>
        <senderName>U.S. Government, Department of Homeland Security</senderName>
        <headline>Homeland Security Sets Code ORANGE</headline>
        <description>The Department of Homeland Security has elevated the Homeland Security Advisory System threat level to ORANGE / High in response to intelligence which may indicate a heightened threat of terrorism.</description>
        <instruction> A High Condition is declared when there is a high risk of terrorist attacks. In addition to the Protective Measures taken in the previous Threat Conditions, Federal departments and agencies should consider agency-specific Protective Measures in accordance with their existing plans.</instruction>
        <web>http://www.dhs.gov/dhspublic/display?theme=29</web>
        <parameter>
            <valueName>HSAS</valueName>
            <value>ORANGE</value>
        </parameter>
        <resource>
            <resourceDesc>Image file (GIF)</resourceDesc>
            <mimeType>image/gif</mimeType>
            <uri>http://www.dhs.gov/dhspublic/getAdvisoryImage</uri>
        </resource>
        <area>
            <areaDesc>U.S. nationwide and interests worldwide</areaDesc>
        </area>
    </info>
</alert>
```

FIG. 18

SMT

| | No. of Bits | Identifier |
|---|---|---|
| service_map_section() { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved_future_use | 2 | uimsbf |
|     version_number | 5 | uimsbf |
|     current_next_indicator | 1 | |
|     section_number | 8 | uimsbf |
|     last_section_number | 8 | uimsbf |
|     service_category | 8 | uimsbf |
|     reserved_future_use | 4 | bslbf |
|     service_descriptor_length | 12 | bslbf |
|     for(i=0;i<N;i++) { | | |
|         descriptor() | | uimsbf |
|     } | | |
|     for(i=0;i<N;i++) { | | |
|         component_tag | 8 | uimsbf |
|         base_UDP_port_number | 16 | uimsbf |
|         reserved | 4 | bslbf |
|         component_info_length | 12 | uimsbf |
|         for(j=0;j<M;j++) { | | |
|             descriptor() | | |
|         } | | |
|     } | | |
|     CRC32 | 32 | rpchof |
| } | | |

FIG. 19

SMT Descriptors Usage

| Descriptors | Service loop | Component loop |
|---|---|---|
| Name_descriptor | ○ | |
| Protocol_version_descriptor | ○ for NRT | |
| NRT_service_descriptor | ○ for NRT | |
| Capabilities_descriptor | ○ for NRT | |
| Icon_descriptor | ○ for NRT | |
| ISO-639_language_descriptor | ○ for NRT | |
| Receiver_targeting_descriptor | ○ | |
| Adjunct_service_descriptor | ○ | |
| Genre_descriptor | — | ◎ |
| Component_descriptor | | |

FIG. 25

| EA_priority | REPRESENT EMERGENCY DEGREE. 0 (NORMAL) TO 3 (HIGHEST EMERGENCY DEGREE) IS DESIGNATED. |
|---|---|
| EA_scope | REPRESENT TARGET AREA. 0: ONLY CORRESPONDING AREA, 1: OTHER AREAS, 2: WIDE AREA, 3: GLOBAL |
| Area_code | CODES ARE DESIGNATED IN UNITS OF CERTAIN AREAS WHEN SMALL AREAS ARE DESIGNATED IN SERVICE AREA OF BROADCASTING STATION. |
| Category_code | REPRESENT CATEGORY OF EMERGENCY INFORMATION. 0: DISASTER INFORMATION, 1: TRAFFIC INFORMATION, 2: WEATHER INFORMATION, 3: SCHOOL BUS |

FIG. 47

| Data Field Name | Data Type |
|---|---|
| Service_Guide_Delivery_Unit{ | |
|   Unit_Header{ | |
|     extension_offset | uimsbf32 |
|     reserved | 16bits |
|     n_o_service_guide_fragments | uimsbf24 |
|     for(i=0;i<n_o_service_guide_fragments;i++) { | |
|       fragmentTransportID[i] | uimsbf32 |
|       fragmentVersion[i] | uimsbf32 |
|       offset[i] | uimsbf32 |
|     } | |
|   } | |
|   Unit_Payload{ | |
|     for(i=0;i<n_o_service_guide_fragments;i++) { | |
|       fragmentEncoding[i] | uimsbf8 |
|       if(fragmentEncoding[i]=0) { | |
|         fragmentType | uimsbf8 |
|         XMLFragment | bytestring |
|       } | |
|       else if(fragmentEncoding[i]=1) { | |
|         validFrom | uimsbf32 |
|         validTo | uimsbf32 |
|         fragmentID | bytestring |
|         SDPFragment | bytestring |
|       } | |
|     } | |
|   } | |
|   if(extension_offset>0) { | |
|     extension_type | uimsbf8 |
|     next_extension_offset | uimsbf32 |
|     extension_data | bytestring |
|   } | |
| } | |

FIG. 48

SCT

| ELEMENT AND ATTRIBUTE | | | | | NUMBER OF APPEARANCES | DEFINITION |
|---|---|---|---|---|---|---|
| sct | | | | | 1 | SERVICE CONFIGURATION TABLE |
| | @networkId | | | | 1 | NETWORK IDENTIFIER<br>BROADCASTING STATION IDENTIFIER OF Physical Channel UNIT |
| | @name | | | | 0..1 | BROADCASTING STATION NAME OF Physical Channel UNIT |
| | BBPStream | | | | 1..n | BBP Stream |
| | | @BBPstreamId | | | 1 | BBP STREAM IDENTIFIER |
| | | @payloadType | | | 1 | BBP PAYLOAD TYPE "ipv4," "ipv6," AND "ts" |
| | | @name | | | 0..1 | BBP Stream NAME |
| | | ESGBootstrap | | | 0..1 | ACCESS INFORMATION TO ESG |
| | | | @sourceIPAddress | | 1 | SOURCE IP ADDRESS FOR TRANSMITTING ESG |
| | | | @destinationIPAddress | | 1 | DESTINATION IP ADDRESS TO WHICH ESG IS TRANSMITTED |
| | | | @portNum | | 1 | PORT NUMBER FOR TRANSMITTING ESG |
| | | | @tsi | | 1 | FLUTE Session TSI FOR TRANSMITTING ESG |
| | | Service | | | 1 | SERVICE |
| | | | @serviceId | | 1 | SERVICE IDENTIFIER |
| | | | @serviceType | | 1 | SERVICE TYPE "tv", "audio", "data", "nrt", "esg", "adjunct-nrt", AND "adjunct-shared" |
| | | | SCSBootstrap | | 1 | ACCESS INFORMATION TO SERVICE CHANNEL |
| | | | | @sourceIPAddress | 1 | SOURCE IP ADDRESS FOR TRANSMITTING SERVICE |
| | | | | @destinationIPAddress | 1 | DESTINATION IP ADDRESS TO WHICH SERVICE IS TRANSMITTED |
| | | | | @portNum | 1 | PORT NUMBER FOR TRANSMITTING SCS |
| | | | | @tsi | 1 | FLUTE Session TSI FOR TRANSMITTING SCS |

FIG. 49

SAT

| ELEMENT AND ATTRIBUTE | | | NUMBER OF APPEARANCES | DEFINITION |
|---|---|---|---|---|
| sat | | | 1 | SERVICE ASSOCIATION TABLE |
| | service | | 0..n | SERVICE THAT IS ON AIR |
| | | @service_id | 1 | SERVICE IDENTIFIER THAT IS ON AIR |

FIG. 50

EAT

| ELEMENT AND ATTRIBUTE | | | NUMBER OF APPEARANCES | DEFINITION |
|---|---|---|---|---|
| Eat | | | 1 | EMERGENCY NOTIFICATION INFORMATION TABLE |
| | AutomaticTuningService | | 0..1 | AUTOMATIC TUNING SERVICE AT TIME OF Wake-up |
| | | @networkId | 0..1 | NETWORK IDENTIFIER OF AUTOMATIC TUNING SERVICE |
| | | @bbpStreamId | 0..1 | BBP STREAM IDENTIFIER OF AUTOMATIC TUNING SERVICE |
| | | @serviceId | 1 | SERVICE IDENTIFIER OF AUTOMATIC TUNING SERVICE |
| | EAMessage | | 0..n | EMERGENCY NOTIFICATION INFORMATION MESSAGE |
| | | @eaMessageId | 1 | EMERGENCY NOTIFICATION INFORMATION IDENTIFIER |
| | | @eaPriority | 1 | PRIORITY OF EMERGENCY NOTIFICATION INFORMATION |
| | | EAMessageData | 0..1 | SUBTITLE INFORMATION OF EMERGENCY NOTIFICATION INFORMATION |
| | | EAApplication | 0..1 | EMERGENCY NOTIFICATION APPLICATION (App) |
| | | | @applicationId | 1 | APPLICATION IDENTIFIER |
| | | EAService | 0..n | EMERGENCY NOTIFICATION NRT SERVICE |
| | | | @serviceId | 1 | SERVICE IDENTIFIER |
| | | | @serviceType | 1 | SERVICE TYPE "nrt" AND "adjunct_shared" |
| | | EAWww | 0..n | EMERGENCY INFORMATION SITE |
| | | | @uri | 1 | URL OF EMERGENCY INFORMATION SITE |

FIG. 51

RRT

| ELEMENT AND ATTRIBUTE | | | | | | | NUMBER OF APPEARANCES | DEFINITION |
|---|---|---|---|---|---|---|---|---|
| rrt | | | | | | | 1 | |
| | @rating_region | | | | | | 1 | RATING REGION |
| | @name | | | | | | 0..1 | RATING REGION NAME |
| | dimension | | | | | | 0..n | |
| | | @name | | | | | 0..1 | |
| | | @graduated_scale | | | | | 1 | |
| | | rating_value | | | | | 1..m | |
| | | | @abbrev_rating_value | | | | 1 | |
| | | | @rating_value | | | | 1 | |

FIG. 52

```
v=0
o=user123 2890844526 2890842807 IN IP4 43.123.123.123
s=RTP Session Example
c=IN IP4 224.0.0.10
a=service:100
a=adjunct_service:101
m=video 8000 RTP/AVP 96
a=rtpmap:96 H264/90000
m=audio 7000 RTP/AVP 99
```

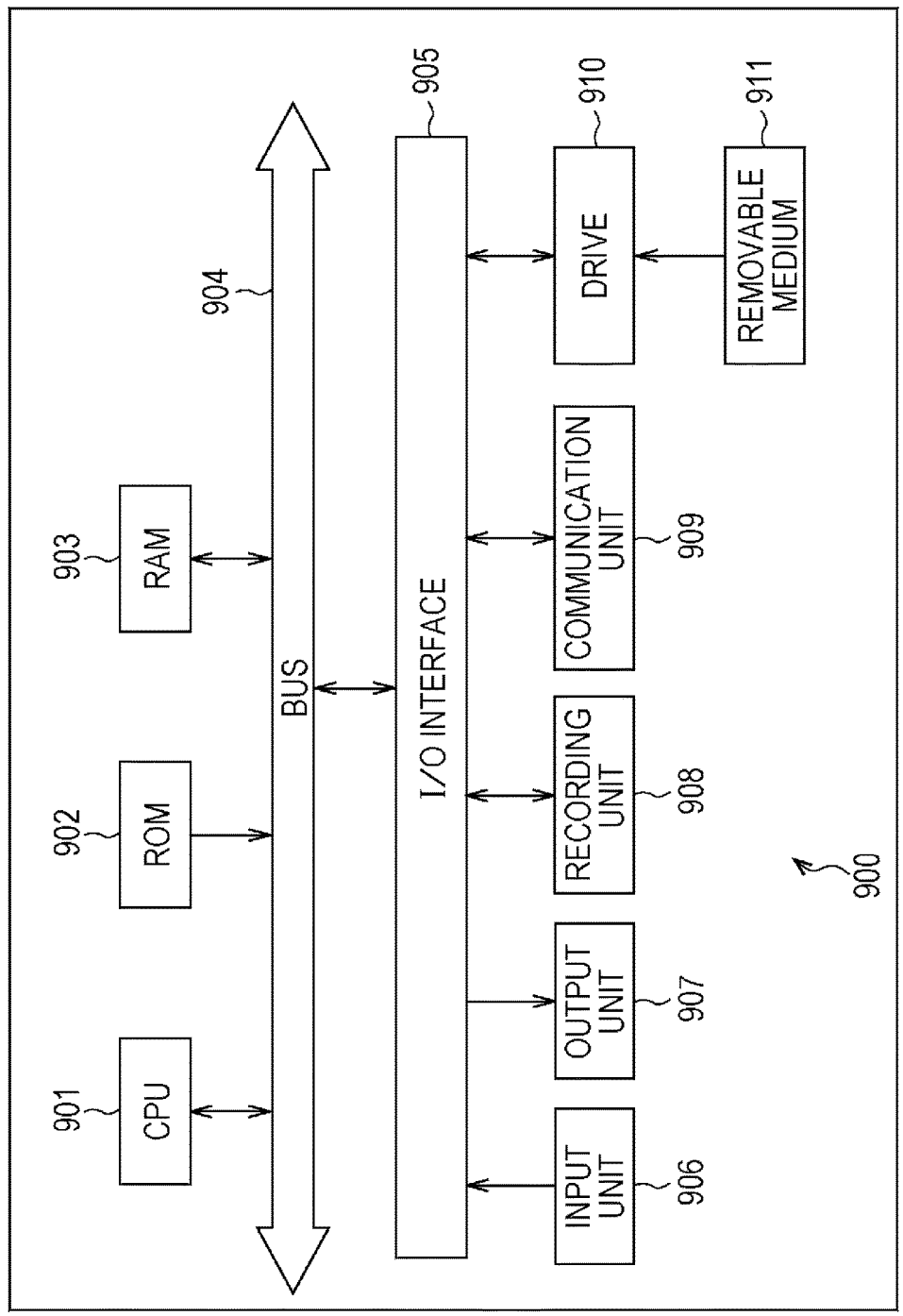

RECEIVING DEVICE, RECEIVING METHOD, TRANSMITTING DEVICE, AND TRANSMITTING METHOD

TECHNICAL FIELD

The present technology relates to a receiving device, a receiving method, a transmitting device, and a transmitting method, and more particularly, a receiving device, a receiving method, a transmitting device, and a transmitting method which are capable of providing an advanced emergency notification service.

CROSS REFERENCE TO RELATED APPLICATIONS

This application claims the benefit of Japanese Priority Patent Application JP 2013-244950 filed on Nov. 27, 2013, the entire contents of which are incorporated herein by reference.

BACKGROUND ART

Currently, in digital broadcasting standards of countries, a moving picture experts group phase 2—transport stream (MPEG2-TS) scheme has been employed as a transmission form (for example, see Patent Literature 1). In the future, an Internet protocol (IP) transmission scheme in which IP packets are used for digital broadcasting is expected to be introduced to provide a more advanced service.

Further, in Japan, an emergency control signal and an emergency broadcasting service are specified in a digital broadcasting standard. In this standard, even in a state in which power is turned off, a receiver such as a television receiver is specified to be powered on according to the control signal and then automatically tuned to an emergency broadcasting service.

Meanwhile, in the U.S., an emergency notification system called an emergency alerting system (EAS) has been established, and emergency information of various levels from a matter of high priority given from the president to a local notification matter are notified by various media. Here, a common alerting protocol (CAP) scheme of an extensible markup language (XML) format has been used as a format of an emergency notification message.

As a medium at the end of such an EAS, broadcasting is also positioned, and in digital broadcasting for fixed receivers such as television receivers, particularly, a control signal used in Japan is not in operation, but a subtitle superimposed on video is displayed. Meanwhile, in advanced television systems committee-mobile/handheld (ATSC M/H) that is a broadcasting standard for mobile receivers, a scheme of transmitting an emergency notification control signal and CAP information through a broadcast wave without change is specified.

CITATION LIST

Patent Literature

PTL 1: JP 2012-156712 A

SUMMARY OF INVENTION

Technical Problem

Meanwhile, as the IP transmission scheme is introduced as a next generation broadcasting system, it is expected to use various operation forms and provide various services, but a technical scheme for providing an emergency notification service has not been established.

The present technology was made in light of the foregoing, and it is desirable to provide a more advanced emergency notification service in digital broadcasting in which the IP transmission scheme is introduced.

Solution to Problem

A receiving device according to an embodiment of the present technology includes: circuitry configured to receive a digital broadcast signal including an Internet protocol (IP) transport stream; and control operations of modules corresponding to an emergency notification service based on emergency notification control information transmitted through the digital broadcast signal.

The circuitry may be configured to provide a notification of emergency information using at least one of video and a sound.

The emergency notification control information may include information related to an emergency notification application, and the circuitry may be configured to acquire the application based on the emergency notification control information, and execute the application while AV content is output for display to a user.

The emergency notification control information may include identification information of the application, and the circuitry may be configured to acquire the application based on the identification information of the application and application control information for controlling the application.

The emergency notification control information may include information related to an emergency notification component, and the circuitry may be configured to acquire the emergency notification component of the at least one of the video and the sound based on the emergency notification control information, and switch the at least one of the video and the sound of the AV content.

The emergency notification component may be shared by a plurality of services.

The emergency notification control information may be filtered according to a certain filtering condition that is set in advance.

The emergency notification control information may be filtered according to an emergency degree.

The emergency notification control information may be filtered according to a target area.

The emergency notification control information may be filtered in units of certain areas.

The emergency notification control information may be filtered according to a type.

Compulsory emergency activation information may be transmittable through the digital broadcast signal, and when the receiving device is in a sleep state and the compulsory emergency activation information is detected, the receiving device may be powered on.

The emergency notification control information may be transmitted in an XML format.

The emergency notification control information may be transmitted in a section format.

The emergency notification control information may be used in a first layer that is higher than an IP layer of a protocol used to transmit the digital broadcast signal.

The digital broadcast signal may be used in the first layer, and used to transmit tuning control information, and the tuning control information may include at least network identification information, stream identification information, and service identification information.

The digital broadcast signal may be used in a second layer that is higher than the IP layer, and used to transmit component control information including at least information related to a component configuring a certain service.

The receiving device according to the first aspect of the present technology may be an independent device or may be an internal block configuring a single device.

The receiving method according to the first aspect of the present technology may be a receiving method corresponding to the receiving device according to the first aspect of the present technology.

In the receiving device and the receiving method according to the first aspect of the present technology, a digital broadcast signal including an IP transport stream is received by circuitry, operations of modules corresponding to the emergency notification service are controlled by the circuitry based on emergency notification control information transmitted through the digital broadcast signal.

A transmitting device according to a second aspect of the present technology includes circuitry configured to acquire emergency notification control information; and transmit the emergency notification control information through a digital broadcast signal including an IP transport stream.

The transmitting device according to the second aspect of the present technology may be an independent device or may be an internal block configuring a single device.

A transmitting method according to the second aspect of the present technology is a transmitting method corresponding to the transmitting device according to the second aspect of the present technology.

In the transmitting device and the transmitting method according to the second aspect of the present technology, emergency notification control information is acquired by circuitry, and the emergency notification control information is transmitted by the circuitry through a digital broadcast signal including an IP transport stream.

Advantageous Effects of Invention

According to the first and second aspects of the present technology, it is possible to provide a more advanced emergency notification service.

The effect set forth herein is not necessarily limited and may include any effect set forth in the present disclosure.

BRIEF DESCRIPTION OF DRAWINGS

FIG. 1 is a diagram illustrating a protocol stack in an IP transmission scheme of a section format.

FIG. 6 is a diagram illustrating a configuration of SCS in an IP transmission scheme of a section format.

FIG. 9 is a diagram illustrating syntax of an NIT.

FIG. 10 is a diagram illustrating an exemplary descriptor arranged in a loop of an NIT.

FIG. 11 is a diagram illustrating syntax of an AMT.

FIG. 12 is a diagram illustrating syntax of an SAT.

FIG. 13 is a diagram illustrating syntax of an EAT.

FIG. 14 is a diagram illustrating configuration information of an EAT.

FIG. 17 is a diagram illustrating an exemplary description of CAP information.

FIG. 18 is a diagram illustrating syntax of an SMT.

FIG. 19 is a diagram illustrating an exemplary descriptor arranged in a loop of an SMT.

FIG. 25 is a diagram illustrating configuration information of EA_category.

FIG. 47 is a diagram for describing a structure of an SGDU.

FIG. 48 is a diagram illustrating syntax of an SCT.

FIG. 49 is a diagram illustrating syntax of an SAT.

FIG. 50 is a diagram illustrating syntax of an EAT.

FIG. 51 is a diagram illustrating syntax of an RRT.

FIG. 52 is a diagram illustrating an exemplary description of an SDP.

FIG. 67 is a diagram illustrating an exemplary configuration of a computer.

DESCRIPTION OF EMBODIMENTS

Figure 2:
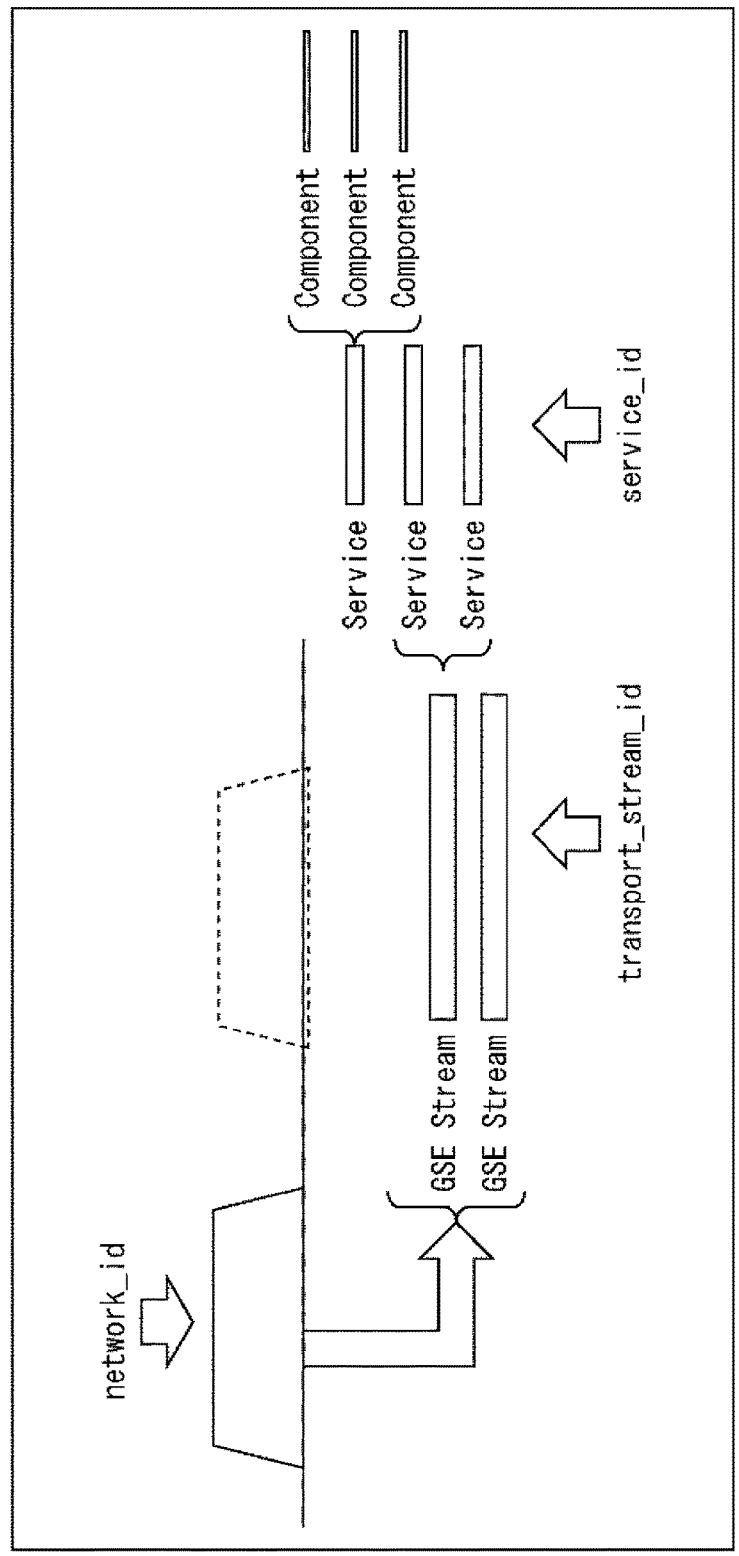
FIG. 2 is a diagram illustrating an ID system of an IP transmission scheme of a section format.

Hereinafter, exemplary embodiments of the present technology will be described with reference to the appended drawings. Here, the description will proceed in the following order.

1. Digital Broadcasting According to IP Transmission Scheme of Section Format
  (1) Overview of IP transmission scheme of section format
  (2) Signaling information
  (2-1) Detailed structure of LLS (NIT, AMT, SAT, and EAT)
  (2-2) Detailed structure of SCS (SMT)
  (3) Configuration of broadcasting system
  (4) Concrete operation example
  (4-1) NRT portal service transmission
  (4-2) EAS message transmission
  (4-3) Application transmission
  (4-4) Shared component service transmission
  (5) Content of concrete process executed in each device 2. Digital Broadcasting According to IP Transmission Scheme of XML Format
  (1) Overview of IP transmission scheme of XML format
  (2) Signaling information
  (2-1) Detailed structure of LLS (SCT, SAT, EAT, and RRT)
  (2-2) Detailed structure of SCS (SDP)
  (3) Configuration of broadcasting system
  (4) Concrete operation example
  (4-1) NRT portal service transmission
  (4-2) EAS message transmission
  (4-3) Application transmission
  (4-4) Shared component service transmission
  (5) Content of concrete process executed in each device <1. Digital Broadcasting According to IP Transmission Scheme of Section Format>

In digital broadcasting of an IP transmission scheme according to an embodiment of the present technology, a scheme of either a section format or an XML format can be employed. Here, an IP transmission scheme of a section format is a scheme in which signaling information is transmitted according to a section format. Meanwhile, an IP transmission scheme of an XML format is a scheme in which signaling information is transmitted according to an XML format (Extensible Markup Language Format). In the following description, the IP transmission scheme of the section format will be first described, and thereafter the IP transmission scheme of the XML format will be described.

<(1) Overview of IP Transmission Scheme of Section Format>

(Protocol Stack of IP Transmission Scheme of the Section Format)

FIG. 1 is a diagram illustrating a protocol stack of digital broadcasting according to the IP transmission scheme of the section format.

A physical layer is the lowest layer, and a frequency band of a broadcast wave allocated for a service (channel) corresponds to the physical layer as illustrated in FIG. 1. A layer directly above the physical layer is a generic stream encapsulation (GSE) layer. The GSE layer associates the physical layer directly therebelow with an IP layer directly thereabove. The GSE is employed as a digital video broadcasting (DVB) standard.

The IP layer is similar to an IP in a TCP/IP protocol stack, and an IP packet is specified by an IP address. A layer directly above the IP layer is a user datagram protocol (UDP) layer, and layers thereabove are a real-time transport protocol (RTP) and a file delivery over unidirectional transport (FLUTE)/asynchronous layered coding protocol (ALC). In other words, in the digital broadcasting of the IP transmission scheme, packets having a UDP port number designated thereto are transmitted, for example, an RTP session and a FLUTE session are established. The details of the FLUTE are specified as RFC 3926.

A layer directly above the FLUTE/ALC is a fragmented MP4 (fMP4), and a layer directly above the RTP and the fMP4 is audio video (AV), SubTitle, and Real-TimeEvent. For example, video data (video) is encoded by a coding scheme such as high efficiency video coding (HEVC). For example, audio data (audio) is encoded by a coding scheme such as an advanced audio coding (AAC). In other words, when video data or audio data is transmitted in a synchronous stream format, an RTP session is used, and when video data or audio data is transmitted in an asynchronous file format, a FLUTE session is used.

Further, a layer above the FLUTE/ALC is Interactive, Meta, etc. For example, when a file of an application executed concurrently with a television program is transmitted, the FLUTE session is used.

On the right side of the protocol stack of FIG. 1, low layer signaling (LLS), middle layer signaling (MLS), and high layers signaling (HLS) are specified as signaling information. The LLS is signaling of a low layer, and serves as a layer above the GSE layer. For example, in the LLS, a combination (hereinafter, referred to as a "triplet") of network_id, transport_stream_id, and service_id which is used in an MPEG2-TS scheme and a section format can be employed.

In this case, as the LLS, a network information table (NIT) representing a transport stream configuration and a service configuration in a broadcasting network can be transmitted using the triplet. As will be described later in detail, as an address map table (AMT) is transmitted as the LLS together with the NIT, a receiver side can obtain tuning information for tuning in to a service (channel).

Further, a service association table (SAT), an emergency alert table (EAT), and a region rating table (RRT) can be transmitted as the LLS. The SAT includes information indicating whether or not a certain service is on the air. The EAT includes information related to an emergency notification. The RRT includes information related to regional information related to a classification of a program.

The MLS is signaling of a middle layer, and serves as a layer above the UDP layer. As the MLS is set, a tuning process can be rapidly performed. For example, as the MLS, service channel signaling (SCS) for transmitting service-related information or component information in units of services can be employed. For example, a service map table (SMT), an application information table (AIT), or the like are transmitted in the section format as the SCS. The SMT includes a service attribute of a service unit, configuration information of a component, filter information of a component, and the like. The AIT is control information of an application executed concurrently with AV content.

The HLS is signaling (or an announcement) of a high layer, and serves a layer above the FLUTE/ALC. For example, a file of an electronic service guide (ESG) can be transmitted as the HLS using a FLUTE session. For example, the ESG includes information such as a program title and a start time, for example.

(ID System in IP Transmission Scheme of Section Format)

FIG. 2 is a diagram illustrating a relation between a broadcast wave signal and an ID system of the IP transmission scheme of the section format.

As illustrated in FIG. 2, a broadcast wave (a broadcasting network (network) having a frequency band of 6 MHz is allocated network_id. Each broadcast wave includes one or more GSE streams identified by transport_stream_id. The GSE stream is configured with a plurality of GSE packets each of which includes a GSE header and a payload.

Each GSE stream includes a plurality of services identified by service_id. Each service includes a plurality of components. Each component is information configuring a program such as video data or audio data.

As a triplet, that is, a combination of network_id, transport_stream_id, and service_id is employed as the ID system of the IP transmission scheme of the section format, similarly to the MPEG2-TS scheme as described above, compatibility with the MPEG2-TS scheme that is currently in wide spread is obtained, and thus it is possible to easily cope with simulcasting, for example, when transition from the MPEG2-TS scheme to the IP transmission scheme is performed.

Further, when an operation using a major channel number and a minor channel number as identification information corresponding to service_id is performed, it is possible to cope with such an operation such that among 16 bits of service_id, higher 8 bits are allocated as 8 bits of the major channel number, and lower 8 bits are allocated as 8 bits of the minor channel number.

(Configuration of Broadcast Wave of IP Transmission Scheme of Section Format)

Figure 3:
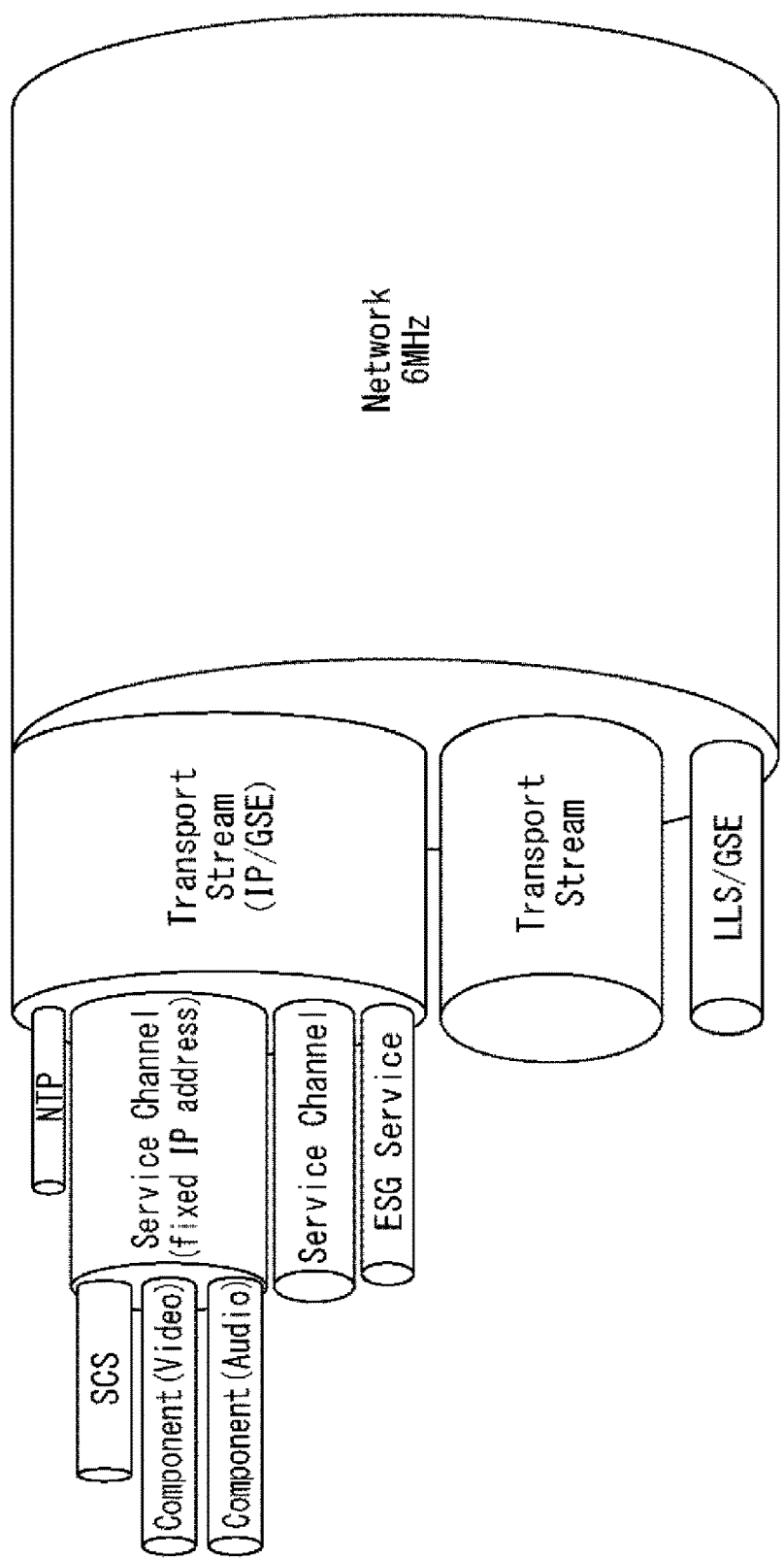
FIG. 3 is a diagram illustrating a configuration of a broadcast wave in an IP transmission scheme of a section format.

FIG. 3 is a diagram illustrating a configuration of a broadcast wave of the digital broadcasting of the IP transmission scheme of the section format.

As illustrated in FIG. 3, one or more transport streams and LLS can be acquired from a broadcast wave ("network" in FIG. 3) having a frequency band of 6 MHz. Further, a network time protocol (NTP), a plurality of service channels, and an ESG (ESG Service) can be acquired from each transport stream. The NTP is time information and common in a plurality of service channels.

Each service channel includes a component such as video data or audio data and the SCS such as the SMT and the AIT. Each service channel is allocated a fixed IP address, and a component, a control signal, and the like can be packaged in units of service channels using this IP address.

Further, in FIG. 3, a transport stream corresponds to a GSE stream of FIG. 2, and when a transport stream is described below, the transport stream is assumed to be the GSE stream. The component corresponds to a component of FIG. 2, and a service channel corresponds to a service of FIG. 2.

Figure 4:
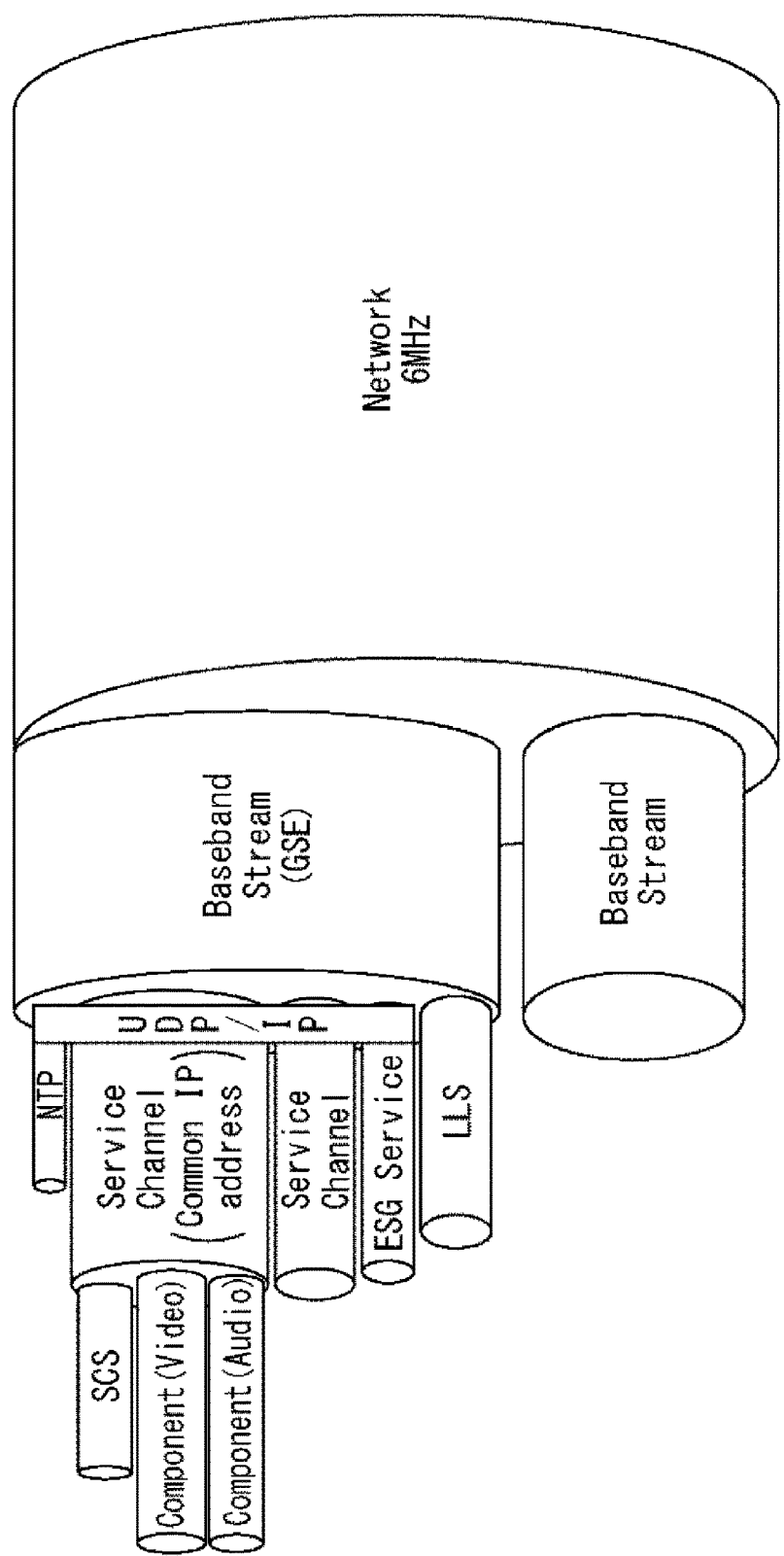
FIG. 4 is a diagram illustrating another configuration of a broadcast wave in an IP transmission scheme of a section format.

Further, the LLS may be transmitted on a baseband stream (a GSE stream) as illustrated in FIG. 4. In this case, the NTP, the service channel, and the ESG (ESG Service) can be transmitted according to a UDP/IP protocol. The following description of the digital broadcasting according to the IP transmission scheme of the section format will proceed with an example in which a configuration of FIG. 4 is employed.

(Configuration of LLS)

Figure 5:
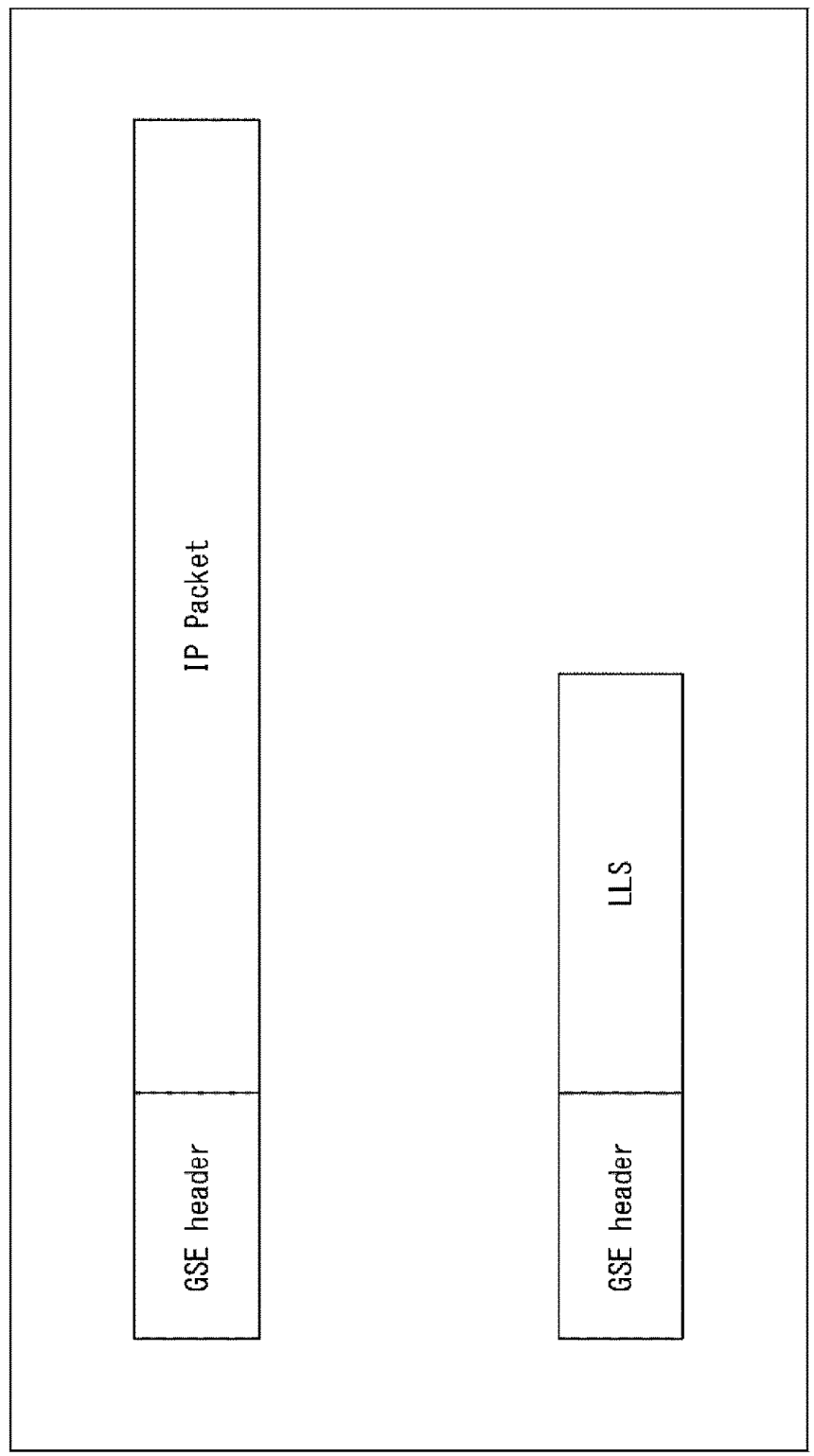
FIG. 5 is a diagram illustrating a configuration of LLS in an IP transmission scheme of a section format.

FIG. 5 is a diagram illustrating a configuration of the LLS in the IP transmission scheme of the section format.

A GSE packet includes a GSE header and a payload as illustrated in FIG. 5. When the layer above the GSE layer is the IP layer, a payload portion is an IP packet. The LLS is the layer above the GSE layer but transmitted in the section format, and thus the LLS is arranged following the GSE header. For example, the NIT, the AMT, the SAT, the EAT, and the RRT can be arranged as the LLS.

Further, the GSE header includes 2-bit type information, and it is possible to determine whether the GSE packet is the IP packet or the LLS using the type information.

(Configuration of MLS)

FIG. 6 is a diagram illustrating a configuration of the MLS in the IP transmission scheme of the section format.

For example, when video data or audio data is transmitted in a synchronous stream format, since an RTP session is used, a GSE header, an IP header, an UDP header, and an RTP header are added to a payload as illustrated in FIG. 6. Further, when file data such as an fMP4 or an ESG is transmitted in an asynchronous file format, since a FLUTE session is used, the GSE header, the IP header, the UDP header, and an LCT header are added to a payload. In addition, since the NTP is the layer above the UDP layer, the NTP is arranged following the GSE header, the IP header, and the UDP header.

The MLS is the layer above the UDP layer but transmitted in the section format, and thus the MLS is arranged following the GSE header, the IP header, and the UDP header. For example, the SMT or the AIT can be arranged as the MLS (SCS).

(Compulsory Emergency Activation Flag)

Figure 7:
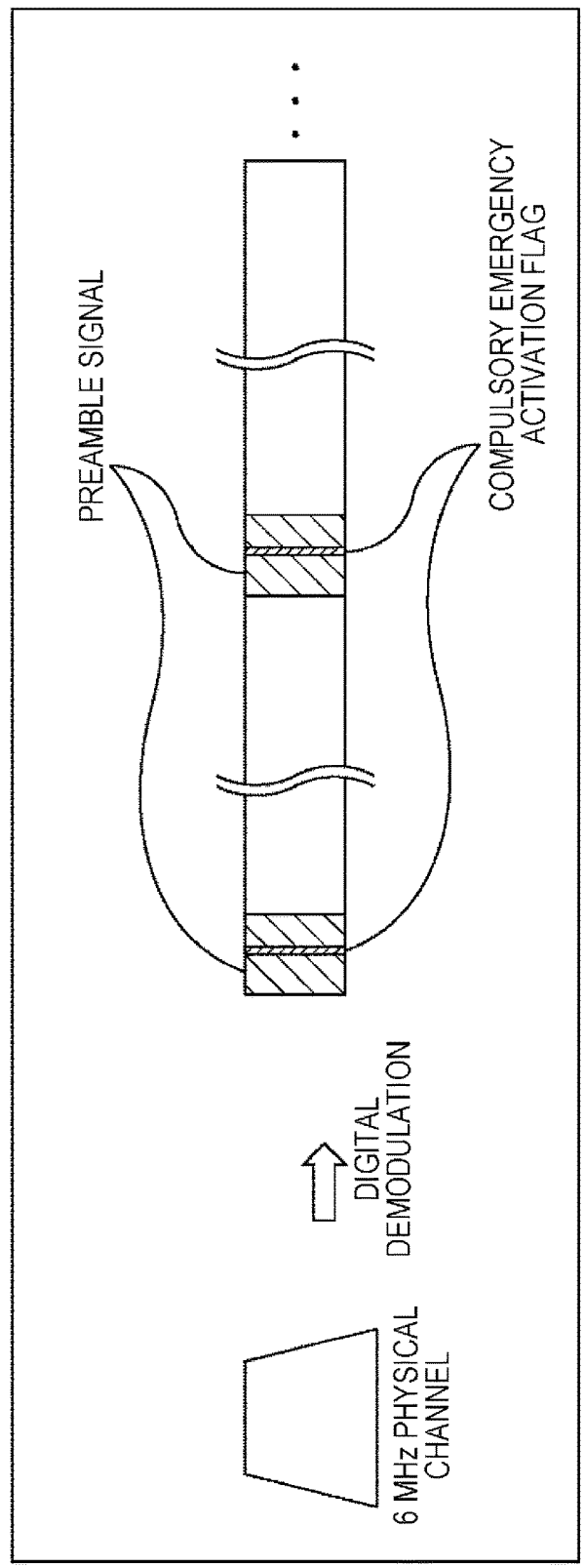
FIG. 7 is a diagram for describing a compulsory emergency activation flag in a physical layer.

FIG. 7 is a diagram for describing a compulsory emergency activation flag in the physical layer.

The compulsory emergency activation flag is a wake-up signal that compulsorily activates a receiver whose main power is in an off state (a sleep state), and transmitted in the physical layer of the protocol stack of FIG. 1. In other words, the compulsory emergency activation flag is high in reliability and low in delay, and transmitted independently of a service channel or the like.

Specifically, as the compulsory emergency activation flag as illustrated in FIG. 7, one bit is set to a field for extension of a preamble signal representing a data structure in a stream obtained by demodulating a broadcast wave. The receiver in the sleep state turns on power and then performs the emergency notification process according to the EAT when the compulsory emergency activation flag is set to "on."

Further, the compulsory emergency activation flag included in the preamble signal is an example, and the compulsory emergency activation flag may be included in any other signal. Further, it is unnecessary to transmit the compulsory emergency activation flag to notify of all emergency information, and, for example, the compulsory emergency activation flag may be transmitted to notify of only emergency information having a high emergency degree.

(Basic Signaling System)

Figure 8:
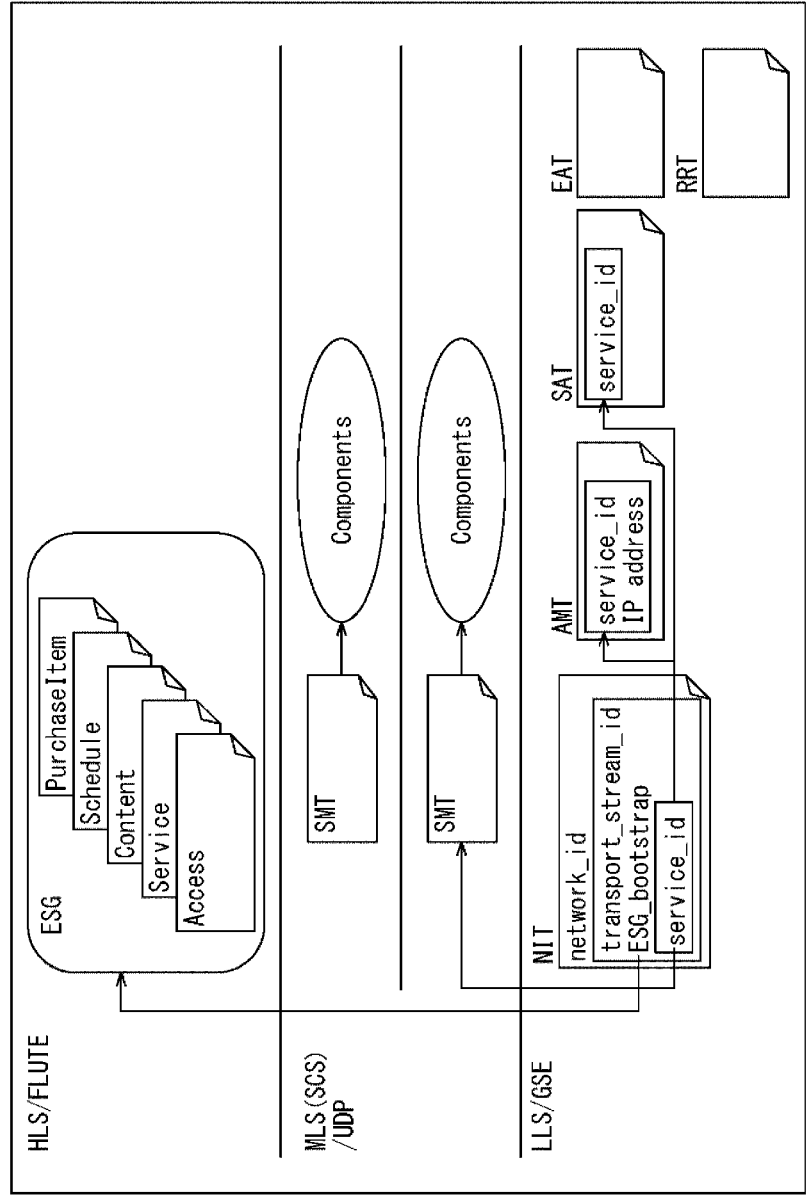
FIG. 8 is a diagram for describing a basic signaling system in an IP transmission scheme of a section format.

FIG. 8 is a diagram for describing a basic signaling system in the IP transmission scheme of the section format.

The NIT, the AMT, the SAT, the EAT, and the RRT are used in the LLS as illustrated in FIG. 8. For example, the NIT and the AMT have a transmission period of one second, and are acquired by an initial scan. Further, for example, the SAT has a transmission period of 100 milliseconds, and is acquired when a service is tuned to.

The NIT represents a transport stream configuration and a service configuration in a broadcasting network by a triplet. In the NIT, network_id and a transport stream loop are arranged, and a service loop is further arranged in the transport stream loop.

The AMT represents an IP address of each service. The SAT further represents a service that is on the air. The NIT is connected with the AMT and the SAT by service_id, and, for example, tuning information is obtained by combining the NIT with the AMT. Based on the SAT, it is possible to determine whether or not a certain service is on the air.

The EAT is a control signal for providing an emergency notification service, and transmitted for each stream. When the EAT is transmitted, the receiver has to perform the emergency notification process according to the EAT. The RRT includes information related to regional information related to a type of a program.

The SMT is used in the MLS (SCS) as illustrated in FIG. 8. For example, the SMT has a transmission period of 100 milliseconds. The SMT represents a service attribute of a service unit of each service, configuration information of a component, component attribute, and filter information of a component, and is prepared for each service. In other words, for example, it is possible to acquire a component group of a certain service by performing a filtering process using an IP address of the AMT and a port number of the SMT.

Further, the ESG is transmitted as the HLS through a FLUTE session as illustrated in FIG. 8. The ESG is configured with Access, Service, Content, Schedule, PurchaseItem, and the like. It is possible to acquire the ESG from the FLUTE session using a transport session identifier (TSI) included in ESG_bootstrap information of the NIT in addition to the IP address of the AMT and the port number of the SMT.

<(2) Signaling Information>
<(2-1) Detailed Structure of LLS (NIT, AMT, SAT, and EAT)>

(Syntax of NIT)

FIG. 9 is a diagram illustrating syntax of the NIT. table_id represents table identification. section_syntax_indicator is a 1-bit field, and a fixed value is designated thereto. section_length represents a section length.

network_id represents network identification, and serves as a label identifying a distribution system represented by the NIT to be distinguished from other distribution systems.

version_number represents a version number. current_next_indicator represents a current next indicator. section_number represents a section number. last_section_number represents a last section number.

network_descriptors_length represents a network descriptor length. transport_stream_loop_length represents a transport stream loop length.

transport_stream_id represents transport stream identification. original_network_id represents original network identification. transport_descriptors_length represents a transport descriptor length.

FIG. 10 is a diagram illustrating examples of descriptors arranged in the loop of the NIT illustrated in FIG. 9.

Name_descriptor is arranged in the network loop of the NIT as necessary as illustrated in FIG. 10. Further, in the transport stream loop of the NIT, Service_list_decriptor, ATSC3_delivery_system_descriptor, and Transport_stream_ protocol_descriptor are necessarily arranged, and Name_descriptor and ESG_bootstrap_descriptor are arranged as necessary.

In FIG. 10, a name of Name_descriptor is provided by a character code. Further, Service_list_decriptor provides a list of services by service identification and a service form type. Further, ATSC3_delivery_system_descriptor provides physical information necessary for performing a tuning process.

Further, in FIG. 10, Transport_stream_protocol_descriptor provides a protocol type of a transport stream. ESG_bootstrap_descriptor provides information necessary for acquiring the ESG transmitted through the FLUTE session. For example, in ESG_bootstrap_descriptor, source_IP_address representing a transmission source, destination_IP_address representing a destination, UDP_port_num representing a UDP port number, TSI representing a TSI in a FLUTE session, and the like are described.

(Data Structure of AMT)

FIG. 11 is a diagram illustrating syntax of the AMT. table_id represents table identification. section_syntax_indicator is a 1-bit field, and a fixed value is designated thereto. section_length represents a section length.

transport_stream_id represents transport stream identification. version_number represents a version number. current_next_indicator represents a current next indicator. section_number represents a section number. last_section_number represents a last section number. number_of_services represents the number of services.

service_id represents service identification. IP_version_flag represents an IP version flag. For example, when "0" is designated as IP_version_flag, it represents IPv4, when "1" is designated, it represents IPv6.

source_IP_address_for_v4 and destination_IP_address_for_v4 represent IP addresses of the version 4 of a transmission source (source) and a destination (destination). Further, source_IP_address_for_v6 and destination_IP_address_for_v6 represent IP addresses of the version 6 of a transmission source (source) and a destination (destination).

Further, when service_id="0xFFFF" is designated in the AMT, it is assumed to represent an IP address of an NTP packet other than a service.

(Syntax of SAT)

FIG. 12 is a diagram illustrating syntax of the SAT.

table_id represents table identification. section_syntax_indicator is a 1-bit field, and a fixed value is designated thereto. section_length represents a section length.

transport_stream_id represents transport stream identification. version_number represents a version number. current_next_indicator represents a current next indicator. section_number represents a section number. last_section_number represents a last section number.

service_id represents service identification. Here, service_id of a service that is on the air is designated.

(Syntax of EAT)

FIG. 13 is a diagram illustrating syntax of the EAT. FIG. 14 illustrates configuration information of the EAT, and the configuration information of FIG. 14 is appropriately referred to in the description of FIG. 13.

table_id represents table identification. section_syntax_indicator is a 1-bit field, and a fixed value is designated thereto. section_length represents a section length.

EA_category represents a category code of an emergency alert. This code is used for filtering. Further, it is possible to notify of only emergency information which each user desires through the filtering process. The details of the filtering process using EA_category will be described later with reference to FIGS. 23 to 25.

version_number represents a version number. current_next_indicator represents a current next indicator. section_number represents a section number. last_section_number represents a last section number.

automatic_tuning_flag represents an automatic tuning flag. The automatic tuning flag represents whether or not a service to be tuned is designated when the compulsory emergency activation flag is set to "on." When the automatic tuning flag is set to "on," a service designated by the triplet in a corresponding table is automatically tuned to.

num_EAS_messages represents the number of EAS messages included in the table.

network_id, transport_stream_id, and service_id represent a service to be tuned when automatic_tuning_flag is 1. In other words, when automatic_tuning_flag is 1, a service designated by the triplet is automatically tuned to when the compulsory emergency activation flag is set to "on."

EAS_message_id represents EAS message identification. EAS_priority represents a priority of an EAS message when there are a plurality of EAS messages. EAS_enforcement_flag represents whether or not a target EAS message is an EAS message to be displayed when the compulsory emergency activation flag is set to "on."

Here, content of EAS_enforcement_flag may be included in EAS_priority without using EAS_enforcement_flag. For example, when a numerical value represented by 8 bits of EAS_priority is a certain numerical value or more, it may be determined to be an EAS message to be displayed when the compulsory emergency activation flag is set to "on."

EAS_IP_version_flag represents an IP version flag of a stream. For example, when "0" is designated as EAS_IP_version_flag, it is assumed to represent IPv4, and when "1" is designated, it is assumed to represent IPv6. Here, EAS_IP_version_flag is applied to an IP_address when "3" is designated as EAS_message_transfer_type which will be described later.

EAS_message_transfer_type represents a transmission scheme type of the EAS message. 1 to 5 may be designated as the type.

When "1" is designated as EAS_message_transfer_type, it represents that a transmission scheme is "non real time (NRT) portal service transmission." The NRT portal service transmission is a scheme in which emergency information is transmitted by means of NRT portal information transmitted through the FLUTE session. Further, a service (channel) of the NRT portal information is a so-called data broadcasting service of consistently transmitting only NRT portal information of a hyper text markup language (HTML) format.

When "2" is designated as EAS_message_transfer_type, it represents that a transmission scheme is "EAS message transmission." The EAS message transmission is a scheme in which CAP information (emergency information) is included in an EAS message of the EAT and then transmitted. Further, when "3" is designated as EAS_message_transfer_type, it represents that a transmission scheme is "stream transmission." The stream transmission is a scheme in which CAP information (emergency information) is transmitted by means of a stream other than an EAS.

When "4" is designated as EAS_message_transfer_type, it represents that a transmission scheme is "application transmission." The application transmission is a scheme in which an application executed concurrently with a television program is transmitted as an emergency notification application.

When "5" is designated as EAS_message_transfer_type, it represents that a transmission scheme is "shared component service transmission." The shared component service transmission is a scheme in which emergency information is transmitted through another designated shared component service.

EAS_message_encoding_type represents an encoding scheme of an EAS message.

When "2" is designated as EAS_message_transfer_type, EAS_message_length and EAS_message_bytes () are arranged. EAS_message_length represents an EAS message length. EAS_message_bytes () represents the number of bytes of an EAS message.

When "3" is designated as EAS_message_transfer_type, IP_address and UDP_port_num are arranged. IP_address represents an IP address. UDP_port_num represents a port number.

When "4" is designated as EAS_message_transfer_type, EAS_application_identifier is arranged. EAS_application_identifier represents application identification.

When "5" is designated as EAS_message_transfer_type, EAS_shared_service_type and EAS_shared_service_id are arranged.

EAS_shared_service_type represents a signal configuration type when an EAS message is transmitted through a shared component service. For example, it may represent only audio data when "1" is designated as EAS_shared_service_type, it may represent only video data when "2" is designated, and it may represent both video data and audio data when "3" is designated.

EAS_shared_service_id represents service_id when audio data, video data, or both video data and audio data are transmitted.

EAS_NRT_service_id represents service_id of a service for transmitting the NRT portal information. For example, when "1" is designated as EAS_message_transfer_type, a service designated by service_id is tuned to, and the NRT portal information (emergency information) is acquired. Further, for example, when "2" or "3" is designated as EAS_message_transfer_type and an operation for displaying detailed information is performed, a service designated by service_id is tuned to, and the NRT portal information (detailed information) is acquired. Further, when there is no service for transmitting the NRT portal information, fixed service_id, that is, for example, EAS_NRT_service_id="ffff" is preferably designated.

Here, the details of CAP information transmitted when "2" or "3" is designated as EAS_message_transfer_type of the EAT will be described with reference to FIGS. 15 to 17.

Figure 15:
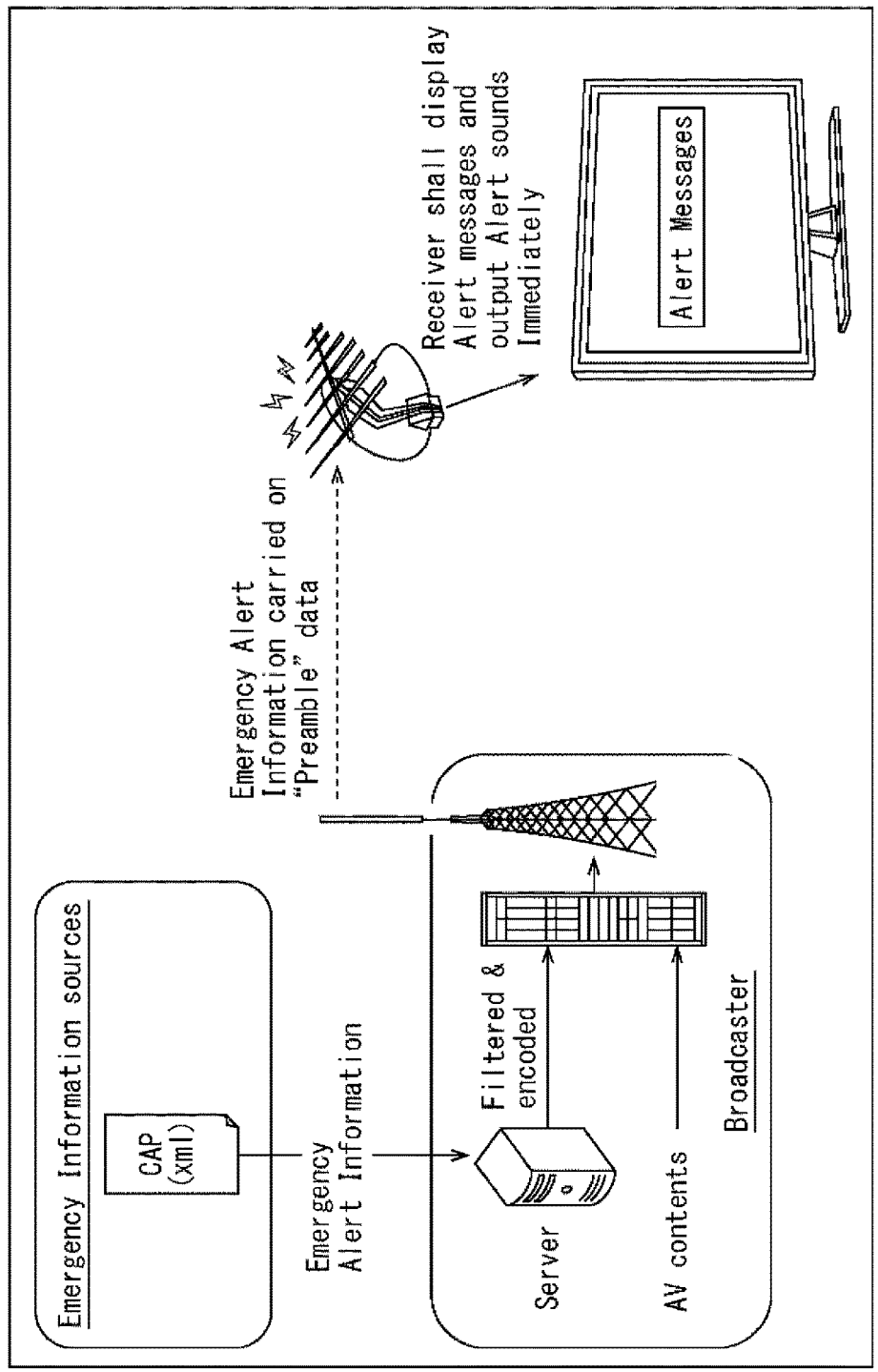
FIG. 15 is a diagram illustrating an overview of CAP information.

As illustrated in FIG. 15, in a normal situation, in an EAS system, broadcasting content (AV content) such as a television program is transmitted as a broadcasting signal from a transmitter in a broadcasting station through an antenna. A receiver receives the broadcasting signal transmitted from the transmitter through an antenna, and can view broadcasting content such as a television program.

Meanwhile, in an emergency situation, in the EAS system, CAP information serving as emergency information is provided to a server in the broadcasting station. The transmitter in the broadcasting station performs multiplexing of the CAP information received from the server and broadcasting content such as a television program, and transmits a broadcasting signal through the antenna. The receiver receives the broadcasting signal transmitted from the transmitter, and displays the CAP information ("Alert Message" in FIG. 15) such as a subtitle to be superimposed on the television program. As a result, in an emergency situation, the user can check the CAP information.

Figure 16:
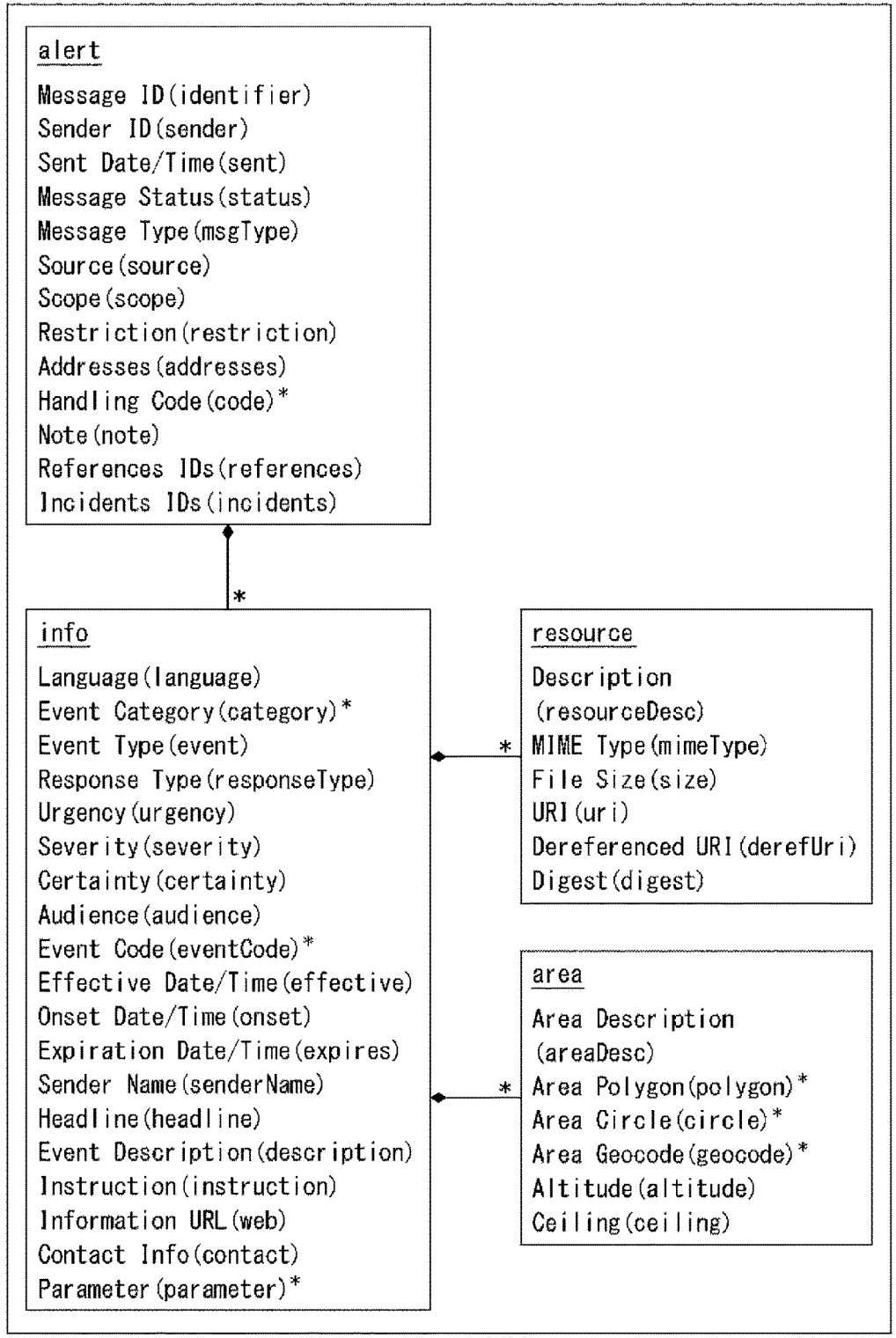
FIG. 16 is a diagram illustrating CAP information.

FIG. 16 illustrates a structure of the CAP information. The CAP information is configured with an alert attribute, an info attribute, a resource attribute, an area attribute, and the like as illustrated in FIG. 16. FIG. 17 illustrates an exemplary description of CAP information of an XML format. The CAP information is transmitted when "2" or "3" is designated as EAS_message_transfer_type.

<(2-2) Detailed Structure of SCS (SMT)>
(Syntax of SMT)

FIG. 18 is a diagram illustrating syntax of the SMT.

table_id represents table identification. section_syntax_indicator is a 1-bit field, and a fixed value is designated thereto. section_length represents a section length.

service_id represents service identification. version_number represents a version number. current_next_indicator represents a current next indicator. section_number represents a section number. last_section_number represents a last section number. service_category represents a service category.

service_descriptor_length represents a service descriptor length. base_UDP_port_number represents an UDP port number. For example, an RTP control protocol (RTCP) port number is a value next to a value of an RTP port number. component_info_length represents a component information length.

FIG. 19 is a diagram illustrating exemplary descriptors arranged in the loop of the SMT illustrated in FIG. 18.

Name_descriptor, Protocol_version_descriptor, NRT_service_descriptor, Capabilities_descriptor, Icon_descriptor, ISO-639 language_descriptor, Receiver_targeting_descriptor, Adjunct_service_descriptor, and Genre_descriptor are arranged in a service loop of the SMT as necessary as illustrated in FIG. 19. Further, Component_descriptor for providing information necessary for each component is necessarily arranged in a component loop of the SMT.

<(3) Configuration of Broadcasting System>
(Exemplary Configuration of Broadcasting System)

Figure 20:
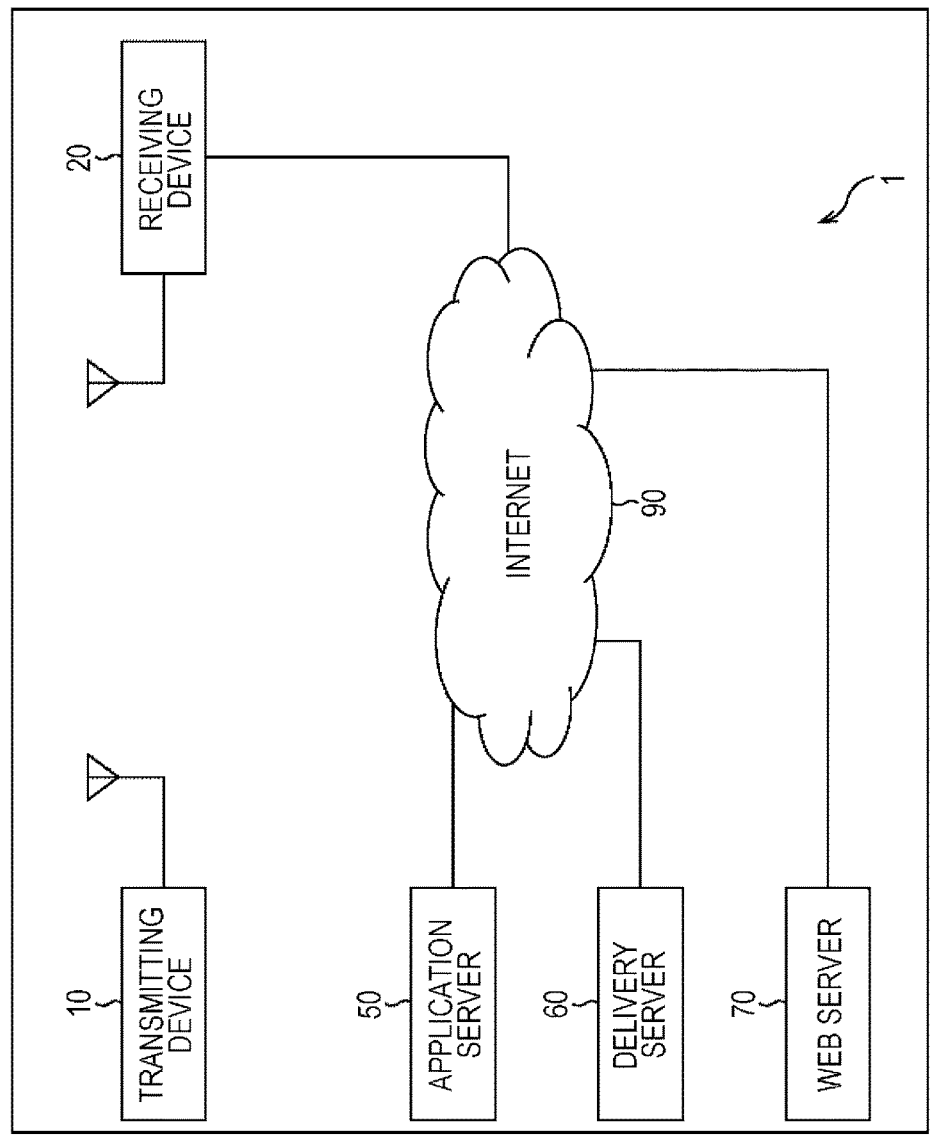
FIG. 20 is a diagram illustrating a configuration of a broadcasting system according to an embodiment of the present technology.

FIG. 20 is a diagram illustrating a configuration of a broadcasting system according to an embodiment of the present technology.

A broadcasting system 1 includes a transmitting device 10, a receiving device 20, an application server 50, a delivery server 60, and a web server 70 as illustrated in FIG. 20. The receiving device 20 is connected with the application server 50, the delivery server 60, and the web server 70 via the Internet 90.

In a normal situation, the transmitting device 10 transmits broadcasting content such as a television program through a broadcast wave of digital broadcasting using an IP transmission scheme. In an emergency situation, the transmitting device 10 transmits an emergency notification control signal through a broadcast wave of digital broadcasting using an IP transmission scheme.

In a normal situation, the receiving device 20 receives a broadcasting signal transmitted from the transmitting device 10, and acquires video and a sound of broadcasting content. The receiving device 20 causes the video of the broadcasting content to be displayed on a display, and causes the sound synchronized with the video to be output through a speaker.

In an emergency situation, the receiving device 20 receives a broadcasting signal transmitted from the transmitting device 10, and acquires an emergency notification control signal. The receiving device 20 controls operations of respective units corresponding to an emergency notification service based on the emergency notification control signal such that a notification of emergency information is given. Here, the emergency information or detailed information thereof can be transmitted from the transmitting device 10 through the broadcast wave of the digital broadcasting using the IP transmission scheme. Further, a notification of the emergency information and the detailed information thereof is given by means of at least one of video and a sound.

Further, the receiving device 20 may be configured as a single device including a display and a speaker or may be equipped in a television receiver, a video recorder, or the like.

The application server 50 manages an emergency notification application executed concurrently with broadcasting content. The application server 50 provides emergency notification application via the Internet 90 according to a request transmitted from the receiving device 20. The receiving device 20 executes the emergency notification application received from the application server 50 concurrently with broadcasting content.

The delivery server 60 provides communication content such as a broadcasted broadcasting program or a movie opened to the public in video on demand (VOD) manner via the Internet 90. The receiving device 20 receives communication content delivered from the delivery server 60 via the Internet 90. The receiving device 20 causes video of communication content to be displayed on the display, and causes a sound synchronized with the video to be output through the speaker.

The web server 70 manages, for example, the emergency information or the detailed information thereof as a file of an HTML format. The web server 70 provides the emergency information or the detailed information thereof via the Internet 90 according to a request transmitted from the receiving device 20. The receiving device 20 causes the emergency information or the detailed information thereof received from the web server 70 to be displayed on the display.

The broadcasting system 1 has the above-described configuration.

(Exemplary Configuration of Transmitting Device)

Figure 21:
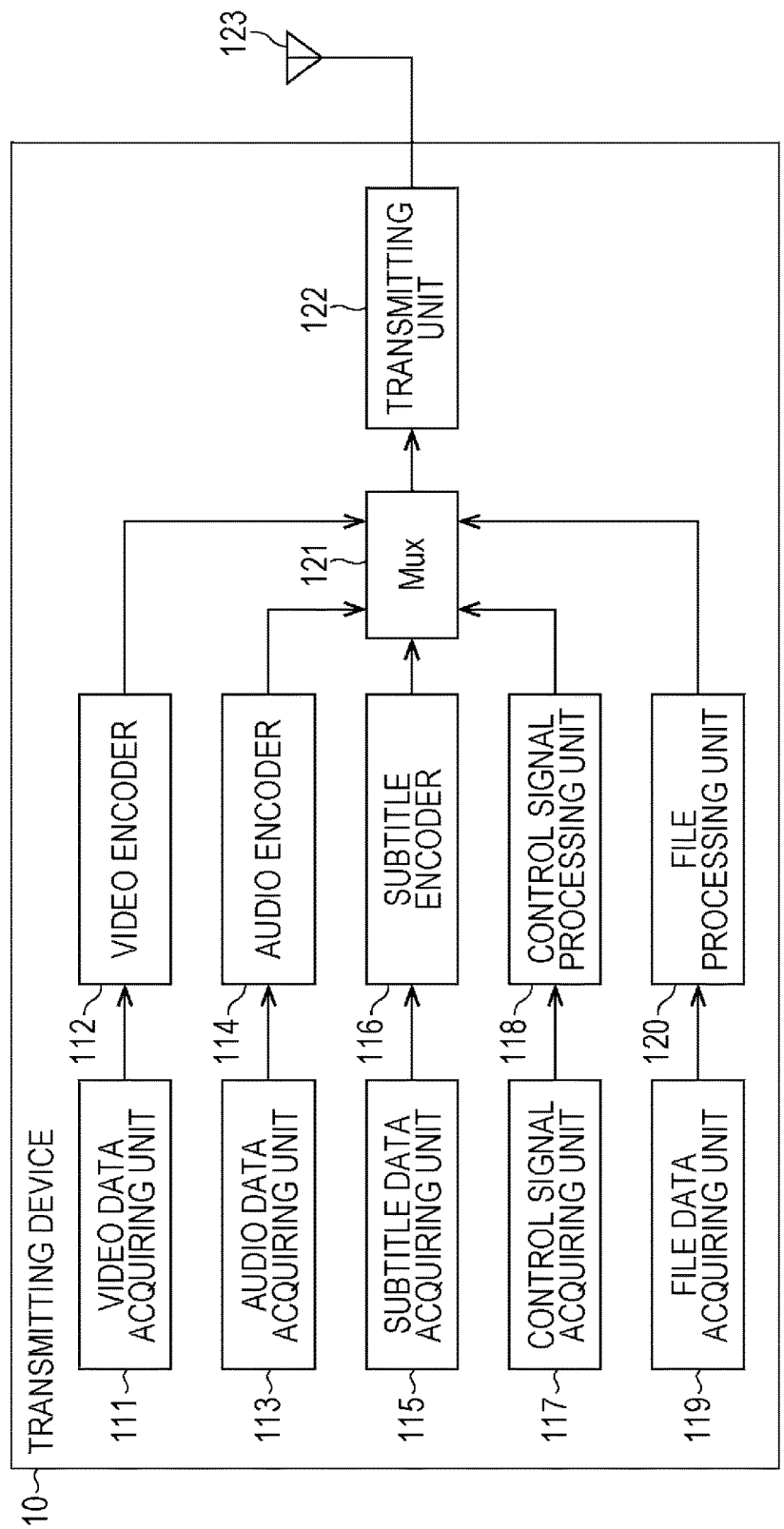
FIG. 21 is a diagram illustrating a configuration of a transmitting device according to an embodiment of the present technology.

FIG. 21 is a diagram illustrating a configuration of the transmitting device according to an embodiment of the present technology.

The transmitting device 10 includes a video data acquiring unit 111, a video encoder 112, an audio data acquiring unit 113, an audio encoder 114, a subtitle data acquiring unit 115, a subtitle encoder 116, a control signal acquiring unit 117, a control signal processing unit 118, a file data acquiring unit 119, a file processing unit 120, a Mux 121, and a transmitting unit 122 as illustrated in FIG. 21.

The video data acquiring unit 111 acquires video data from an internal storage, an external server, a camera, or the like, and provides the video data to the video encoder 112. The video encoder 112 encodes the video data provided from the video data acquiring unit 111 according to a coding scheme such as an MPEG, and provides the encoded data to the Mux 121.

The audio data acquiring unit 113 acquires audio data from an internal storage, an external server, a microphone, or the like, and provides the audio data to the audio encoder 114. The audio encoder 114 encodes the audio data provided from the audio data acquiring unit 113 according to a coding scheme such as an MPEG, and provides the encoded data to the Mux 121.

The subtitle data acquiring unit 115 acquires subtitle data from an internal storage, an external server, or the like, and provides the subtitle data to the subtitle encoder 116. The subtitle encoder 116 encodes the subtitle data provided from the subtitle data acquiring unit 115 according to a certain coding scheme, and provides the encoded data to the Mux 121.

The control signal acquiring unit 117 acquires a control signal such as the LLS or the SCS from an internal storage, an external server, or the like, and provides the control signal to the control signal processing unit 118. The control signal processing unit 118 performs certain signal processing on the control signal provided from the control signal acquiring unit 117, and provides resultant data to the Mux 121.

When data of an asynchronous file format is transmitted, the file data acquiring unit 119 acquires file data such as NRT content or an application from an internal storage, an external server, or the like, and provides the file data to the file processing unit 120. The file processing unit 120 performs certain file processing on the file data provided from the file data acquiring unit 119, and provides the file data to the Mux 121. For example, the file processing unit 120 performs file processing for transmission through a FLUTE session on the file data acquired by the file data acquiring unit 119.

The Mux 121 performs multiplexing of the video data received from the video encoder 112, the audio data received from the audio encoder 114, the subtitle data received from the subtitle encoder 116, the control signal received from the control signal processing unit 118, and the file data received from the file processing unit 120 to generate a stream of the IP transmission scheme, and provides the generated stream to the transmitting unit 122.

The transmitting unit 122 transmits the stream of the IP transmission scheme provided from the Mux 121 as a broadcasting signal through an antenna 123.

(Exemplary Configuration of Receiving Device)

Figure 22:
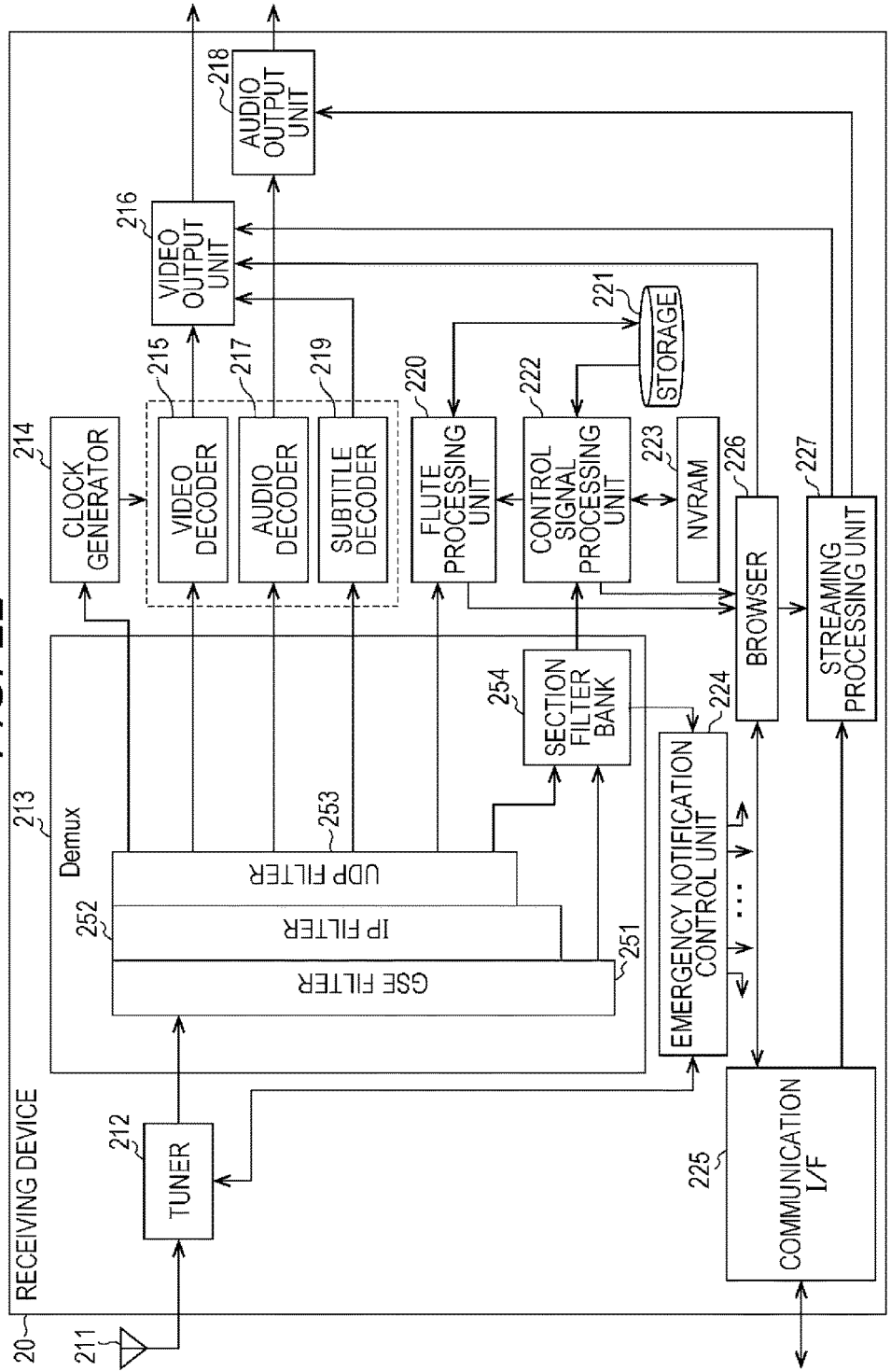
FIG. 22 is a diagram illustrating a configuration of a receiving device according to an embodiment of the present technology.

FIG. 22 is a diagram illustrating a configuration of the receiving device according to an embodiment of the present technology.

The receiving device 20 includes a tuner 212, a Demux 213, a clock generator 214, a video decoder 215, a video output unit 216, an audio decoder 217, an audio output unit 218, a subtitle decoder 219, a FLUTE processing unit 220, a storage 221, a control signal processing unit 222, NVRAM 223, an emergency notification control unit 224, a communication I/F 225, a browser 226, and a streaming processing unit 227 as illustrated in FIG. 22.

The tuner 212 extracts and demodulates a broadcasting signal of a service that is instructed to be tuned to from a broadcasting signal received through an antenna 211, and provides a stream of the IP transmission scheme obtained as a result to the Demux 213.

The Demux 213 demultiplexes the stream of the IP transmission scheme provided from the tuner 212 into video data, audio data, subtitle data, a control signal, and the like, and outputs the video data, the audio data, the subtitle data, the control signal, and the like to a block at a subsequent stage. Specifically, the Demux 213 includes a GSE filter 251, an IP filter 252, a UDP filter 253, and a section filter bank 254. The GSE filter 251 performs a filtering process based on a GSE header, and provides the LLS to the section filter bank 254.

The IP filter 252 performs a filtering process based on an IP header. The UDP filter 253 performs a filtering process based on a UDP header. In the filtering processes performed by the IP filter 252 to the UDP filter 253, the NTP is provided to the clock generator 214, and the SCS is provided to the section filter bank 254. The video data, the audio data, and the subtitle data are provided to the video decoder 215, the audio decoder 217, and the subtitle decoder 219, respectively. Further, various kinds of file data is provided to the FLUTE processing unit 220.

The section filter bank 254 performs a filtering process based on a section header, and appropriately provides the LLS and the SCS to the control signal processing unit 222. The section filter bank 254 acquires the EAT of the section format transmitted as the LLS, and provides the EAT of the section format to the emergency notification control unit 224.

Further, the IP filter 252 can perform a filtering process using one or more IP addresses and extract information such as a component (Audio/Video), a control signal (SCS), time information (NTP), or an ESG (the ESG) in units of services.

The clock generator 214 generates a clock signal based on the NTP provided from the Demux 213, and provides the clock signal to the video decoder 215, the audio decoder 217, and the subtitle decoder 219.

The video decoder 215 decodes the video data provided from the Demux 213 based on the clock signal provided from the clock generator 214 according to a decoding scheme corresponding to the video encoder 112 (FIG. 21), and provides the decoded video data to the video output unit 216. The video output unit 216 outputs the video data provided from the video decoder 215 to a display (not illustrated) at a subsequent stage. As a result, for example, video of a television program is displayed on the display.

The audio decoder 217 decodes the audio data provided from the Demux 213 based on the clock signal provided from the clock generator 214 according to a decoding scheme corresponding to the audio encoder 114 (FIG. 21), and provides the decoded audio data to the audio output unit 218. The audio output unit 218 provides the audio data provided from the audio decoder 217 to the speaker (not illustrated) at a subsequent stage. As a result, for example, a sound corresponding to video of a television program is output from the speaker.

The subtitle decoder 219 decodes the subtitle data provided from the Demux 213 based on the clock signal provided from the clock generator 214 according to a decoding scheme corresponding to the subtitle encoder 116 (FIG. 21), and provides the decoded subtitle data to the video output unit 216. When the subtitle data is provided from the subtitle decoder 219, the video output unit 216 combines the subtitle data with the video data received from the video decoder 215, and provides the combined data to the display (not illustrated) at the subsequent stage. As a result, video of a television program and a subtitle corresponding to the video are displayed on the display.

The FLUTE processing unit 220 reconstructs the ESG, the emergency notification application, the NRT content, and the like from various kinds of file data provided from the Demux 213 according to control of the control signal processing unit 222. For example, the FLUTE processing unit 220 causes the reconstructed ESG or the reconstructed NRT content to be recorded in the storage 221. Further, for example, the FLUTE processing unit 220 provides the reconstructed emergency notification application to the browser 226.

The storage 221 is a high-capacity recording device such as a hard disk drive (HDD). The storage 221 records various kinds of data provided from the FLUTE processing unit 220 and the like.

The control signal processing unit 222 controls operations of the respective units based on the control signal (the LLS and the SCS) provided from the section filter bank 254. The NVRAM 223 is non-volatile memory, and records various kinds of data according to control of the control signal processing unit 222.

The emergency notification control unit 224 controls operations of the respective units corresponding to the emergency notification service based on the EAT provided from the section filter bank 254. For example, the emergency notification control unit 224 controls the respective units of the receiving device 20 according to EAS_message_transfer_type of the EAT such that the emergency information is displayed on the display. Further, the emergency notification control unit 224 consistently monitors the tuner 212, and turns on the power of the receiving device 20 when the compulsory emergency activation flag set to "on" is detected from the broadcasting signal and the receiving device 20 is in the sleep state.

The communication I/F 225 receives an emergency notification application from the application server 50 via the Internet 90, and provides the emergency notification application to the browser 226. Further, the communication I/F 225 receives the emergency information or detailed information thereof from the web server 70 via the Internet 90, and provides the emergency information or the detailed information thereof to the browser 226.

The browser 226 is provided with the emergency notification application from the FLUTE processing unit 220 or the emergency notification application, the emergency information, or the detailed information from the communication I/F 225. The browser 226 generates video data according to the emergency notification application, the emergency information, or the detailed information, and provides the generated video data to the video output unit 216. As a result, video of the emergency notification application, the emergency information, or the detailed information is displayed on the display.

Further, the communication I/F 225 receives data of communication content delivered from the delivery server 60 via the Internet 90, and provides the data of the communication content to the streaming processing unit 227. The streaming processing unit 227 performs various kinds of processing necessary for performing streaming reproduction on the data provided from the communication I/F 225, provides the resultant video data to the video output unit 216, and provides the audio data to the audio output unit 218. As a result, video of communication content is displayed on the display, and a sound synchronized with the video is output from the speaker.

Further, in the receiving device 20 of FIG. 22, for example, the tuner 212, the Demux 213, the clock generator 214, the video decoder 215, the video output unit 216, the audio decoder 217, the audio output unit 218, the subtitle decoder 219, the storage 221, the NVRAM 223, and the communication I/F 225 are configured as hardware. Meanwhile, in the receiving device 20, for example, the FLUTE processing unit 220, the control signal processing unit 222, the emergency notification control unit 224, the browser 226, and the streaming processing unit 227 are implemented by a program executed by a central processing unit (CPU) (a CPU 901 illustrated in FIG. 67).

In the configuration of the receiving device 20 of FIG. 22, the storage 221 has been described to be built in, but an external storage may be used.

(Details of Filtering Process)

Next, the details of the filtering process of each packet performed by the Demux 213 (FIG. 22) will be described with reference to FIG. 23.

Figure 23:
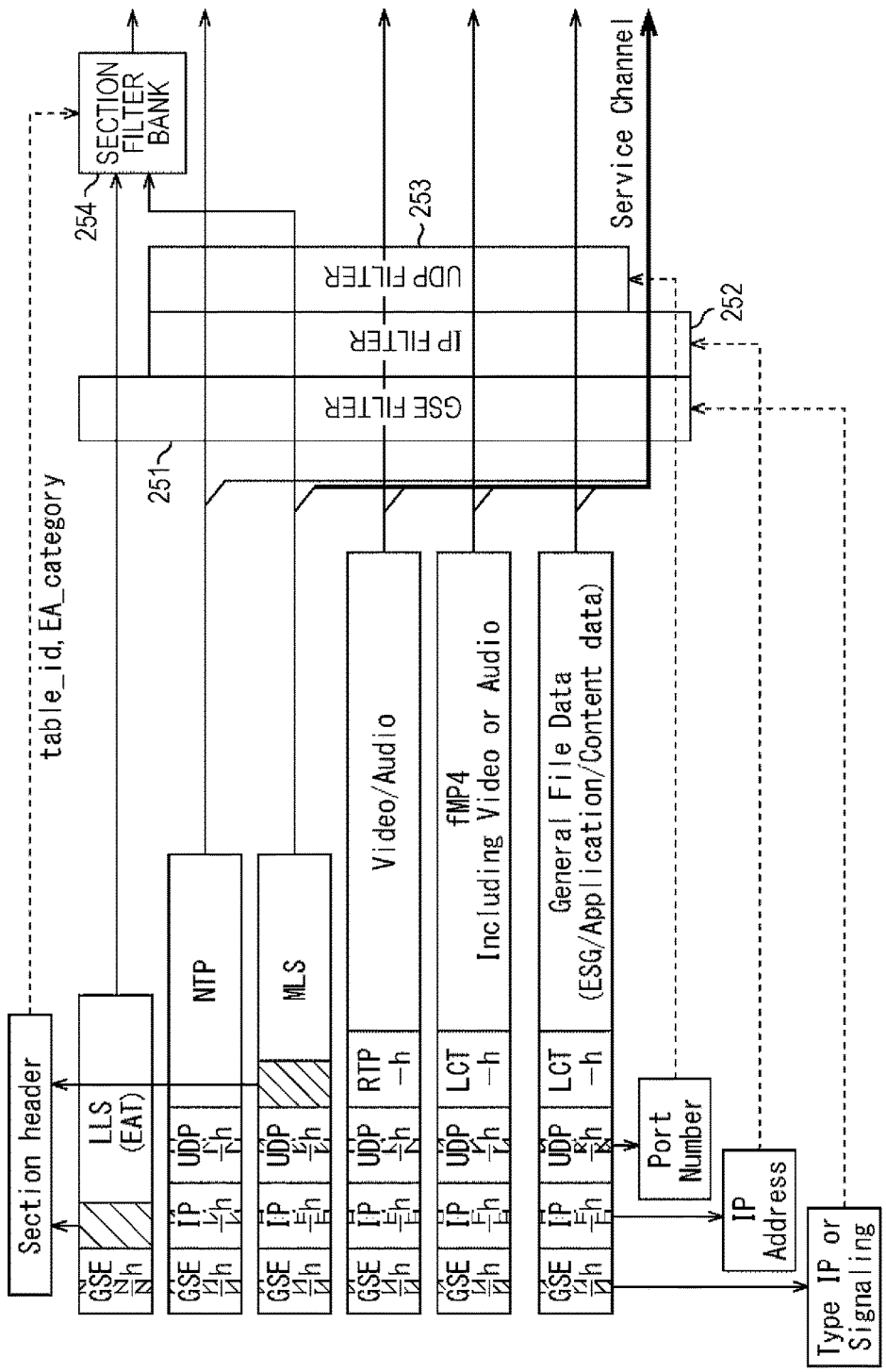
FIG. 23 is a diagram illustrating the details of a packet filtering process performed by a Demux in an IP transmission scheme of a section format.

As illustrated in FIG. 23, each packet including various kinds of header information, and the LLS, the NTP, the MLS (the SCS), various kinds of file data, video data, or audio data as a payload is input to the Demux 213.

The GSE header includes type information representing an IP or signaling. The GSE filter 251 performs the filtering process based on the type information included in the GSE header. In the example of FIG. 23, since only the type information of the packet of the LLS is signaling and other packets are an IP, only the packet of the LLS is provided to the section filter bank 254.

The IP header includes an IP address. The IP filter 252 performs the filtering process based on the IP address included in the IP header. In the example of FIG. 23, among packets including the IP header added thereto, only the packets of the NTP have a different IP address, but the other packets have the same IP address.

Further, the UDP header includes a port number. The UDP filter 253 performs the filtering process based on the port number included in the UDP header. In the example of FIG. 23, the packets including the UDP header added thereto differ in a port number. Further, an LCT header is added to a packet transmitted using a FLUTE session, and an RTP header is added to a packet transmitted using an RTP session.

Then, as the filtering processes using the IP address and the port number are performed by the IP filter 252 and the UDP filter 253, the packet of the NTP including no LCT header added thereto is output to the clock generator 214. Further, the packets of the video data and the audio data to which the RTP header is added are output to the video decoder 215 and the audio decoder 217. Further, packets of various kinds of file data are output to the FLUTE processing unit 220.

The packet of the LLS and the packet of the MLS (the SCS) are provided to the section filter bank 254. The section filter bank 254 performs the filtering process based on the section header added to the packets. Here, in the section filter bank 254, only a packet satisfying a filtering condition is held in a buffer memory of the section filter bank 254, and intermittently picked up by software from the CPU (the CPU 901 of FIG. 67).

For example, the section filter bank 254 performs the filtering process using an AND condition of table_id and EA_category of the EAT and thus can selectively notify of only the emergency information which each user desires.

Here, detailed content of the filtering process using EA_category which is performed by the section filter bank 254 illustrated in FIG. 23 will be described with reference to FIGS. 24 and 25.

Figure 24:
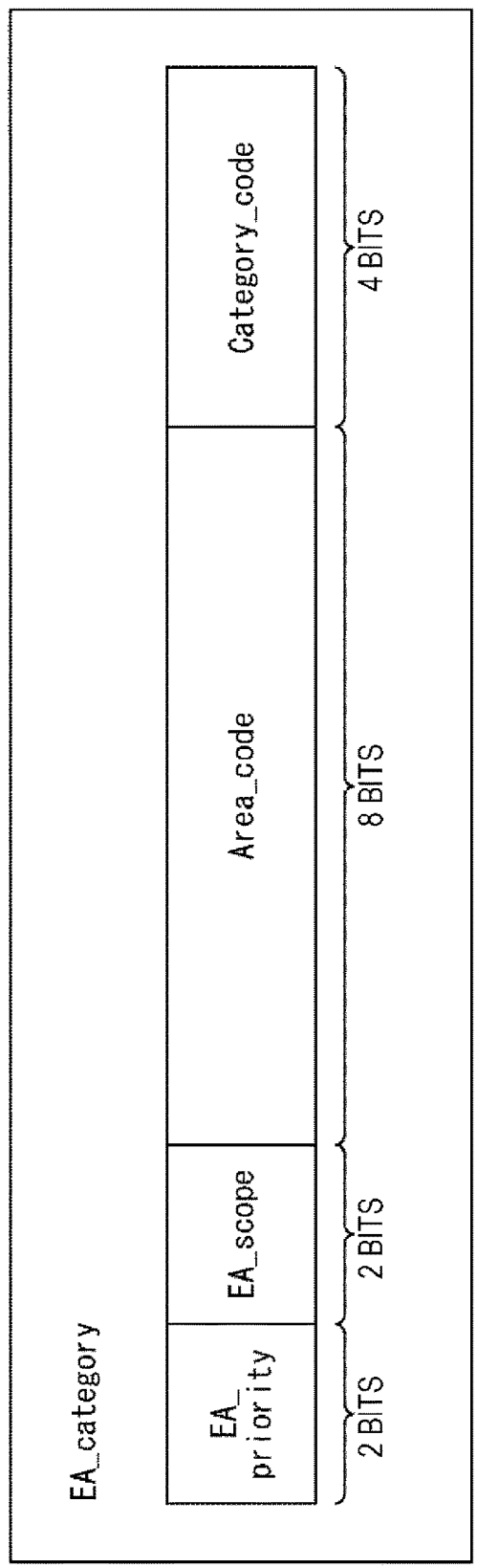
FIG. 24 is a diagram illustrating an exemplary format of EA_category.

As illustrated in FIG. 24, among 16 bits of EA_category, higher 2 bits represent EA_priority, next 2 bits represent EA_scope, next 8 bits represent Area_code, and lower 4 bits represent Category_code.

As illustrated in FIG. 25, EA_priority represents an emergency degree of the emergency information. A value of 0 to 3 is designated as EA_priority, and as the value increases, the emergency degree increases. For example, "0" represents "normal," and "3" represents the "highest emergency degree."

EA_scope represents a target area of the emergency information. A value of 0 to 3 is designated as EA_scope. For example, "0" represents "only corresponding area," "1" represents "other areas," "2" represents "wide area," and "3" represents "global."

Area_code represents a certain area code. In Area_code, when small areas are designated in a service area of a broadcasting station, codes are designated in units of certain areas. For example, codes are designated in units of counties.

Category_code represents a category of the emergency information. For example, "0" represents "disaster information," "1" represents "traffic information," "2" represents "weather information," and "3" represents "school bus."

For example, as the user sets the filtering condition using EA_category to the receiving device 20, the receiving device 20 notifies of only the emergency information filtered in units of EATs according to the filtering condition. Specifically, since there are cases in which the emergency information is important to a certain area but not important to other areas, it is possible to limit an area for the emergency information using EA_scope and Area_code. Further, for example, when "0" to "2" are designated as Category_code, a notification of the emergency information of the disaster information, the traffic information, and the weather information is given, but a notification of the emergency information of the school bus is not given.

Further, in FIG. 23, since packets of the MLS (the SCS), various kinds of file data, the video data, and the audio data of the same service channel are allocated the same IP address, the IP filter 252 outputs such packets together with the packet of the NTP, and thus the control signals thereof and data can be packaged using the IP address.

<(4) Concrete Operation Example>

Next, a concrete operation example of the broadcasting system 1 that supports the digital broadcasting according to the IP transmission scheme of the section format will be described. Here, for example, when initially activated, the receiving device 20 is assumed to perform the initial scan process, acquire tuning information from the NIT and the AMT, and cause the tuning information to be held in the NVRAM 223 or the like.

<(4-1) NRT Portal Service Transmission>

First, the NRT portal service transmission in the receiving device 20 in the sleep state or the active state will be described with reference to FIGS. 26 and 27.

(NRT Portal Service Transmission Process in Sleep State)

Figure 26:
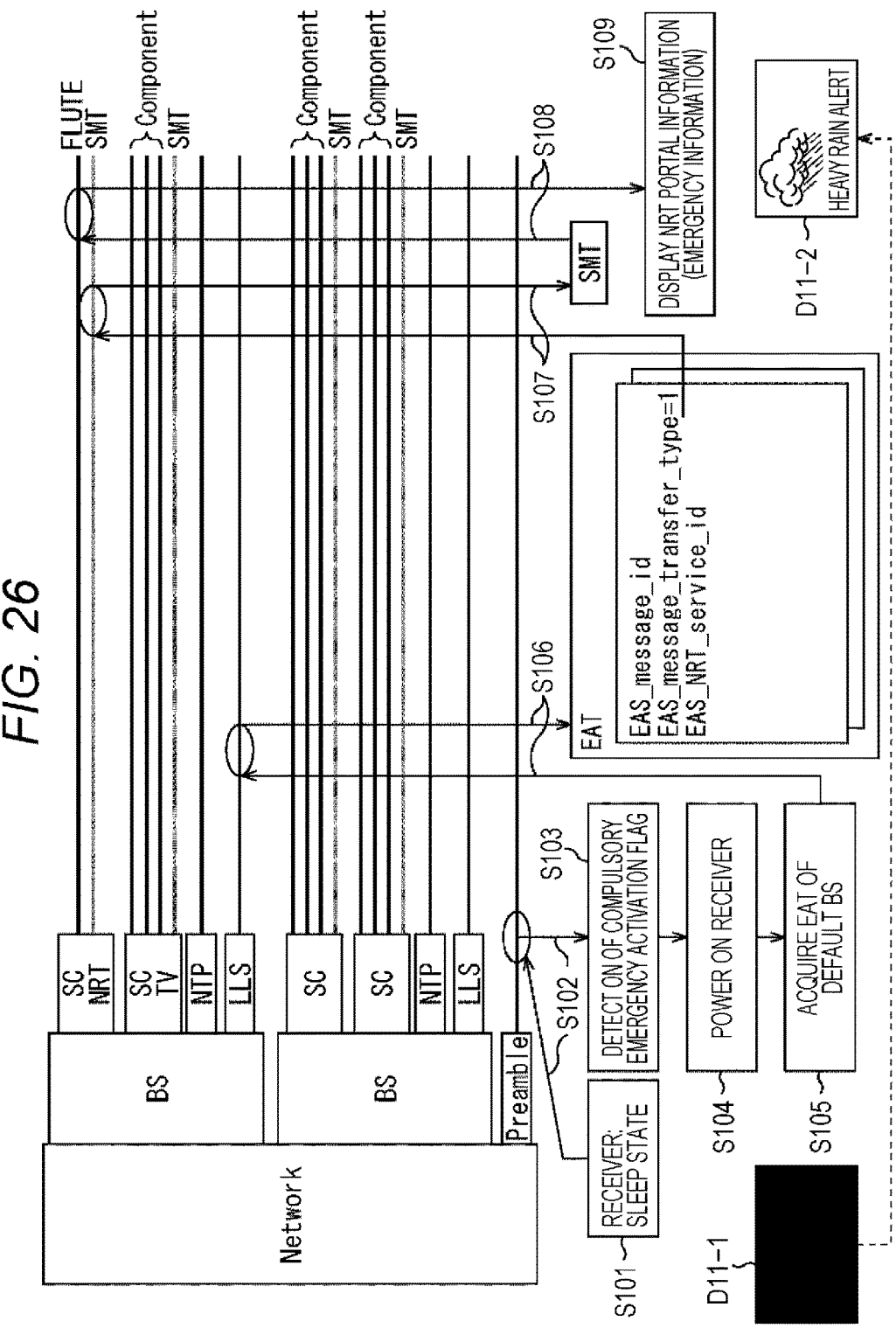
FIG. 26 is a diagram for describing an NRT portal service transmission process in a sleep state.

FIG. 26 is a diagram for describing the NRT portal service transmission process in the receiving device 20 in the sleep state.

As illustrated in FIG. 26, in the broadcast wave of the digital broadcasting using the IP transmission scheme from the transmitting device 10, video data and audio data of television program ("TV" in FIG. 26) are transmitted in a synchronous stream format, and thus an RTP session is used. Further, the emergency information ("NRT" in FIG. 26) for the NRT portal service is transmitted through the FLUTE session. Furthermore, the LLS (the EAT) and the SCS (the SMT) are transmitted in the section format.

Referring to FIG. 26, the receiving device 20 is the sleep state (S101). Here, the receiving device 20 in the sleep state consistently monitors the compulsory emergency activation flag included in the preamble signal (S102), and when the emergency information having the high emergency degree is transmitted, the compulsory emergency activation flag is set to "on." The receiving device 20 is powered on and activated when the compulsory emergency activation flag set to "on" is detected (S103 and S104).

Further, the receiving device 20 acquires the EAT of the section format from the LLS transmitted from a BS set by default (S105 and S106). As illustrated in FIG. 26, since EAS_message_transfer_type="1" is designated in the EAT, the emergency information is transmitted as the NRT portal information of the NRT portal service. Thus, the receiving device 20 performs the tuning process using EAS_NRT_service_id of the EAT and the tuning information, and acquires the SMT (S107).

The receiving device 20 acquires the NRT portal information transmitted through the FLUTE session according to the SMT, and causes the acquired emergency information to be displayed on the display (S108 and S109). Further, the NRT portal information is file data of an HTML format, and displayed by the browser 226.

As described above, in the NRT portal service transmission process of FIG. 26, the receiving device 20 in the sleep state is activated in an emergency situation. Then, the receiving device 20 acquires the EAT of the section format transmitted through the LLS, and acquires the NRT portal information according to the EAT. As a result, the display compulsorily transitions from a state (a black screen) of D11-1 to a state (a screen on which "heavy rain alert" is displayed) of D11-2, and thus a screen of the emergency information transmitted as the NRT portal information is displayed. Accordingly, even the user who is not watching a television program checks the screen of the compulsorily displayed emergency information, and can recognize that a heavy rain alert has been invoked.

(NRT Portal Service Transmission Process in Active State)

Figure 27:
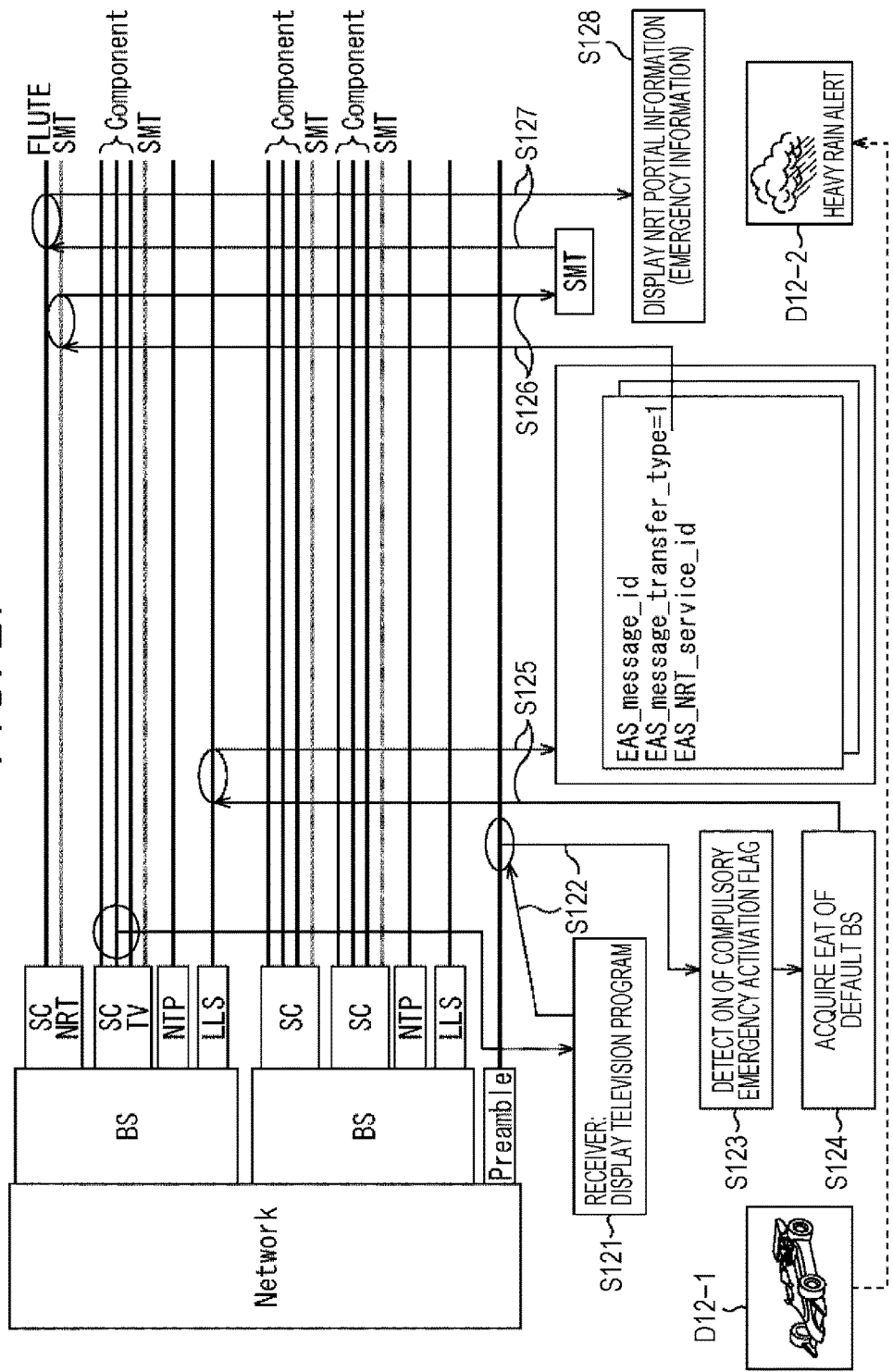
FIG. 27 is a diagram for describing an NRT portal service transmission process in an active state.

FIG. 27 is a diagram for describing the NRT portal service transmission process in the receiving device 20 in the active state.

As illustrated in FIG. 27, in the broadcast wave of the digital broadcasting using the IP transmission scheme from the transmitting device 10, video data and audio data of a television program ("TV" in FIG. 27) is transmitted in a synchronous stream format, and thus an RTP session is used. Further, the emergency information ("NRT" in FIG. 27) for the NRT portal service is transmitted through the FLUTE session. Furthermore, the LLS (the EAT) and the SCS (the SMT) are transmitted in the section format.

In FIG. 27, the receiving device 20 is in the active state and is displaying the television program unlike an operation example of FIG. 26 (S121). Here, the receiving device 20 in the active state consistently monitors the EAT transmitted through the LLS, and acquires the latest EAT from a default BS when the compulsory emergency activation flag included in the preamble signal is detected to be set to "on" (S122 to S125). As illustrated in FIG. 27, EAS_message_transfer_type="1" is designated in the EAT of the section format, and thus the emergency information is transmitted as the NRT portal information of the NRT portal service. Thus, the receiving device 20 performs the tuning process using EAS_NRT_service_id of the EAT and the tuning information, and acquires the SMT (S126).

The receiving device 20 acquires the NRT portal information transmitted through the FLUTE session according to the SMT, and causes the acquired emergency information to be displayed on the display (S127 and S128).

As described above, in the NRT portal service transmission process of FIG. 27, when the compulsory emergency activation flag is detected to be set to "on", the receiving device 20 being displaying the television program acquires the EAT of the section format transmitted through the LLS, and acquires the NRT portal information according to the EAT. As a result, the display compulsorily transitions from a state (a screen on which a television program is displayed) of D12-1 to a state (a screen on which "heavy rain alert" is displayed) of D12-2, and displays the screen of the emergency information transmitted as the NRT portal information.

Here, FIG. 27 illustrates the example in which switching to the screen of the emergency information is compulsorily performed, but, for example, when the emergency degree represented by EA_priority of EA_category of the EAT is high, the screen may be compulsorily switched, but when the emergency degree is low, a message indicating that there is emergency information may be displayed to be superimposed on a television program, and the emergency information may be displayed only when the message is selected. Accordingly, the user who is watching the television program can check the screen of the emergency information according to the emergency degree of the emergency information and recognize that the heavy rain alert has been invoked.

<(4-2) EAS Message Transmission>

Next, the EAS message transmission will be described with reference to FIGS. 28 and 29.

(EAS Message Transmission Process in Sleep State)

Figure 28:
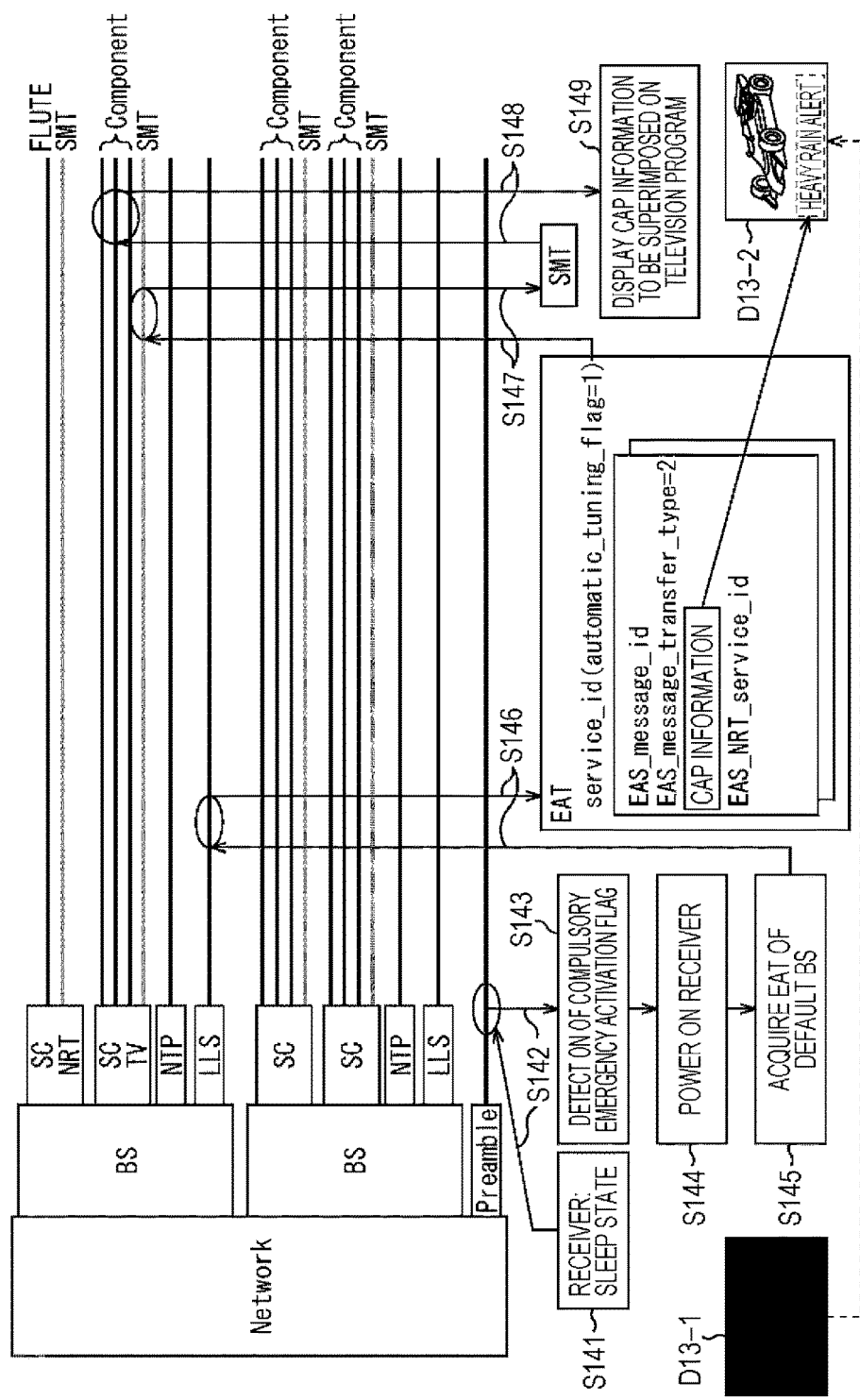
FIG. 28 is a diagram for describing an EAS message transmission process in a sleep state.

FIG. 28 is a diagram for describing the EAS message transmission process in the receiving device 20 in the sleep state.

As illustrated in FIG. 28, in the broadcast wave of the digital broadcasting using the IP transmission scheme from the transmitting device 10, video data and audio data of a television program ("TV" in FIG. 28) is transmitted in a synchronous stream format, and thus an RTP session is used. Further, the emergency information ("NRT" in FIG. 28) for the NRT portal service is transmitted through the FLUTE session. Further, the LLS (the EAT) and the SCS (the SMT) are transmitted in the section format.

Referring to FIG. 28, the receiving device 20 is in the sleep state (S141). Here, the receiving device 20 in the sleep state consistently monitors the compulsory emergency activation flag included in the preamble signal (S142), and is powered on and activated when the compulsory emergency activation flag is detected to be set to "on" (S143 and S144).

The receiving device 20 acquires the EAT of the section format from the LLS transmitted from a BS set by default (S145 and S146). As illustrated in FIG. 28, since EAS_message_transfer_type="2" is designated in the EAT, the emergency information is transmitted as the CAP information included in the EAT. Further, since automatic_tuning_flag="1" is designated in the EAT of FIG. 28, the receiving device 20 performs the tuning process of tuning to a service designated by the triplet (network_id, transport_stream_id, and service_id), and acquires the SMT when the compulsory emergency activation flag is set to "on" (S147).

The receiving device 20 acquires the video data and the audio data transmitted through the RTP session according to the SMT (S148), and displays the CAP information of the EAT to be superimposed on the television program on the display (S149).

As described above, in the EAS message transmission of FIG. 28, the receiving device 20 in the sleep state is activated in an emergency situation. Further, the receiving device 20 acquires the EAT of the section format transmitted through the LLS, and acquires the CAP information and a component of a television program according to the EAT. As a result, the display compulsorily transitions from a state (a black screen) of D13-1 to a state (a screen on which a subtitle (the CAP information) is superimposed on a television program) of D13-2, and displays the screen of the emergency information transmitted as the CAP information. Accordingly, even the user who is not watching a television program can check a subtitle displayed to be compulsorily superimposed on a television program and recognize that a heavy rain alert has been invoked.

(EAS Message Transmission Process in Active State)

Figure 29:
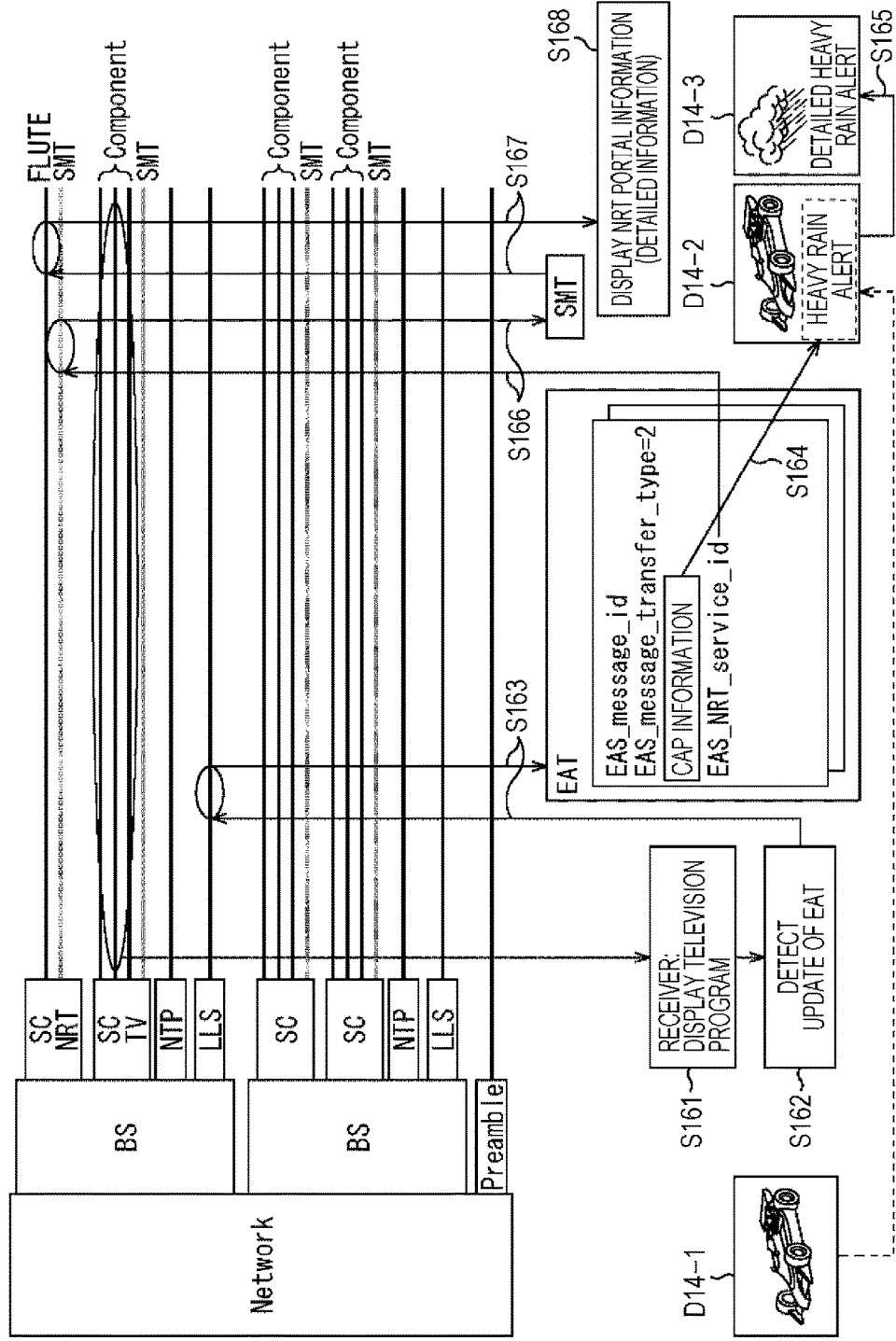
FIG. 29 is a diagram for describing an EAS message transmission process in an active state.

FIG. 29 is a diagram for describing the EAS message transmission process in the receiving device 20 in the active state.

As illustrated in FIG. 29, in the broadcast wave of the digital broadcasting using the IP transmission scheme from the transmitting device 10, video data and audio data of a television program ("TV" in FIG. 29) is transmitted in a synchronous stream format, and thus an RTP session is used. Further, the emergency information ("NRT" in FIG. 29) for the NRT portal service is transmitted through the FLUTE session. Further, the LLS (the EAT) and the SCS (the SMT) are transmitted in the section format.

Referring to FIG. 29, the receiving device 20 is in the active state, and is displaying the television program, unlike the operation example of FIG. 28 (S161). Here, the receiving device 20 in the active state consistently monitors the EAT transmitted through the LLS, and acquires the EAT when the EAT is detected to have been updated (S162 and S163). As illustrated in FIG. 29, EAS_message_transfer_type="2" is designated in the EAT of the section format, and thus the emergency information is transmitted as the CAP information included in the EAT. Thus, the receiving device 20 displays the CAP information of the EAT to be superimposed on the television program being displayed on the display (S164). Accordingly, the user can check a subtitle displayed to be superimposed on a television program and recognize that a heavy rain alert has been invoked.

Here, content of the subtitle may represent only the fact that the heavy rain alert has been invoked or may represent detailed information thereof. To this end, for example, when the user operates a remote controller to give an instruction to display the detailed information (S165), detailed information of the heavy rain alert is displayed as additional information of the emergency information (S166 to S168).

Specifically, the receiving device 20 performs the tuning process using EAS_NRT_service_id of the EAT and the tuning information, and acquires the SMT (S166). The receiving device 20 acquires the NRT portal information transmitted through the FLUTE session according to the SMT, and causes the detailed information of the obtained emergency information to be displayed on the display (S167 and S168).

As described above, in the EAS message transmission of FIG. 29, when the EAT is detected to have been updated, the receiving device 20 being displaying the television program acquires the EAT of the section format transmitted through the LLS, and acquires the CAP information and a component of the television program according to the EAT. As a result, the display transitions from a state (a screen on which a television program is displayed) of D14-1 to a state (a screen on which a subtitle (the CAP information) is superimposed on a television program) of D14-2, and displays the subtitle of the emergency information transmitted as the CAP information. Accordingly, the user who is watching the television program can check a subtitle displayed to be superimposed on a television program and recognize that the heavy rain alert has been invoked.

Further, when the user who has checked the subtitle displayed to be superimposed on the television program desires to know detailed information about the weather, the user performs a certain operation, and thus a screen (a state of D14-3) of the detailed information of the emergency information transmitted as the NRT portal information is displayed. As a result, the user can check the detailed information including information that is hardly expressed by the subtitle and obtain more detailed information about the heavy rain alert.

Further, FIG. 29 has been described in connection with the example in which the detailed information is transmitted as the NRT portal information through the FLUTE session, but, for example, the detailed information may be provided through the web server 70 connected to the Internet 90.

<(4-3) Application Transmission>

Next, the application transmission will be described with reference to FIGS. 30 and 31.

(Application Transmission Process in Sleep State)

Figure 30:
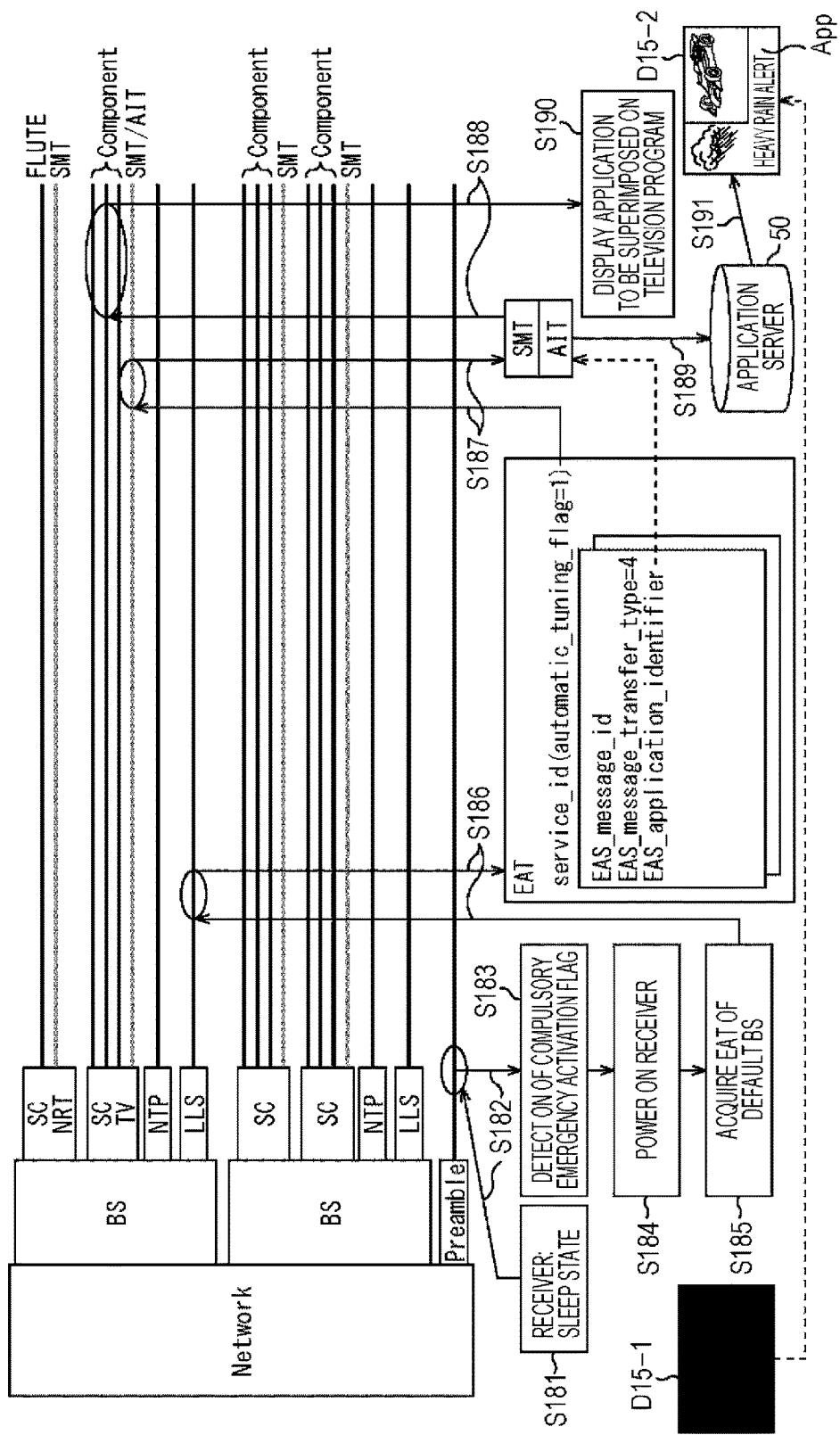
FIG. 30 is a diagram for describing an application transmission process in a sleep state.

FIG. 30 is a diagram for describing the application transmission process in the receiving device 20 in the sleep state.

As illustrated in FIG. 30, in the broadcast wave of the digital broadcasting using the IP transmission scheme from the transmitting device 10, video data and audio data of television program ("TV" in FIG. 30) are transmitted in a synchronous stream format, and thus an RTP session is used. Further, the LLS (the EAT) and the SCS (the SMT and the AIT) are transmitted in the section format. Further, the emergency information ("NRT" in FIG. 30) for the NRT portal service is transmitted through the FLUTE session.

Referring to FIG. 30, the receiving device 20 is in the sleep state (S181). Here, the receiving device 20 in the sleep state consistently monitors the compulsory emergency activation flag included in the preamble signal (S182), and is powered on and activated when the compulsory emergency activation flag is detected to be set to "on" (S183 and S184).

Further, the receiving device 20 acquires the EAT of the section format from the LLS transmitted from a BS set by default (S 185 and S 186). As illustrated in FIG. 30, EAS_message_transfer_type="4" is designated in the EAT, and thus the emergency information is transmitted as the emergency notification application. Further, since automatic_tuning_flag="1" is designated in the EAT of FIG. 30, when the compulsory emergency activation flag is set to "on," the receiving device 20 performs the tuning process of tuning to a service designated by the triplet, and acquires the SMT and the AIT (S187).

The receiving device 20 acquires the video data and the audio data transmitted through the RTP session according to the SMT (S188). Further, the receiving device 20 acquires a uniform resource locator (URL) for acquiring an application corresponding to EAS_application_identifier of the EAT with reference to the AIT, accesses the application server 50 via the Internet 90, and acquires the emergency notification application (S189).

Then, the receiving device 20 causes the emergency notification application acquired from the application server 50 to be displayed on the display to be superimposed on the television program according to the acquired video data and the audio data (S190 and S191).

As described above, in the application transmission process of FIG. 30, the receiving device 20 in the sleep state is activated in an emergency situation. Further, the receiving device 20 acquires the EAT of the section format transmitted through the LLS, and acquires the component of the television program and the emergency notification application according to the EAT. As a result, the display compulsorily transitions from a state (a black screen) of D15-1 to a state (a screen on which the emergency notification application is superimposed on the television program) of D15-2, and displays the screen of the emergency information transmitted as the emergency notification application. Accordingly, even the user who is not watching a television program can check the emergency notification application displayed to be compulsorily superimposed on the television program and recognize that the heavy rain alert has been invoked.

Further, in the state of D15-2 of FIG. 30, the emergency notification application is displayed in a letter "L" form in the television program, but any other display form may be employed, for example, the application may be displayed in an overlay manner. Further, the emergency notification application may be transmitted through the FLUTE session.

Further, in the example of FIG. 30, the AIT has been described as the application control information, but instead of the AIT, trigger information may be used. The trigger information is control information including a command for controlling an operation of an application, and arranged in video data or audio data and then transmitted, for example.

(Application Transmission Process in Active State)

Figure 31:
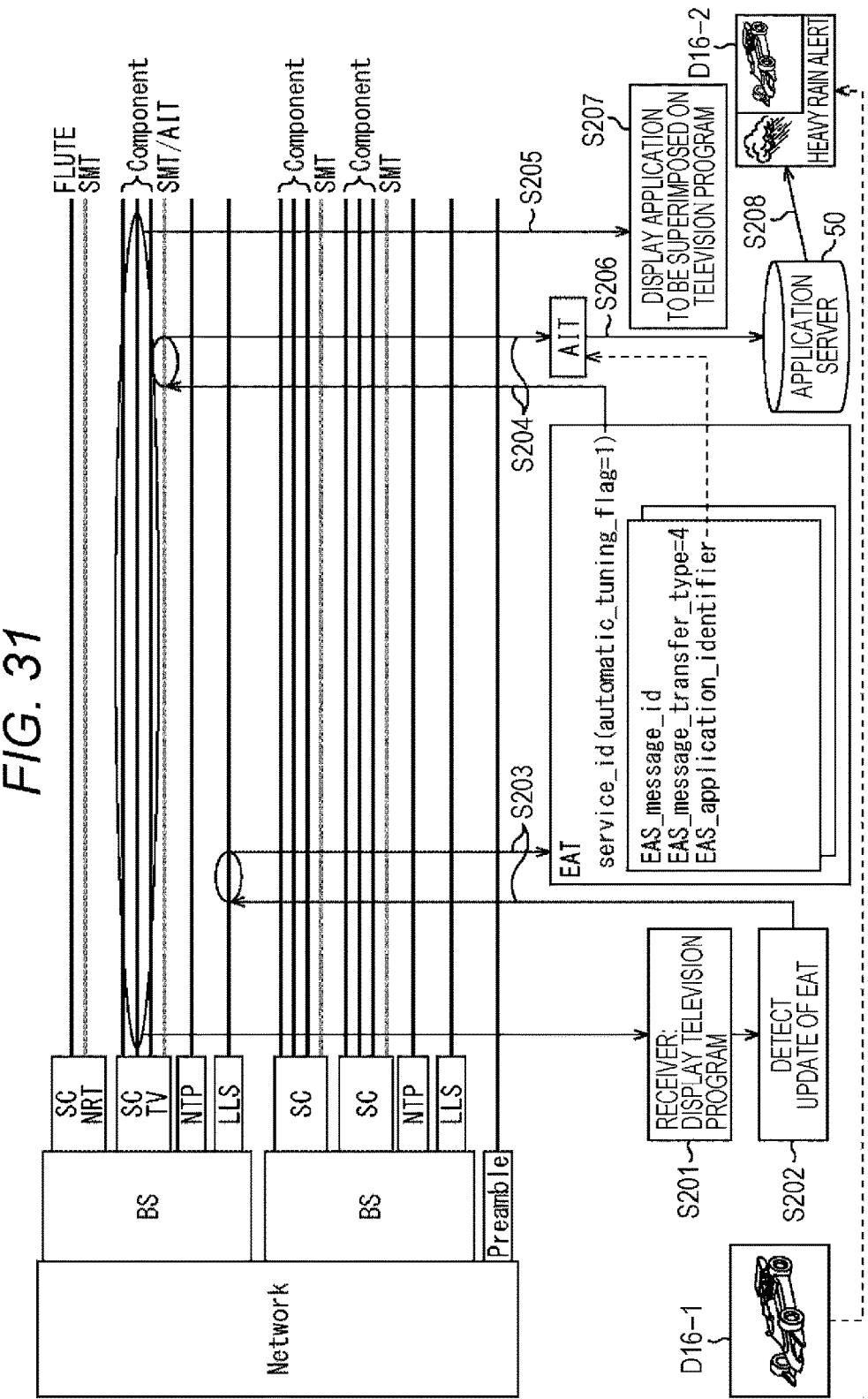
FIG. 31 is a diagram for describing an application transmission process in an active state.

FIG. 31 is a diagram for describing the application transmission process in the receiving device 20 in the active state.

As illustrated in FIG. 31, in the broadcast wave of the digital broadcasting using the IP transmission scheme from the transmitting device 10, video data and audio data of television program ("TV" in FIG. 31) are transmitted in a synchronous stream format, and thus an RTP session is used. Further, the LLS (the EAT) and the SCS (the SMT and the AIT) are transmitted in the section format. Further, the emergency information ("NRT" in FIG. 31) for the NRT portal service is transmitted through the FLUTE session.

In FIG. 31, the receiving device 20 is in the active state and is displaying the television program unlike an operation example of FIG. 30 (S201). Here, the receiving device 20 in the active state consistently monitors the EAT transmitted through the LLS, and acquires the EAT when the EAT is detected to have been updated (S202 and S203). As illustrated in FIG. 31, EAS_message_transfer_type="4" is designated in the EAT of the section format, and thus the emergency information is transmitted as the emergency notification application. Further, since automatic_tuning_flag="1" is designated in the EAT of FIG. 31, when the compulsory emergency activation flag is set to "on," the receiving device 20 performs the tuning process of tuning to a service designated by the triplet, and acquires the AIT (S204).

The receiving device 20 acquires a URL at which an application corresponding to EAS_application_identifier of the EAT is acquired with reference to the AIT, accesses the application server 50 via the Internet 90, and acquires the emergency notification application (S206). Then, the receiving device 20 causes the emergency notification application acquired from the application server 50 to be displayed on the display to be superimposed on the television program being displayed (S205, S207, and S208).

As described above, in the application transmission process of FIG. 31, when the EAT is detected to have been updated, the receiving device 20 being displaying the television program acquires the EAT of the section format transmitted through the LLS, and acquires the emergency notification application according to the EAT. As a result, the display transitions from a state (a screen on which a television program is displayed) of D16-1 to a state (a screen on which the emergency notification application is superimposed on the television program) of D16-2, and displays the screen of the emergency information transmitted as the application. Accordingly, the user who is watching the television program can check the emergency notification application displayed to be superimposed on the television program in the letter L shape and recognize that the heavy rain alert has been invoked.

Further, in order to activate the emergency notification application when another application is in the active state, the emergency notification application is activated after ending another application in the active state.

<(4-4) Shared Component Service Transmission>

Next, the shared component service transmission will be described with reference to FIGS. 32 and 33.

(Shared Component Service Transmission Process in Active State)

Figure 32:
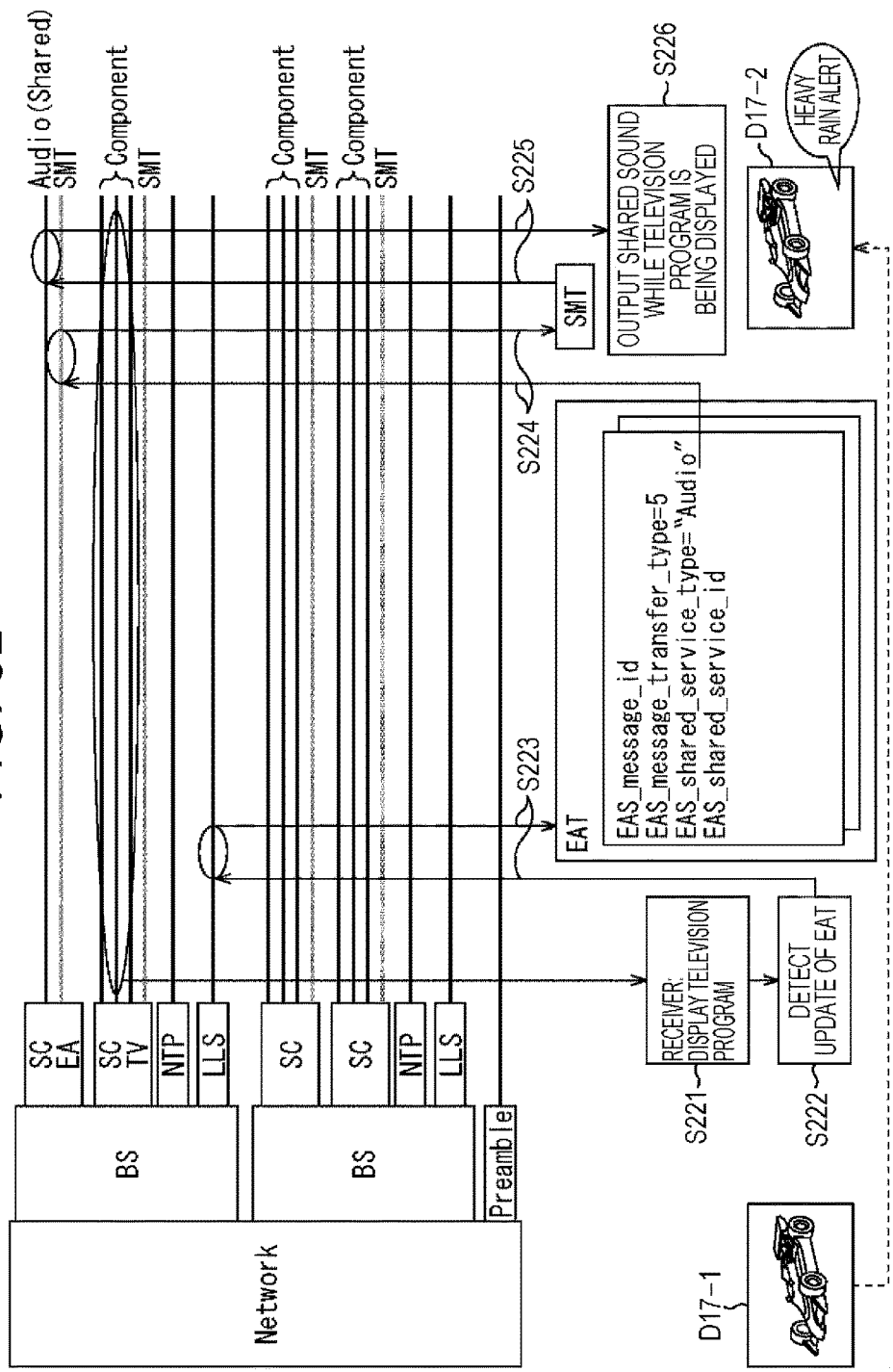
FIG. 32 is a diagram for describing a shared component service transmission process.

FIG. 32 is a diagram for describing the shared component service transmission process.

As illustrated in FIG. 32, in the broadcast wave of the digital broadcasting using the IP transmission scheme from the transmitting device 10, video data and audio data of a television program ("TV" in FIG. 32) is transmitted in a synchronous stream format, and thus an RTP session is used. Further, shared audio data for emergency notification is transmitted through an RTP session. Further, the LLS (the EAT) and the SCS (the SMT) are transmitted in the section format.

Referring to FIG. 32, the receiving device 20 is in the active state and is displaying the television program (S221). Here, the receiving device 20 in the active state consistently monitors the EAT transmitted through the LLS, and acquires the EAT when the EAT is detected to have been updated (S222 and S223). As illustrated in FIG. 32, EAS_message_transfer_type="5" is designated in the EAT of the section format, and thus the emergency information is transmitted through a shared component service.

In other words, in the EAT of FIG. 32, since "Audio" is designated as EAS_shared_service_type, shared audio data for emergency notification is provided as the emergency information, and thus the receiving device 20 performs the tuning process using EAS_shared_service_id of the EAT and the tuning information, and acquires the SMT (S244). Further, the receiving device 20 acquires the shared audio data for emergency notification transmitted through the RTP session according to the SMT, and outputs a shared sound of the emergency information while the television program is being displayed (S225 and S226). Here, for example, while the television program is being displayed, only a sound is switched, and a sound such as "heavy rain alert" is output as a sub sound.

As described above, in the application transmission process of FIG. 32, when the EAT is detected to have been updated, the receiving device 20 being displaying the television program acquires the EAT of the section format transmitted through the LLS, and acquires the shared audio data for emergency notification according to the EAT. As a result, even when transition from a state of D17-1 to a state of D17-2 is performed, the display continuously displays the television program, and only a sound is switched so that a sound such as "heavy rain alert" is output as the emergency information. Accordingly, the user who is watching the television program can check the sound of the emergency information and recognize that the heavy rain alert has been invoked while continuously watching the television program.

Figure 33:
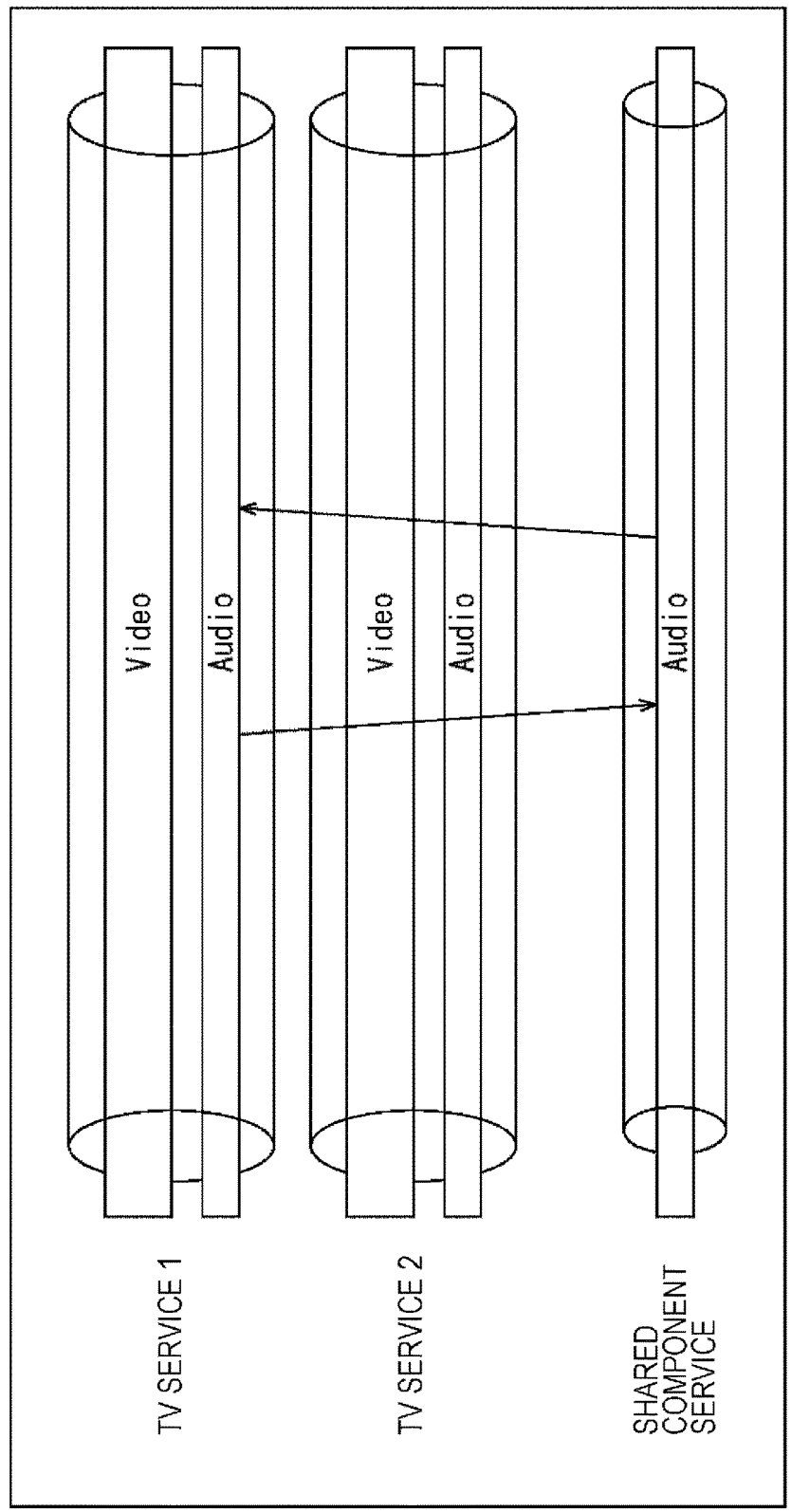
FIG. 33 is a diagram illustrating an exemplary shared component service.

FIG. 33 is a diagram illustrating an exemplary shared component service.

As illustrated in FIG. 33, a TV service 1 and a TV service 2 are different services, but have the same audio data for emergency notification given in an emergency situation, and thus the TV service 1 and the TV service 2 can be provided by a common shared component service.

Specifically, in the TV service 1, in an emergency situation, the sound is switched from audio data of the TV service 1 to audio data of a common shared component service. As a result, while the television program of the TV service 1 is being displayed, the emergency information based on the audio data of the shared component service is output as a sound. Then, when the output of the sound of the emergency information ends, in the TV service 1, switching from the audio data of the shared component service to the audio data of the TV service 1 is performed.

Similarly, in the TV service 2, in an emergency situation, the sound is switched from audio data of the TV service 2 to the audio data of the common shared component service. As a result, while the television program of the TV service 2 is being displayed, the emergency information based on the audio data of the shared component service is output as the sound. Then, when the output of the sound of the emergency information ends, in the TV service 2, switching from the audio data of the shared component service to the audio data of the TV service 2 is performed.

Further, in the example of FIG. 33, one audio data has been described as a shared component transmitted as a shared service as an example, but the shared component is not limited to the audio data, and, for example, any other component such as video data or subtitle data may be used as a shared component as long as the component is sharable among a plurality of services. Further, a plurality of shared components may be transmitted as a shared component transmitted as a shared service.

<(5) Content of Concrete Process Executed in Each Device>

Next, content of the concrete processes executed by the devices configuring the broadcasting system 1 of FIG. 20 will be described with reference to FIGS. 34 to 40.

(Transmission Process)

Figure 34:
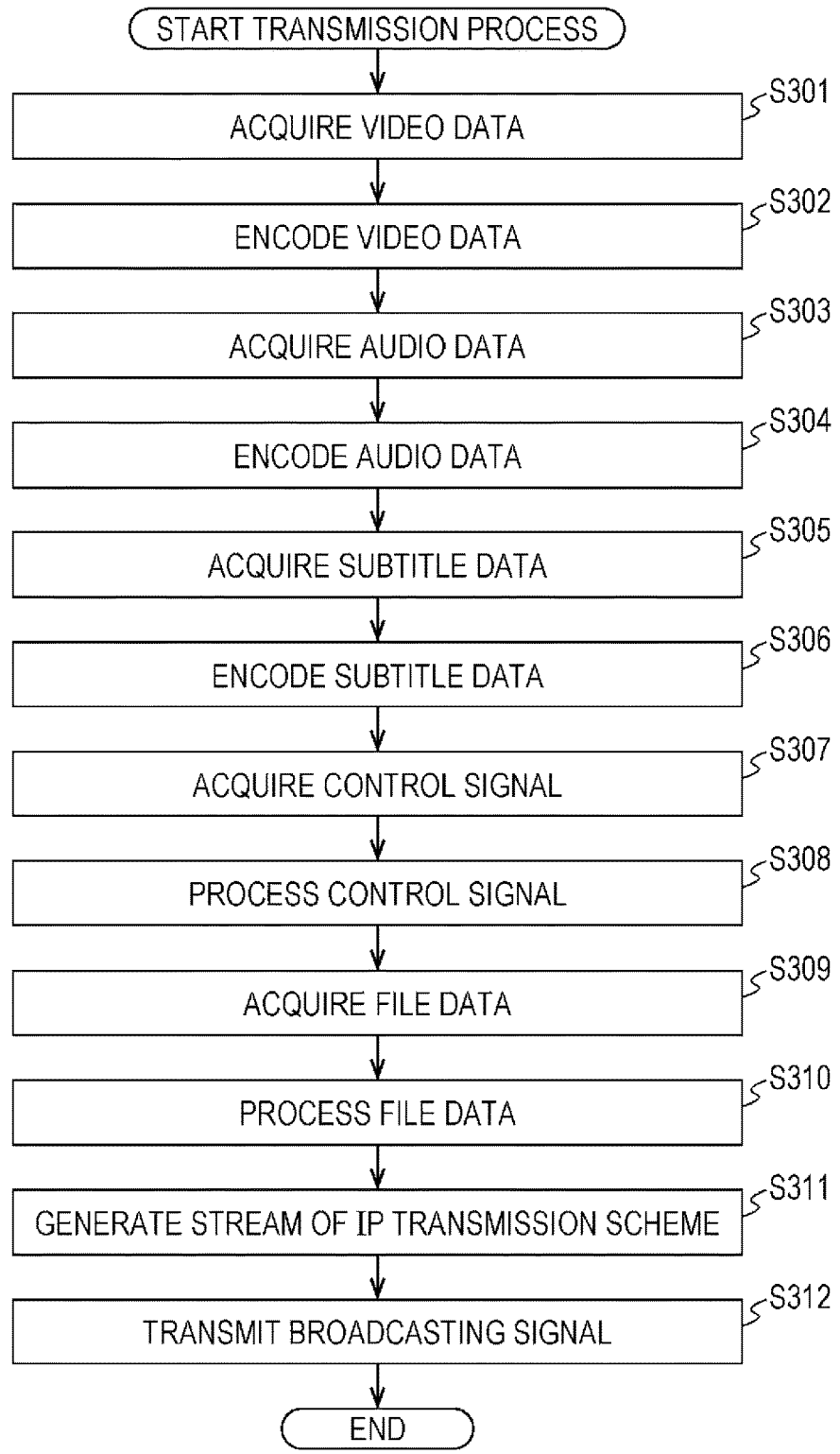
FIG. 34 is a flowchart for describing a transmission process.

First, a transmission process executed by the transmitting device 10 of FIG. 20 will be described with reference to a flowchart of FIG. 34.

In step S301, the video data acquiring unit 111 acquires video data, and provides the video data to the video encoder 112. In step S302, the video encoder 112 encodes the video data provided from the video data acquiring unit 111, and provides the encoded video data to the Mux 121.

In step S303, the audio data acquiring unit 113 acquires audio data, and provides the audio data to the audio encoder 114. In step S304, the audio encoder 114 encodes the audio data provided from the audio data acquiring unit 113, and provides the encoded audio data to the Mux 121.

In step S305, the subtitle data acquiring unit 115 acquires subtitle data, and provides the subtitle data to the subtitle encoder 116. In step S306, the subtitle encoder 116 encodes the subtitle data provided from the subtitle data acquiring unit 115, and provides the encoded subtitle data to the Mux 121.

In step S307, the control signal acquiring unit 117 acquires the control signal such as the SCS or the LLS, and provides the control signal to the control signal processing unit 118. In step S308, the control signal processing unit 118 performs certain signal processing on the control signal provided from the control signal acquiring unit 117, and provides resultant data to the Mux 121.

In step S309, when data of an asynchronous file format is transmitted, the file data acquiring unit 119 acquires, for example, the NRT content or file data such as an application, and provides the acquired data to the file processing unit 120. In step S310, the file processing unit 120 performs certain signal processing on the file data provided from the file data acquiring unit 119, and provides resultant data to the Mux 121.

In step S311, the Mux 121 generates a stream of the IP transmission scheme by multiplexing the video data received from the video encoder 112, the audio data received from the audio encoder 114, the subtitle data received from the subtitle encoder 116, the control signal received from the control signal processing unit 118, and the file data received from the file processing unit 120, and provides the stream of the IP transmission scheme to the transmitting unit 122.

In step S312, the transmitting unit 122 transmits the stream provided from the Mux 121 as a broadcasting signal through the antenna 123. When the process of step S312 ends, the transmission process ends.

The transmission process has been described so far.

(Reception Process)

Figure 35:
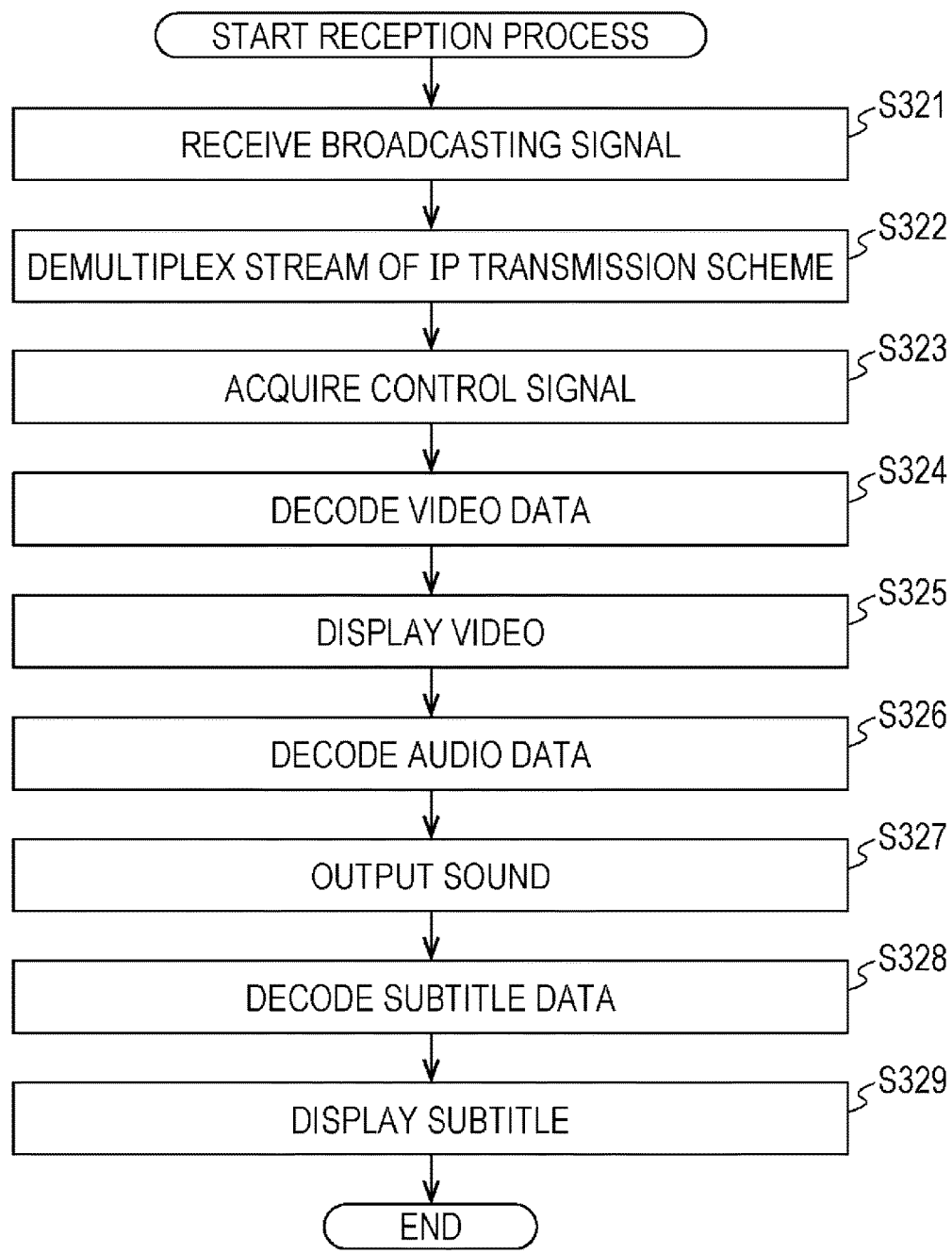
FIG. 35 is a flowchart for describing a reception process.

Next, the reception process executed by the receiving device 20 of FIG. 20 will be described with reference to a flowchart of FIG. 35. The reception process is executed when the receiving device 20 is activated and tuned to a desired channel by a remote controller operated by the user.

In step S321, the tuner 212 receives a broadcasting signal through the antenna 211, and demodulates the broadcasting signal. In step S322, the Demux 213 demultiplexes the stream of the IP transmission scheme demodulated by the tuner 212 into a control signal, video data, audio data, subtitle data, and the like.

In step S323, the control signal processing unit 222 acquires the control signal demultiplexed by the Demux 213. The control signal processing unit 222 controls the operations of the respective units based on the control signal.

In step S324, the video decoder 215 decodes the video data demultiplexed by the Demux 213, and provides the decoded video data to the video output unit 216. In step S325, the video output unit 216 outputs the video data provided from the video decoder 215, and causes video to be displayed on the display.

In step S326, the audio decoder 217 decodes the audio data demultiplexed by the Demux 213, and provides the decoded audio data to the audio output unit 218. In step S327, the audio output unit 218 outputs the audio data provided from the audio decoder 217, and causes a sound to be output through the speaker.

In step S328, when the subtitle data is demultiplexed by the Demux 213, the subtitle decoder 219 decodes the subtitle data, and provides the decoded subtitle data to the video output unit 216. In step S329, the video output unit 216 outputs the subtitle data provided from the subtitle decoder 219, and causes a subtitle to be displayed to be superimposed the video displayed on the display. When the process of step S329 ends, the reception process ends.

The reception process has been described so far.

(Emergency Notification Process)

Next, the emergency notification process executed by the receiving device 20 of FIG. 20 will be described with reference to a flowchart of FIG. 36. The emergency notification process is executed to notify the emergency information such as the heavy rain alert when the receiving device 20 is in the sleep state, the active state, or the like.

In step S341, it is determined whether or not the receiving device 20 is in the sleep state. In step S341, when the receiving device 20 is determined to be in the sleep state, the process proceeds to step S342.

In step S342, the emergency notification control unit 224 monitors the tuner 212, and determines whether or not the compulsory emergency activation flag included in the preamble signal is detected to be set to "on." When the compulsory emergency activation flag is detected to be set to "on" in step S342, the process proceeds to step S343, and the receiving device 20 is powered on. When the receiving device 20 is powered on, the process proceeds to step S344.

Further, when the compulsory emergency activation flag is detected to be not set to "on" in step S342, the process returns to step S341, and the above-described process is repeated. In other words, the receiving device 20 in the sleep state is on standby until the compulsory emergency activation flag is set to on, and thereafter powered on. Further, when the receiving device 20 is determined to be not in the sleep state in step S341, that is, the receiving device 20 is in the active state and displaying a television program, steps S342 to S343 are skipped, and the process proceeds to step S344.

In step S344, the emergency notification control unit 224 acquires the EAT of the section format transmitted through the LLS. The EAT is considered to be acquired, for example, directly after the receiving device 20 in the sleep state is powered on, when the compulsory emergency activation flag is detected to be set to "on," when the EAT is updated, or the like.

In step S345, the emergency notification control unit 224 checks EAS_message_transfer_type of the EAT of the section format acquired in the process of step S344.

In step S346, the emergency notification control unit 224 determines whether or not EAS_message_transfer_type is "1" in the check process of step S345. When EAS_message_transfer_type is determined to be "1" in step S346, the process proceeds to step S347.

In step S347, the emergency notification control unit 224 executes the NRT portal service transmission process. The NRT portal service transmission process corresponds to the operation example illustrated in FIGS. 26 and 27, and content of a detailed process thereof which will be described later with reference to a flowchart of FIG. 37.

Further, when EAS_message_transfer_type is determined to be not "1" in step S346, the process proceeds to step S348. In step S348, the emergency notification control unit 224 determines whether or not EAS_message_transfer_type is "2" in the check process of step S345. When EAS_message_transfer_type is determined to be "2" in step S348, the process proceeds to step S349.

In step S349, the emergency notification control unit 224 executes the EAS message transmission process. The EAS message transmission process corresponds to the operation example illustrated in FIGS. 28 and 29, and content of a detailed process thereof which will be described later with reference to a flowchart of FIG. 38.

Further, when EAS_message_transfer_type is determined to be not "2" in step S348, the process proceeds to step S350. In step S350, the emergency notification control unit 224 determines whether or not EAS_message_transfer_type is "4" in the check process of step S345. When EAS_message_transfer_type is determined to be "4" in step S350, the process proceeds to step S351.

In step S351, the emergency notification control unit 224 executes the application transmission process. The application transmission process corresponds to the operation example illustrated in FIGS. 30 and 31, and content of a detailed process thereof which will be described later with reference to a flowchart of FIG. 39.

Further, when EAS_message_transfer_type is determined to be not "4" in step S350, the process proceeds to step S352. In step S352, the emergency notification control unit 224 determines whether or not EAS_message_transfer_type is "5" in the process of step S345. When EAS_message_transfer_type is determined to be "5" in step S352, the process proceeds to step S353.

In step S353, the emergency notification control unit 224 executes the shared component service transmission process. The shared component service transmission process corresponds to the operation example illustrated in FIG. 32, and content of a detailed process thereof which will be described later with reference to a flowchart of FIG. 40.

Further, when EAS_message_transfer_type is determined to be not "5" in step S352, the process proceeds to step S354. In step S354, the emergency notification control unit 224 executes other processes corresponding to EAS_message_transfer_type. For example, when EAS_message_transfer_type is "3," the stream transmission process is executed.

When any one of steps S347, S349, S351, S353, and S354 ends, the emergency notification process ends.

The emergency notification process has been described so far.

(NRT Portal Service Transmission Process)

Next, the NRT portal service transmission process corresponding to step S347 of FIG. 36 will be described with reference to a flowchart of FIG. 37.

In step S361, the control signal processing unit 222 acquires the SMT based on the EAT according to control of the emergency notification control unit 224.

In step S362, the FLUTE processing unit 220 acquires the NRT portal information (the emergency information) transmitted through the FLUTE session based on the SMT received from the control signal processing unit 222 according to control of the emergency notification control unit 224.

In step S363, the browser 226 causes the NRT portal information (the emergency information) received from the FLUTE processing unit 220 to be displayed on the display through the video output unit 216 according to control of the emergency notification control unit 224. As a result, the emergency information of the heavy rain alert or the like is displayed on the display.

Figure 36:
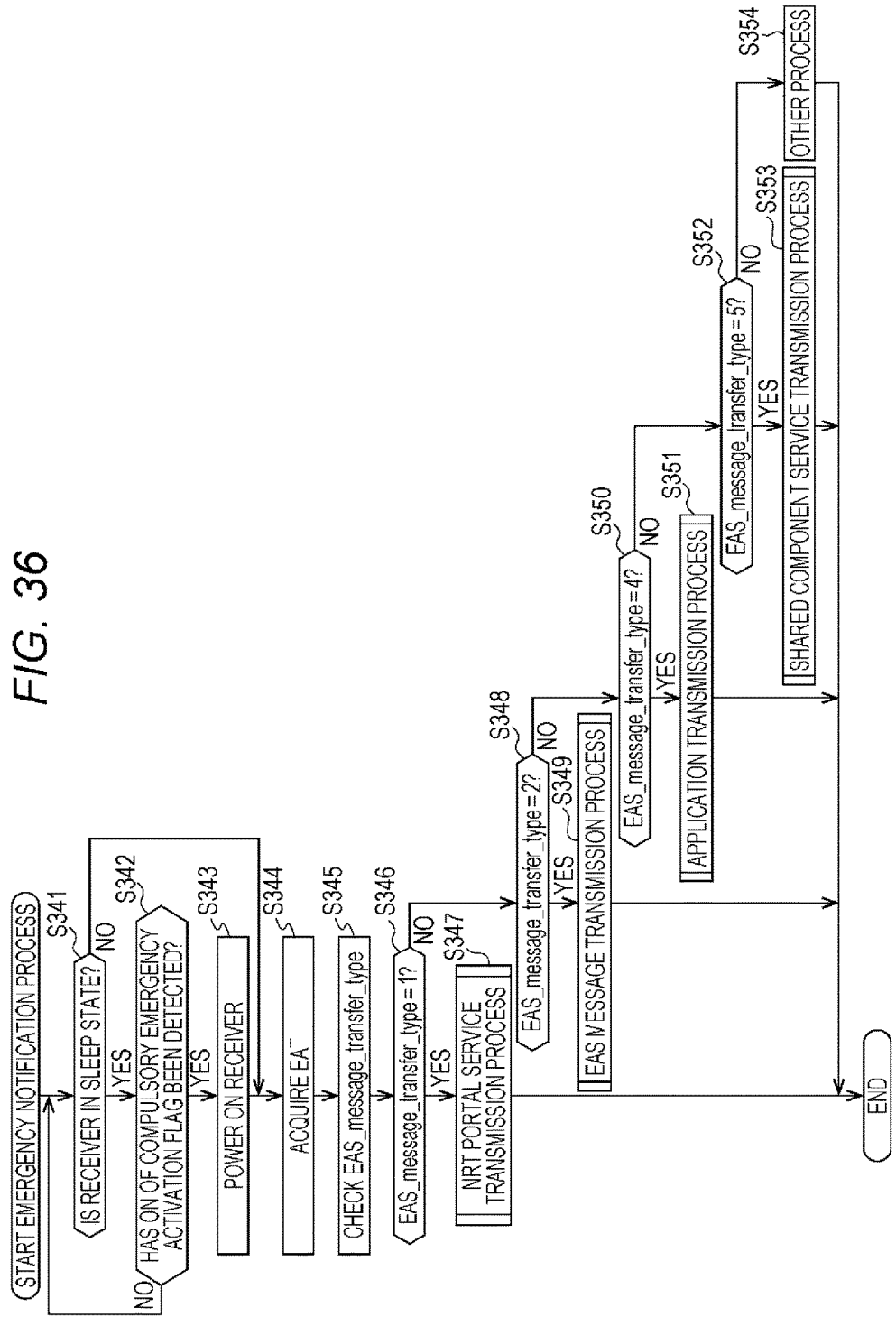
FIG. 36 is a flowchart for describing an emergency notification process.
Figure 37:
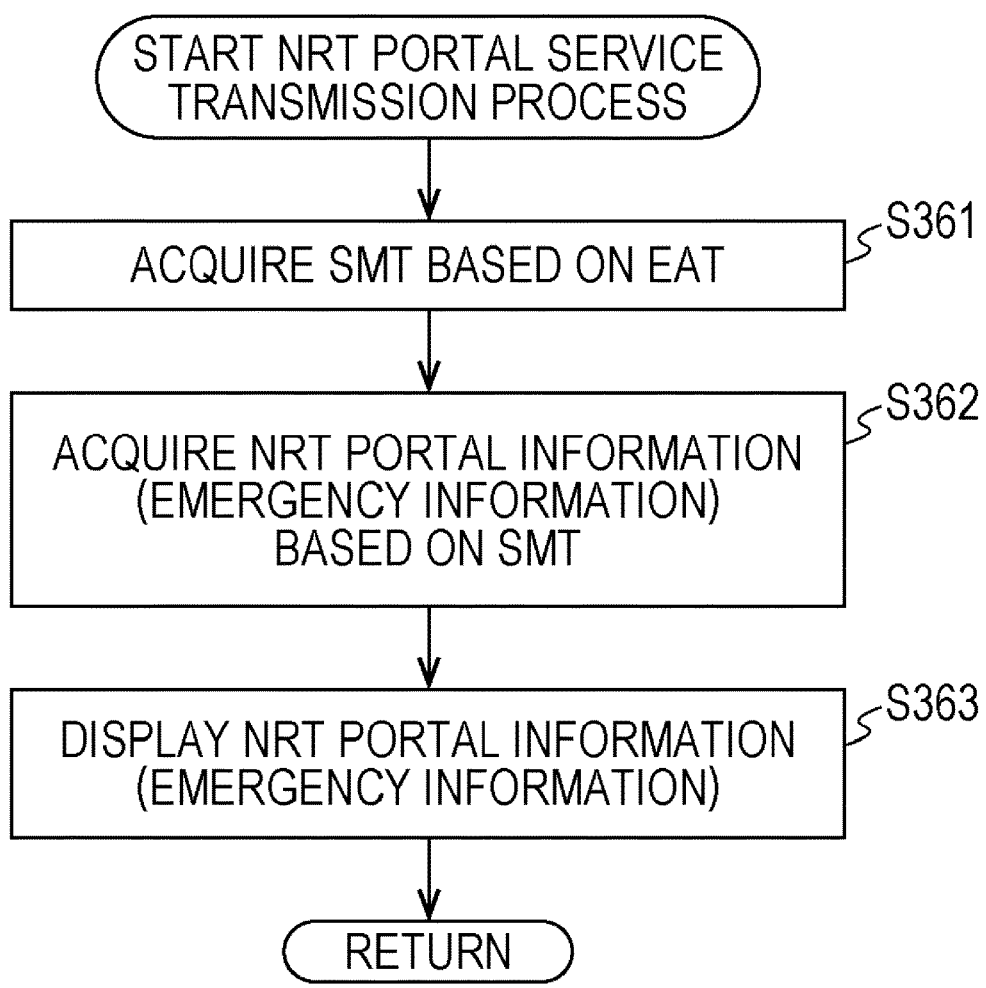
FIG. 37 is a flowchart for describing an NRT portal service transmission process.

When the process of step S363 ends, the process returns to step S347 of FIG. 36, and the process subsequent thereto is executed.

The NRT portal service transmission process has been described so far.

(EAS Message Transmission Process)

Figure 38:
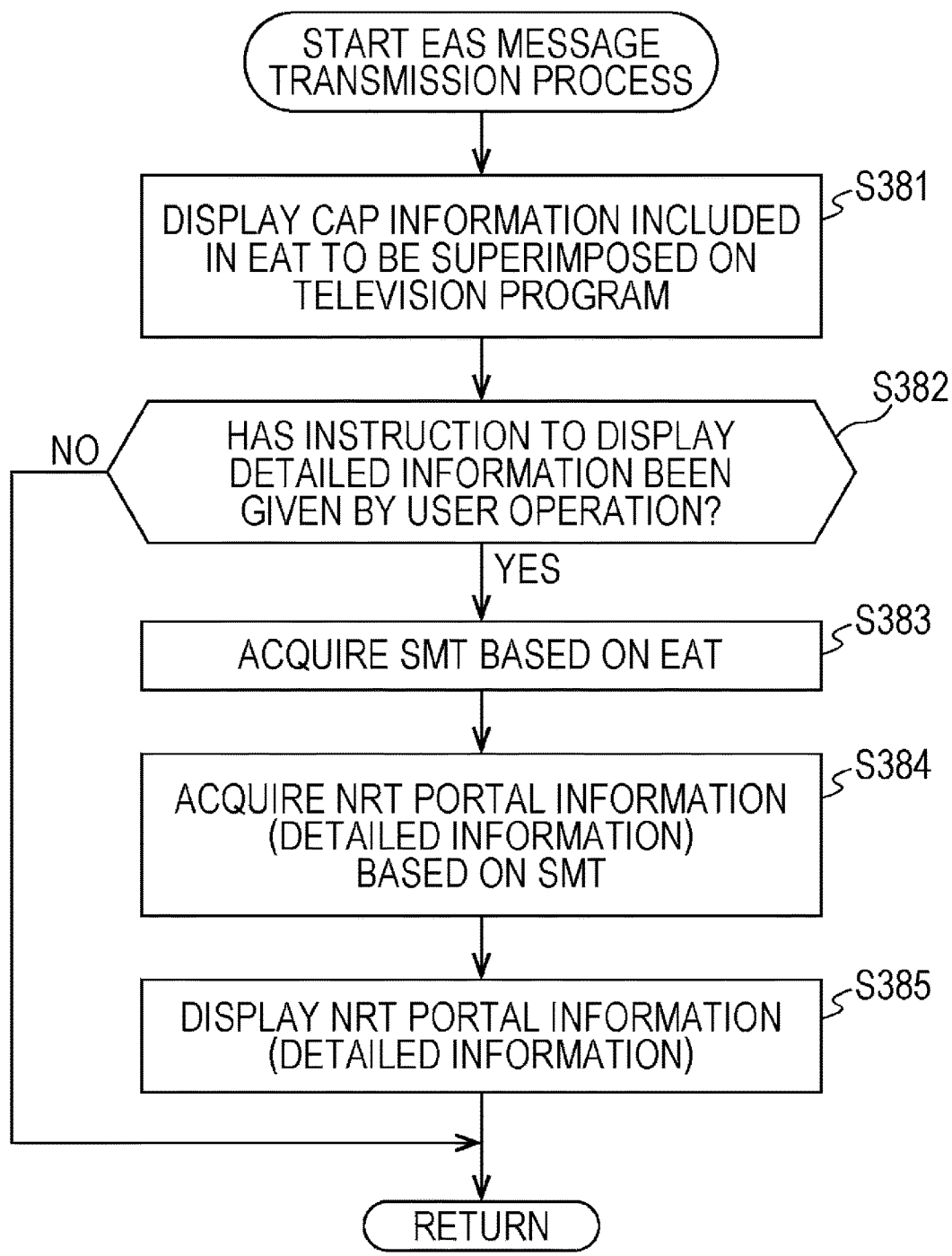
FIG. 38 is a flowchart for describing an EAS message transmission process.

Next, the EAS message transmission process corresponding to step S349 of FIG. 36 will be described with reference to a flowchart of FIG. 38. Here, when the receiving device 20 is in the sleep state, the power is turned on, but since "1" is designated as automatic_tuning_flag of the EAT, the tuning process of turning to a service designated by a triplet is assumed to be performed.

In step S381, the emergency notification control unit 224 causes the CAP information included in the EAT to be displayed on the display to be superimposed on the television program through the video output unit 216. As a result, the subtitle (the emergency information) of the heavy rain alert or the like is displayed to be superimposed on the television program.

In step S382, it is determined whether or not an instruction to display the detailed information has been given by the remote controller operated by the user. When the instruction to display the detailed information is determined to have been given in step S382, the process proceeds to step S383.

In step S383, the control signal processing unit 222 acquires the SMT based on the EAT according to control of the emergency notification control unit 224.

In step S384, the FLUTE processing unit 220 acquires the NRT portal information (the detailed information) transmitted through the FLUTE session based on the SMT received from the control signal processing unit 222 according to control of the emergency notification control unit 224.

In step S385, the browser 226 causes the NRT portal information (the detailed information) received from the FLUTE processing unit 220 to be displayed on the display through the video output unit 216 according to control of the emergency notification control unit 224. As a result, the detailed information of the heavy rain alert or the like is displayed on the display the additional information of the emergency information.

Further, when the instruction to display the detailed information is determined to have not been given in step S382, the process of step S383 to S385 is skipped. Then, when the process of step S385 ends, the process returns to step S349 of FIG. 36, and the process subsequent thereto is executed.

The EAS message transmission process has been described so far.

(Application Transmission Process)

Figure 39:
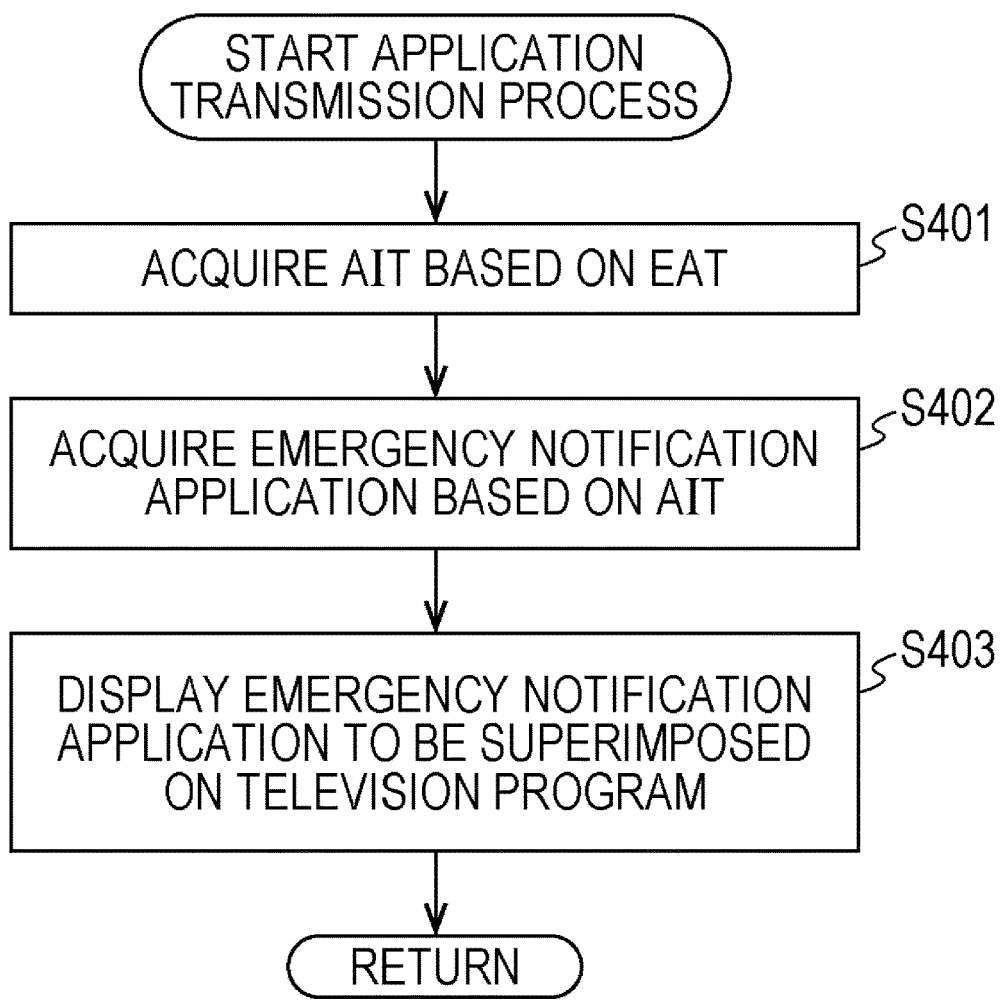
FIG. 39 is a flowchart for describing an application transmission process.

Next, the application transmission process corresponding to step S351 of FIG. 36 will be described with reference to a flowchart of FIG. 39. Here, when the receiving device 20 is in the sleep state, the power is turned on, but since "1" is designated as automatic_tuning_flag of the EAT, the tuning process of turning to a service designated by a triplet is assumed to be performed.

In step S401, the control signal processing unit 222 acquires the AIT based on the EAT according to control of the emergency notification control unit 224. Further, the emergency notification control unit 224 acquires a URL for acquiring the emergency notification application corresponding to EAS_application_identifier of the EAT with reference to the AIT.

In step S402, the communication I/F 225 accesses the application server 50 via the Internet 90 based on the URL for acquiring the emergency notification application according to control of the emergency notification control unit 224, and acquires the emergency notification application.

In step S403, the browser 226 causes the emergency notification application received from the communication I/F 225 to be displayed on the display to be superimposed on the television program through the video output unit 216 according to control of the emergency notification control unit 224. As a result, the emergency information such as the heavy rain alert is displayed in the letter L shape in the television program.

When the process of step S403 ends, the process returns to step S351 of FIG. 36, and the process subsequent thereto is executed.

The application transmission process has been described so far.

(Shared Component Service Transmission Process)

Figure 40:
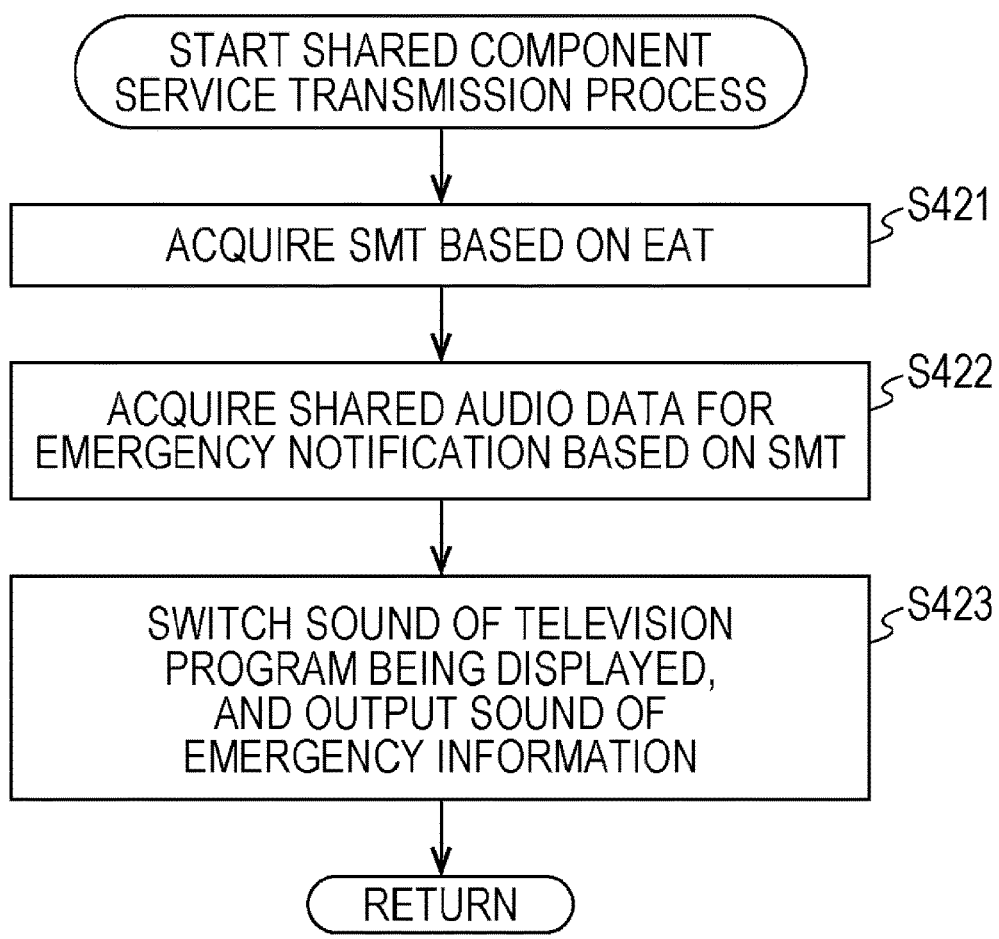
FIG. 40 is a flowchart for describing a shared component service transmission process.

Next, the shared component service transmission process corresponding to step S353 of FIG. 36 will be described with reference to a flowchart of FIG. 40. Here, "Audio" is assumed to be designated as EAS_shared_service_type of the EAT, and shared audio data for emergency notification is assumed to be displayed as the emergency information.

In step S421, the control signal processing unit 222 acquires the SMT based on the EAT according to control of the emergency notification control unit 224.

In step S422, the audio decoder 217 acquires shared audio data for emergency notification from the Demux 213 based on the SMT according to control of the emergency notification control unit 224. Further, the audio decoder 217 decodes the shared audio data for emergency notification according to control of the emergency notification control unit 224, and provides the decoded shared audio data for emergency notification to the audio output unit 218.

In step S423, the audio output unit 218 performs switching from the sound of the television program to the shared audio data for emergency notification according to control of the emergency notification control unit 224, and outputs the sound of the emergency information through the speaker. As a result, for example, while the television program is being displayed, only the sound is switched, and a sound such as "heavy rain alert" is output.

When the process of step S423 ends, the process returns to step S353 of FIG. 36, and the process subsequent thereto is executed.

The shared component service transmission process has been described so far.

<2. Digital Broadcasting According to IP Transmission Scheme of XML Format>

Next, the IP transmission scheme of the XML format will be described.

(Protocol Stack in IP Transmission Scheme of XML Format)

Figure 41:
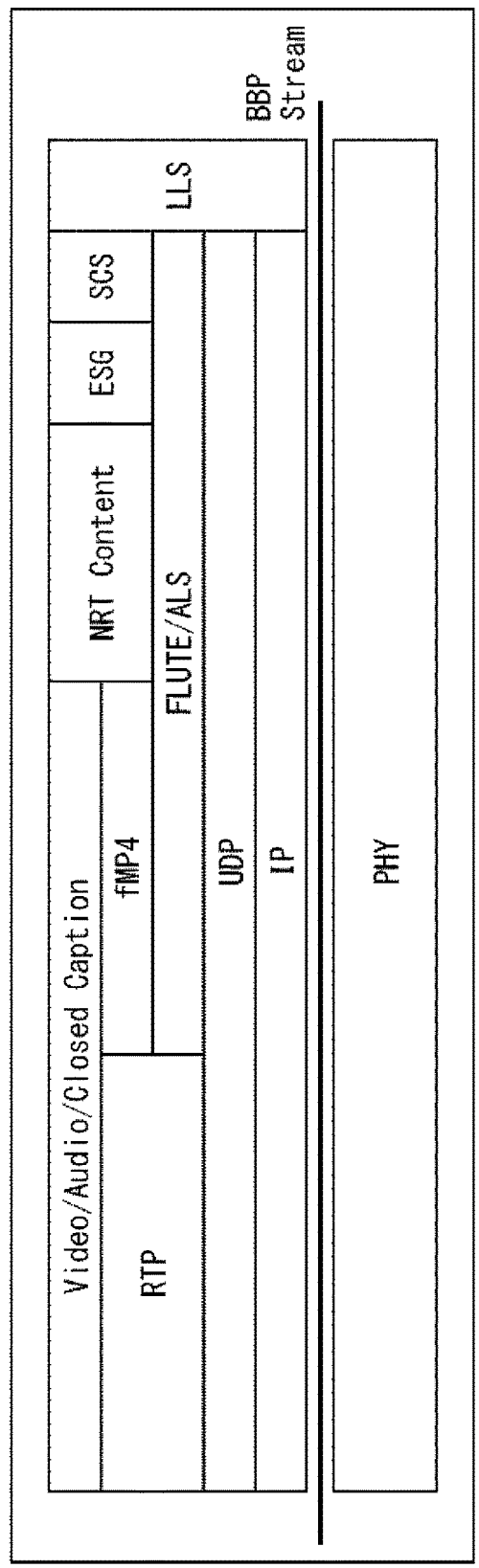
FIG. 41 is a diagram illustrating a protocol stack in an IP transmission scheme of an XML format.

FIG. 41 is a diagram illustrating a protocol stack of the digital broadcasting according to the IP transmission scheme of the XML format.

A physical layer is the lowest layer, and a frequency band of a broadcast wave allocated for a service (channel) corresponds to the physical layer as illustrated in FIG. 41. A layer directly above the physical layer is an IP layer with a base band packet (BBP) stream interposed therebetween. The BBP stream is a stream including a packet storing various kinds of data in the IP transmission scheme.

The IP layer is similar to an IP in a TCP/IP protocol stack, and an IP packet is specified by an IP address. A layer directly above the IP layer is a UDP layer, and a layer thereabove is an RTP and a FLUTE/ALS. In other words, in the digital broadcasting of the IP transmission scheme, packets having a UDP port number designated thereto are transmitted, for example, an RTP session and a FLUTE session are established.

A layer directly above the FLUTE/ALS is a fragmented MP4 (fMP4), and a layer directly above the RTP and the fMP4 is video data (Video), audio data (Audio), subtitle data (Closed Caption), and the like. In other words, when video data or audio data is transmitted in a synchronous stream format, an RTP session is used, and when video data or audio data is transmitted in an asynchronous file format, a FLUTE session is used.

Further, a layer above the FLUTE/ALS is NRT Content, an ESG, and SCS, and the NRT content, the ESG, and the SCS are transmitted through a FLUTE session. The NRT content is content transmitted in NRT (Non-RealTime) broadcasting, and accumulated in a storage of the receiver and then reproduced. Further, the NRT content is an example of content, a file of other content may be transmitted through the FLUTE session. The ESG is an electronic service guide, and includes information such as a program title or a start time, for example.

The SCS is signaling information of a service unit, and transmitted through a FLUTE session. For example, a session description protocol (SDP), an AIT, or the like is transmitted as the SCS. The SDP includes service attribute of a service unit, configuration information of a component, a component attribute, filter information of a component, location information of a component, and the like. The AIT is control information of an application executed concurrently with a television program. Further, a relation between a service and a component will be described later with reference to FIG. 42.

The LLS is signaling information of a low layer, and transmitted a BBP stream. For example, service configuration information such as a service configuration table (SCT), an SAT, an EAT, an RRT is transmitted as the LLS.

In the SCT, a triplet that is a combination of network_id, transport_stream_id, and service_id which is used in an MPEG2-TS scheme is employed, and a BBP stream configuration and a service configuration in a broadcasting network are represented by the triplet. Further, the SCT includes information such as an IP address serving as attribute/setting information of a service unit, bootstrap information for accessing the ESG or the SCS, tuning information used to tune to a service (channel), or the like.

The SAT represents a service that is on the air for each BBP stream. It is possible to determine whether or not a certain service is on the air according to the SAT. The EAT is a control signal for adding an emergency notification service for each BBP stream. The RRT represents a regional information table related to a classification of a program.

(ID System in IP Transmission Scheme of XML Format)

Figure 42:
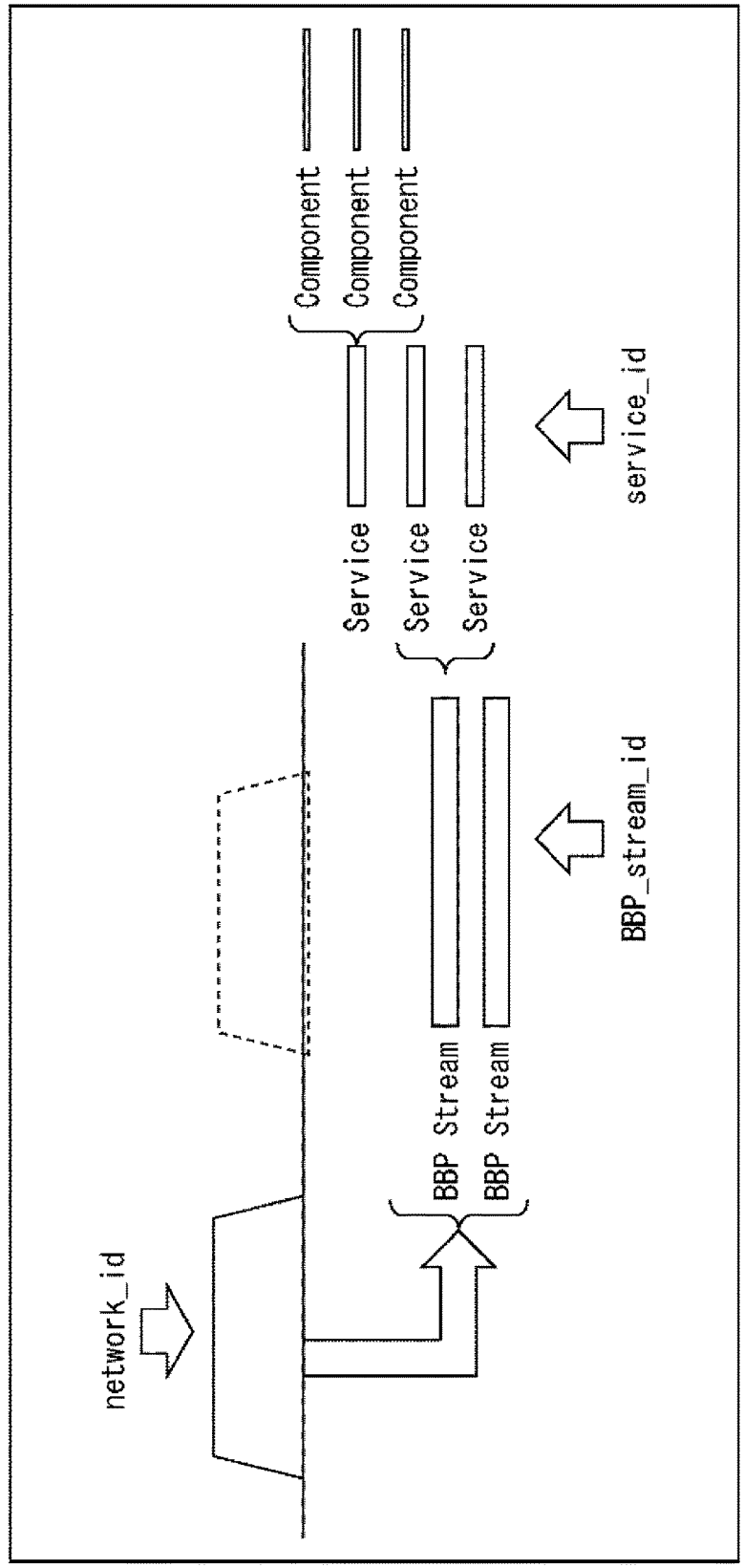
FIG. 42 is a diagram illustrating an ID system of an IP transmission scheme of an XML format.

FIG. 42 is a diagram illustrating a relation between a broadcast wave signal and an ID system of the IP transmission scheme of the XML format.

As illustrated in FIG. 42, a broadcast wave ((a broadcasting network (network)) having a frequency band of 6 MHz is allocated network_id. Each broadcast wave includes one or more BBP streams identified by BBP_stream_id. The BBP stream is configured with a plurality of BBP packets each of which includes a BBP header and a payload.

Each BBP stream includes a plurality of services identified by service_id. Each service includes one or more components. Each component is information configuring a program such as video data or audio data.

As a triplet, that is, a combination of network_id, BBP_stream_id, and service_id is employed as the ID system of the IP transmission scheme of the XML format, similarly to the MPEG2-TS scheme as described above, compatibility with the MPEG2-TS scheme that is currently in wide spread is obtained, and thus it is possible to easily cope with simulcasting, for example, when transition from the MPEG2-TS scheme to the IP transmission scheme is performed.

(Configuration of Broadcast Wave of IP Transmission Scheme of XML Format)

Figure 43:
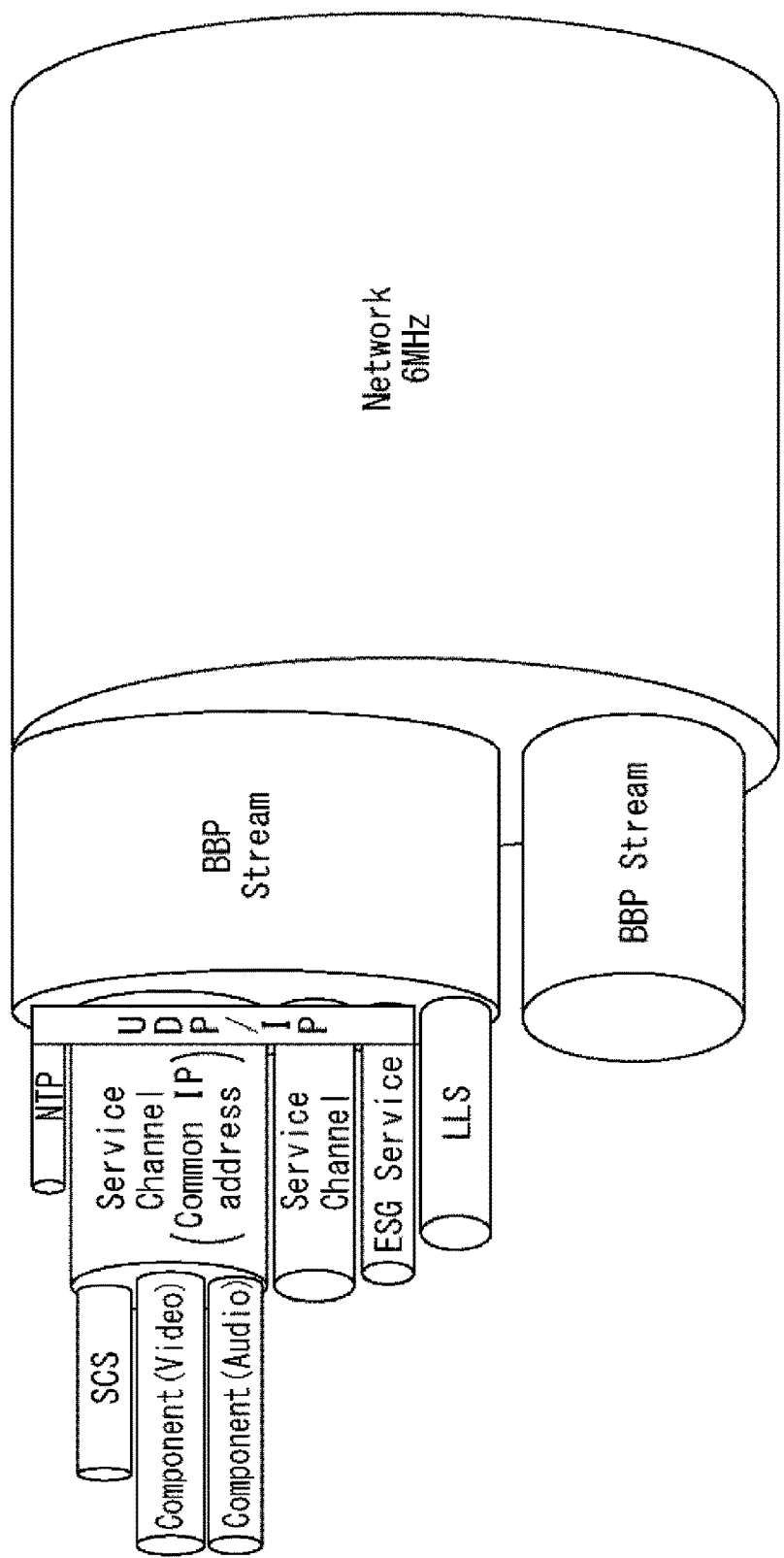
FIG. 43 is a diagram illustrating a configuration of a broadcast wave in an IP transmission scheme of an XML format.

FIG. 43 is a diagram illustrating a configuration of a broadcast wave of the digital broadcasting of the IP transmission scheme of the XML format.

As illustrated in FIG. 43, one or more BBP streams can be acquired from a broadcast wave ("network" in FIG. 43) having a frequency band of 6 MHz. Further, an NTP, a plurality of service channels, an ESG, and LLS can be acquired from each BBP stream. Here, the NTP, service channels and the ESG are transmitted according to the UDP/IP protocol, but the LLS is transmitted on the BBP stream. The NTP is time information and common in a plurality of service channels.

Each service channel includes a component such as video data or audio data and the SCS such as the SDP and the AIT. Each service channel is allocated a fixed IP address, and a component, a control signal, and the like can be packaged in units of service channels using this IP address.

Further, in FIG. 43, a BBP stream and a component correspond to those in FIG. 42, but a service channel corresponding to a service of FIG. 42.

(Configuration of LLS)

Figure 44:
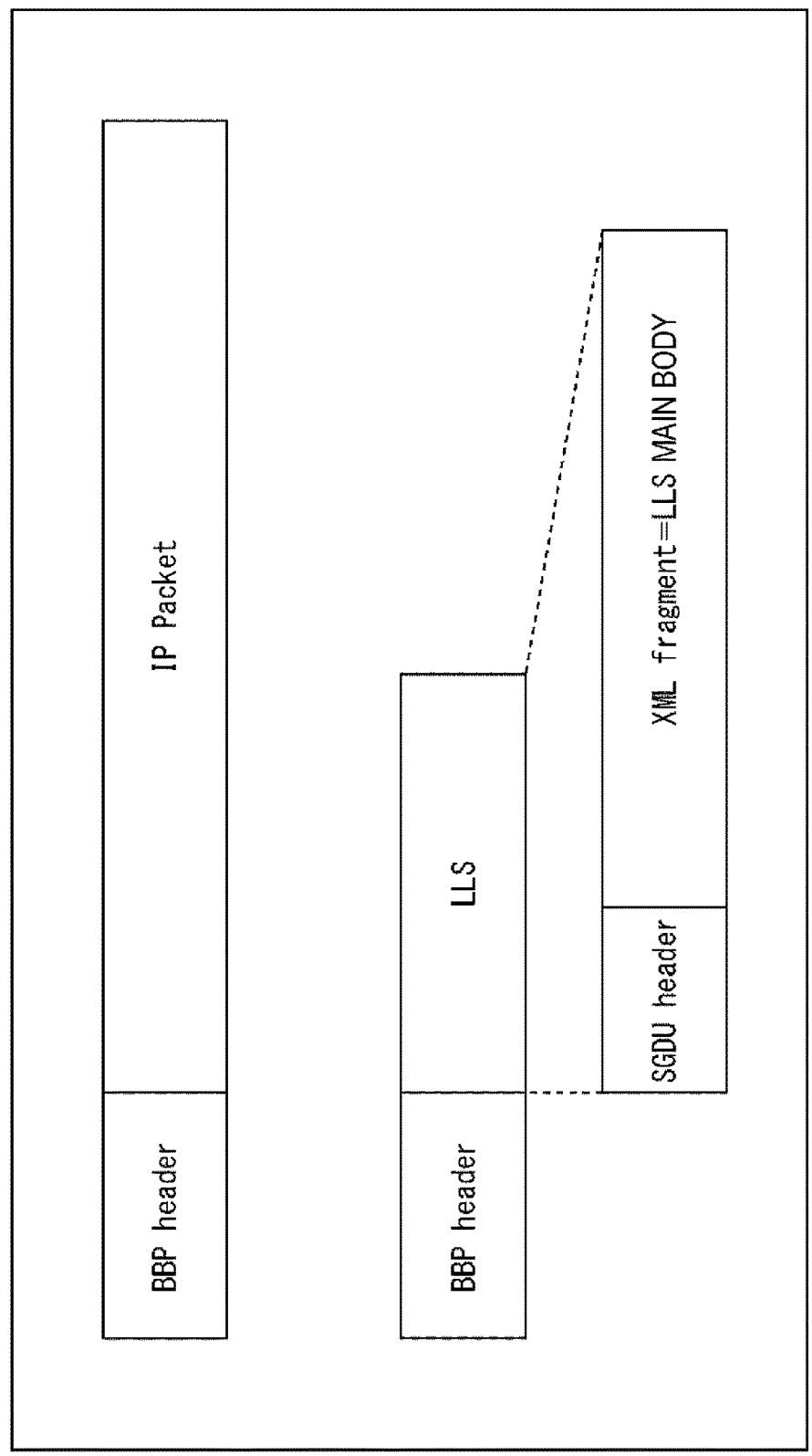
FIG. 44 is a diagram illustrating a configuration of LLS in an IP transmission scheme of an XML format.

FIG. 44 is a diagram illustrating a configuration of the LLS in the IP transmission scheme of the XML format.

As illustrated in FIG. 44, a BBP packet includes a BBP header and a payload. When an IP packet is transmitted through a BBP stream, a payload part serves as an IP packet.

Further, when LLS is transmitted through a BBP stream, the LLS is arranged following the BBP header. For example, the SCT, the SAT, or the like which is described in an XML format is arranged as the LLS, but an XML fragment of a part of the data is used as a main body of the LLS, and a service guide delivery unit (SGDU) header is added. Thus, the SCT or the SAT is transmitted through an SGDU container. Further, the SGDU is employed as an open mobile alliance (OMA) standard.

Further, the BBP header includes 2-bit type information, and it is possible to determine whether the BBP packet is the IP packet or the LLS using the type information.

(Configuration of SCS)

Figure 45:
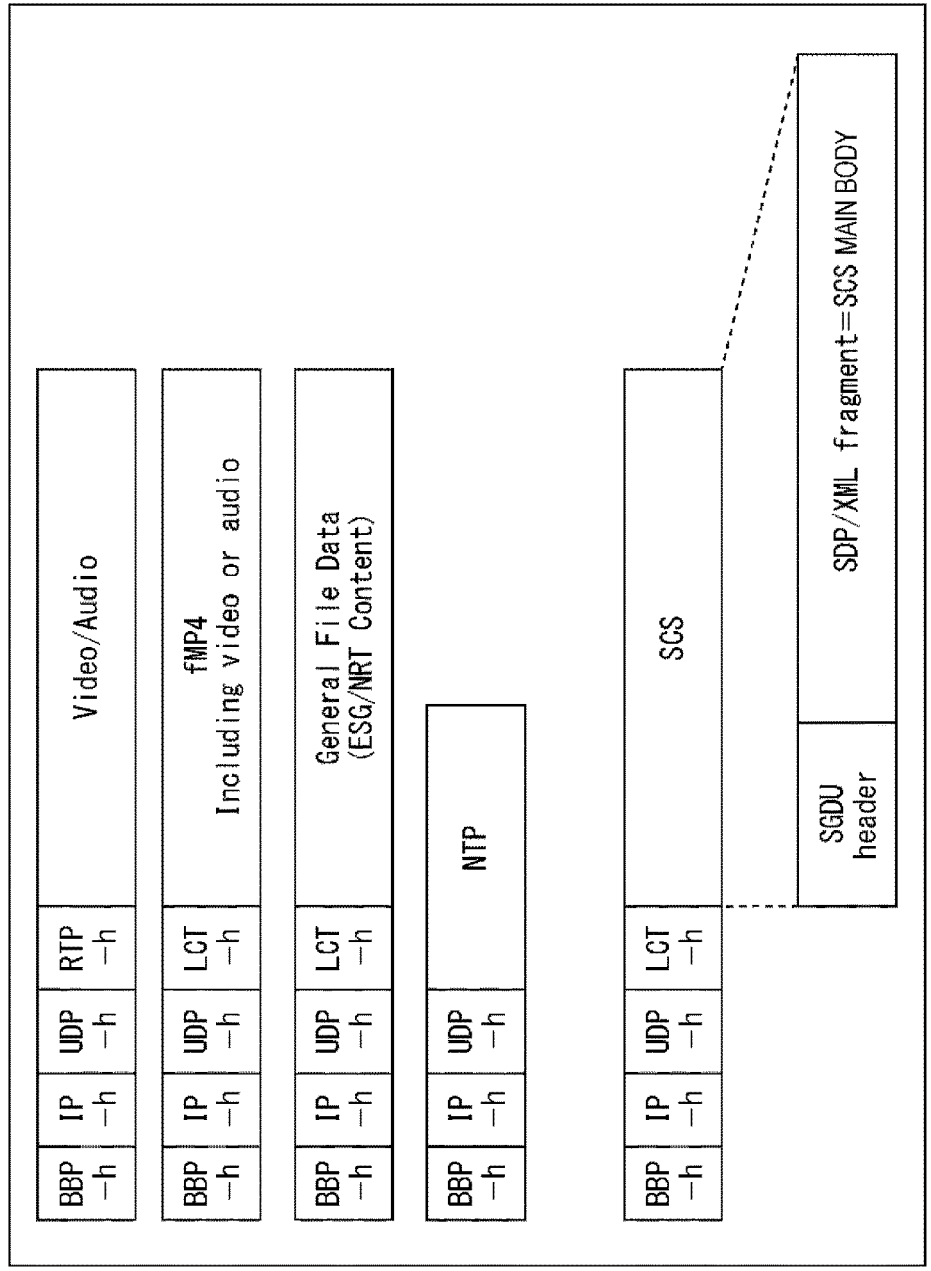
FIG. 45 is a diagram illustrating a configuration of SCS in an IP transmission scheme of an XML format.

FIG. 45 is a diagram illustrating a configuration of the SCS in the IP transmission scheme of the XML format.

As illustrated in FIG. 45, for example, when video data or audio data is transmitted in a synchronous stream format, an RTP session is used, and a BBP header, an IP header, a UDP header, and an RTP header are added to a payload. Further, when file data such as an fMP4, an ESG, and NRT content is transmitted in an asynchronous file format, a FLUTE session is used, and a BBP header, an IP header, a UDP header, and an LCT header are added to a payload. Furthermore, the NTP is the layer above the UDP layer and thus arranged following the BBP header, the IP header, and the UDP header.

The SCS is transmitted using the FLUTE session and thus arranged following the BBP header, the IP header, the UDP header, and the LCT header. For example, the SDP or the like described in a text format is arranged as the SCS, but an SDP fragment of a part of the data is used as a main body of the SCS, and an SGDU header is added. Thus, the SDP is transmitted by the SGDU container. Further, one arranged as the SCS main body is not limited to the SDP fragment, and, for example, the XML fragment of the AIT described in the XML format may be arranged and transmitted through the SGDU container.

(Basic Signaling System)

Figure 46:
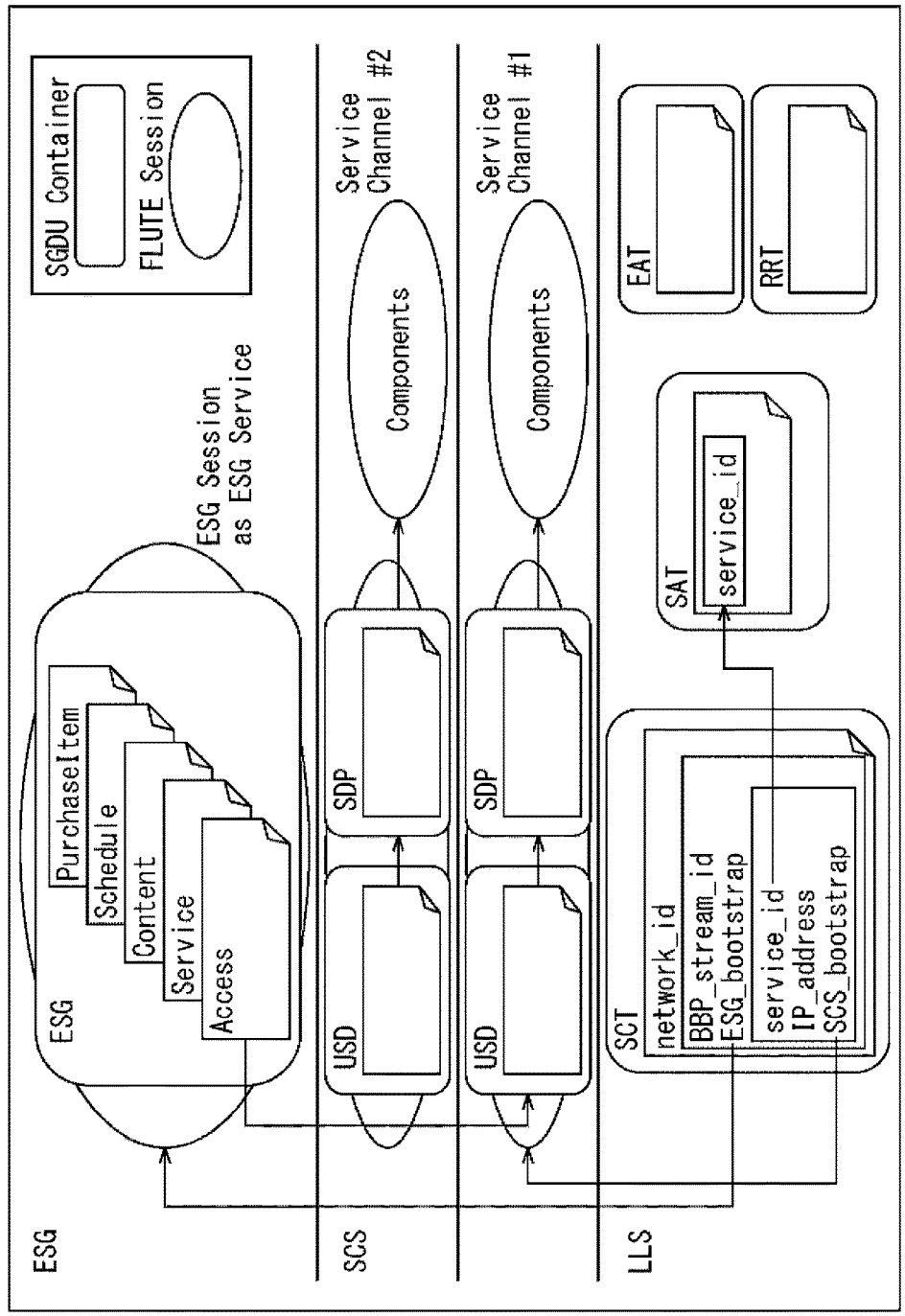
FIG. 46 is a diagram for describing a basic signaling system in an IP transmission scheme of an XML format.

FIG. 46 is a diagram for describing a basic signaling system in the IP transmission scheme of the XML format.

As illustrated in FIG. 46, the SCT, the SAT, the EAT, and the RRT are used in the LLS. The SCT has, for example, a transmission period of 1 second and is acquired by an initial scan or acquired from a server (not illustrated) dedicated for the Internet 90. Further, the SAT has, for example, a transmission period of 100 milliseconds, and acquires when a service is tuned to.

The SCT represents a transport stream (a BBP stream) configuration and a service configuration in a broadcasting network by a triplet. In the SCT, a transport stream loop identified by BBP_stream_id as well as network_id are arranged. In the transport stream loop, a service loop identified by service_id as well as ESG_bootstrap information are arranged. In the service loop, an IP address of each service and SCS_bootstrap information are arranged. Although not illustrated, the SCT includes information related to the physical layer and the like as well, and is used as tuning information.

The SAT represents a service that is on the air. The SCT is connected with the SAT by service_id, and thus it is possible to determine whether or not a certain service is on the air. The EAT is a control signal for providing an emergency notification service, and transmitted for each stream. When the EAT has been transmitted, it is necessary for the receiver to perform the emergency notification process according to the EAT. The RRT represents a regional information table related to a classification of a program.

Further, as illustrated in FIG. 46, a user service description (USD) and an SDP are used in the SCS. The SDP has, for example, a transmission period of 100 milliseconds. The USD is information for acquiring the SDP. The SDP represents a service attribute of a service unit of each service, configuration information of a component, a component attribute, filter information of a component, and location information of a component, and is prepared for each service.

In the example of FIG. 46, the SDP is transmitted through the FLUTE session, and thus the SDP can be acquired from the FLUTE session using an IP address of a service and a port number and a TSI that are included in the SCS_bootstrap information and used to transmit the SDP. Further, information for acquiring a component is described in the SDP, and thus access to a component is performed based on the information to acquire, for example, video data or audio data in units of services.

Further, in the example of FIG. 46, the ESG is transmitted through the FLUTE session. The ESG is configured with Access, Service, Content, Schedule, PurchaseItem, and the like. It is possible to acquire the ESG from the FLUTE session using an IP address, a port number, and a TSI that are included in the ESG_bootstrap information of the SCT and used to transmit the ESG.

Further, URL information of the SDP is described in the Access table of the ESG. Further, since the SDP is transmitted through the FLUTE session and so the URL can be solved, it is possible to designate a certain SDP (USD) based on the URL information of the ESG. In this case, since the ESG is connected with the SDP without intervention of the LLS, for example, a device that supports a certain architecture can operate without the LLS.

Further, as described above, the LLS (the SCT, the SAT, the EAT, and the RRT) and the SCS (the USD and the SDP) are transmitted through the SGDU container, and the ESG is also transmitted through the SGDU container, and thus it is possible to unify the transmission schemes thereof.

(Structure of SGDU)

FIG. 47 is a diagram for describing a structure of an SGDU.

As illustrated in FIG. 47, an SGDU includes header information (Unit_Header) and a payload (Unit_Payload). Further, in the SGDU, extension information (extension_data) is arranged as necessary.

In the header information, fragmentTransportID and fragmentVersion are arranged. fragmentTransportID represents fragment identification. For example, the SCT, the SDP, or the like is identified by fragmentTransportID. Further, fragmentVersion represents a version number of a fragment.

In the payload, real data of at least one of an XML fragment and an SDP fragment (the SDP fragment) is arranged. In other words, data of one or more fragments that are equal in number to the number designated by n_o_service_guide_fragments of the header information are arranged in the payload. Here, a combination of a plurality of fragments arranged in the payload is arbitrary, for example, fragments of both the XML fragment and the SDP fragment may be arranged. Further, a position of an arbitrary fragment among a plurality of arranged fragments can be represented by an offset of the header information.

Here, when the XML fragment is arranged, fragmentType representing a type of the fragment is arranged together with real data. Further, when the SDP fragment is arranged, fragmentID identifying the fragment is arranged together with real data.

Furthermore, when the extension information is arranged, extension_type representing a type of the extension information is arranged together with extension data (extension_data). Further, a position of the extension information can be represented by designating extension_offset to the header information.

Here, for example, 16-bit demux_filter_param is assumed to be arranged in extension_data as the filtering condition of the EAT when "2" (filter_extension) is designated as extension_type. In other words, as information corresponding to EA_category of FIG. 24 is arranged in demux_filter_param, it is possible to perform the filtering process using EA_category and can notify only the emergency information that each user desires.

<(2) Signaling Information>
<(2-1) Detailed Structure of LLS (SCT, SAT, EAT, and RRT)>

(Syntax of SCT)

FIG. 48 is a diagram illustrating syntax of an SCT. Further, in FIG. 48, of an element and an attribute, "@" is added to the attribute. Further, an element and an attribute that are indented are designated for a higher element.

As illustrated in FIG. 48, a sct element includes a networkId attribute, a name attribute, and a BBPStream element. A network identifier (network_id) of a broadcasting station of a physical channel unit is designated to the networkId attribute. A name of a broadcasting station of a physical channel unit is designated as the name attribute.

The BBPStream element is a sub element of the sct element, and information related to the BBP stream is designated as the BBPStream element. The BBPStream element includes a BBPStreamId attribute, a payloadType attribute, a name attribute, an ESG-Bootstrap element, and a Service element.

An identifier (BBP_stream_id) of the BBP stream is designated as the BBPStreamId attribute. When a plurality of BBP streams are arranged, the BBP streams are identified by the BBPStreamId attribute. A payload type of the BBP stream is designated as the payloadType attribute. For example, "ipv4," "ipv6," "ts," or the like is designated as the payload type. A name of the BBP stream is designated as the name attribute.

The ESGBootstrap element is a sub element of the BBPStream element, and access information to the ESG is designated as the ESGBootstrap element. The ESGBootstrap element includes a sourceIPAddress attribute, a destinationIPAddress attribute, a portNum attribute, and a tsi attribute.

A transmission source (source) that transmits the ESG and an IP address of the destination are designated as the sourceIPAddress attribute and the destinationIPAddress attribute. The port number for transmitting the ESG is designated as the portNum attribute. A TSI in the FLUTE session for transmitting the ESG is designated as the tsi attribute.

The Service element is a sub element of the BBPStream element, and information related to a service is designated as the Service element. The Service element includes a serviceId attribute, a serviceType attribute, and an SCSBootstrap element.

An identifier (service_id) of a service is designated as the serviceId attribute. When a plurality of services are arranged, the services are identified by the serviceId attribute. Type information of a service is designated as the serviceType attribute. For example, "tv," "audio," "data," "nrt," "esg," "adjunct-nrt," "adjunct-shared," or the like is designated as the type information.

The SCSBootstrap element is a sub element of the Service element, and access information to a service channel is designated as the SCSBootstrap element. The SCS-Bootstrap element includes the sourceIPAddress attribute, the destinationIPAddress attribute, the portNum attribute, and the tsi attribute.

A transmission source (source) that transmits a service and an IP address of the destination are designated as the sourceIPAddress attribute and the destinationIPAddress attribute. The port number for transmitting the SCS is designated as the portNum attribute. A TSI in the FLUTE session for transmitting the SCS is designated as the tsi attribute.

Further, the syntax of the SCT described above with reference to FIG. 48 is an example, and any other syntax can be employed. The SCT is described, for example, a markup language such as an XML.

(Syntax of SAT)

FIG. 49 is a diagram illustrating syntax of the SAT. Further, in FIG. 49, of an element and an attribute, "@" is added to an attribute. Further, an element and an attribute that are indented are designated for a higher element.

As illustrated in FIG. 49, a sat element includes service element. The service element includes a service_id attribute.

An identifier of a service that is on the air is designated as the service_id attribute. When there are a plurality of services that are on the air, a plurality of service_ids corresponding to the services are arranged.

(Syntax of EAT)

FIG. 50 is a diagram illustrating syntax of the EAT. Further, in FIG. 50, of an element and an attribute, "@" is added to an attribute. Further, an element and an attribute that are indented are designated for a higher element.

As illustrated in FIG. 50, an Eat element includes an AutomaticTuningService element and an EAMessage element. The AutomaticTuningService element is a sub element of the Eat element, and is to designate a service that is automatically tuned to when it wakes up. The AutomaticTuningService element includes a networkId attribute, a bbpStreamId attribute, and a serviceId attribute.

A network identifier (network_id) of a service that is automatically tuned to is designated as the networkId attribute. A BBP stream identifier (BBP_stream_id) of a service that is automatically tuned to is designated as the bbpStreamId attribute. A service identifier (service_id) of a service that is automatically tuned to, is designated as the serviceId attribute. In other words, when the AutomaticTuningService element appears, a service designated by a triplet represented by the attributes is tuned to. Here, in the triplet, the networkId attribute and the bbpStreamId attribute are optional, and for example, only the serviceId attribute may be designated as long as the sane BBP stream as in the EAT is designated.

The EAMessage element is a sub element of the Eat element, and a message of emergency notification information (emergency information) is designated as the EAMessage element. The EAMessage element includes an eaMessageId attribute, an eaPriority attribute, an EAMessageData element, an EAApplication element, an EAService element, and an EAWww element.

An identifier of emergency notification information (emergency information) is designated as the eaMessageId attribute. A priority of emergency notification information (emergency information) is designated as the eaPriority attribute. The EAMessageData element is a sub element of the EAMessage element, subtitle information of emergency notification information (emergency information) is designated as the EAMessageData element.

The EAApplication element is a sub element of the EAMessage element, and information related to the emergency notification application is designated as the EAApplication element. The EAApplication element includes an applicationId attribute. The application identifier is designated as the applicationId attribute.

The EAService element is a sub element of the EAMessage element, and information related to an NRT service for emergency notification is designated as the EAService element. The serviceId attribute and the serviceType attribute are designated as the EAService element. A service identifier (service_id) is designated as the serviceId attribute. The service type information is designated as the serviceType attribute. "nrt" and "adjunct_shared" are designated as the service type information.

The EAWww element is a sub element of the EAMes sage element, and information related to an emergency information site is designated as the EAWww element. The EAWww element includes a uri attribute. A URL of the emergency information site is designated as the uri attribute. For example, the URL of the web server 70 may be designated as the uri attribute.

Further, the syntax of the EAT described above with reference to FIG. 50 is an example, and any other syntax can be employed. The EAT is described, for example, in a markup language such as an XML.

(Syntax of RRT)

FIG. 51 is a diagram illustrating the syntax of the RRT. Further, in FIG. 51, of an element and an attribute, "@" is added to an attribute. Further, an element and an attribute that are indented are designated for a higher element.

As illustrated in FIG. 51, an rrt element includes a rating_region attribute, a name attribute, and a dimension element. A rating region is designated as the rating_region attribute. A name of a rating region is designated as the name attribute.

The dimension element is a sub element of the rrt element, and includes a name attribute, a graduated_scale attribute, and a rating_value element. The rating_value element includes an abbrev_rating$_{13}$ value attribute and a rating_value. Regional information related to a classification of a program is represented by the elements and the attributes.

<(2-2) Detailed Structure of SCS (SDP)>

(Exemplary Description of SDP)

An SDP description document includes two sections of a session description section and a media description section. In the session description section, a protocol version, instance generator information, connection data, and the like are described. In the media description section, a plurality of pieces of media information can be described.

FIG. 52 illustrates an exemplary description of the SDP.

In FIG. 52, "v" represents a protocol version. As this value, "0" or a value decided by a service operation is designated.

"o" represents instance generator information. As this value, a generator name, an SDP instance ID, a version, a transmission (host) type, an IP address type, and an IP address are designated. For example, "IN" (Internet), "BC" (broadcasting), or "HB" (hybrid) is designated as the transmission (host) type. "IP4" (IPv4) or "IP6" (IPv6) is designated as the IP address type.

"s" represents a session name. As this value, a session is described in text.

"c" represents connection data. As this value, a network type of a session, an IP address type, and an IP address are designated. For example, "IN" (Internet), "BC" (broadcasting), or "HB" (hybrid) is designated as a network type of a session. "IP4" (IPv4) or "IP6" (IPv6) is designated as the IP address type.

A service and adjunct service can be designated as "a." An identifier (service_id) of its own service is designated as the service. Further, an identifier (Adjunct_service_id) of a shared service is designated as adjunct service. Further, the service and adjunct_service are optionally designated.

"m" represents media information. As this value, media type, a port number for transmitting media, a protocol for transmitting media, a format, and the like are designated. For example, as the media type, video or audio is designated. Further, as the protocol for transmitting media, FLUTE/UDP, RTP/AVP, or the like is designated. Further, as the format, additional information is described for each protocol as necessary. Further, a row starting from "a=" represents an attribute of corresponding media.

The exemplary description of FIG. 52 illustrates an example of a service in which each of video data and audio data transmitted through an RTP session includes one stream.

In other words, a row of "m=video" represents that a port number of video data transmitted through an RTP session is 8000. Further, "a=rtpmap" of a next row represents that a payload type is mapped with an encoding type, and video data is encoded according to H.264. Further, in the video data, a time scale of an RTP time stamp is 90000.

A row of "m=audio" represents that a port number of audio data transmitted through an RTP session is 7000.

<(3) Configuration of Broadcasting System>

Next, a configuration of a broadcasting system according to an embodiment of the present technology will be described, but a configuration of the broadcasting system according to the IP transmission scheme of the XML format differs from the configuration of the broadcasting system according to the IP transmission scheme of the section format in a configuration of the receiving device 20, and thus a configuration of the receiving device 20 will be described herein.

(Exemplary Configuration of Receiving Device)

Figure 53:
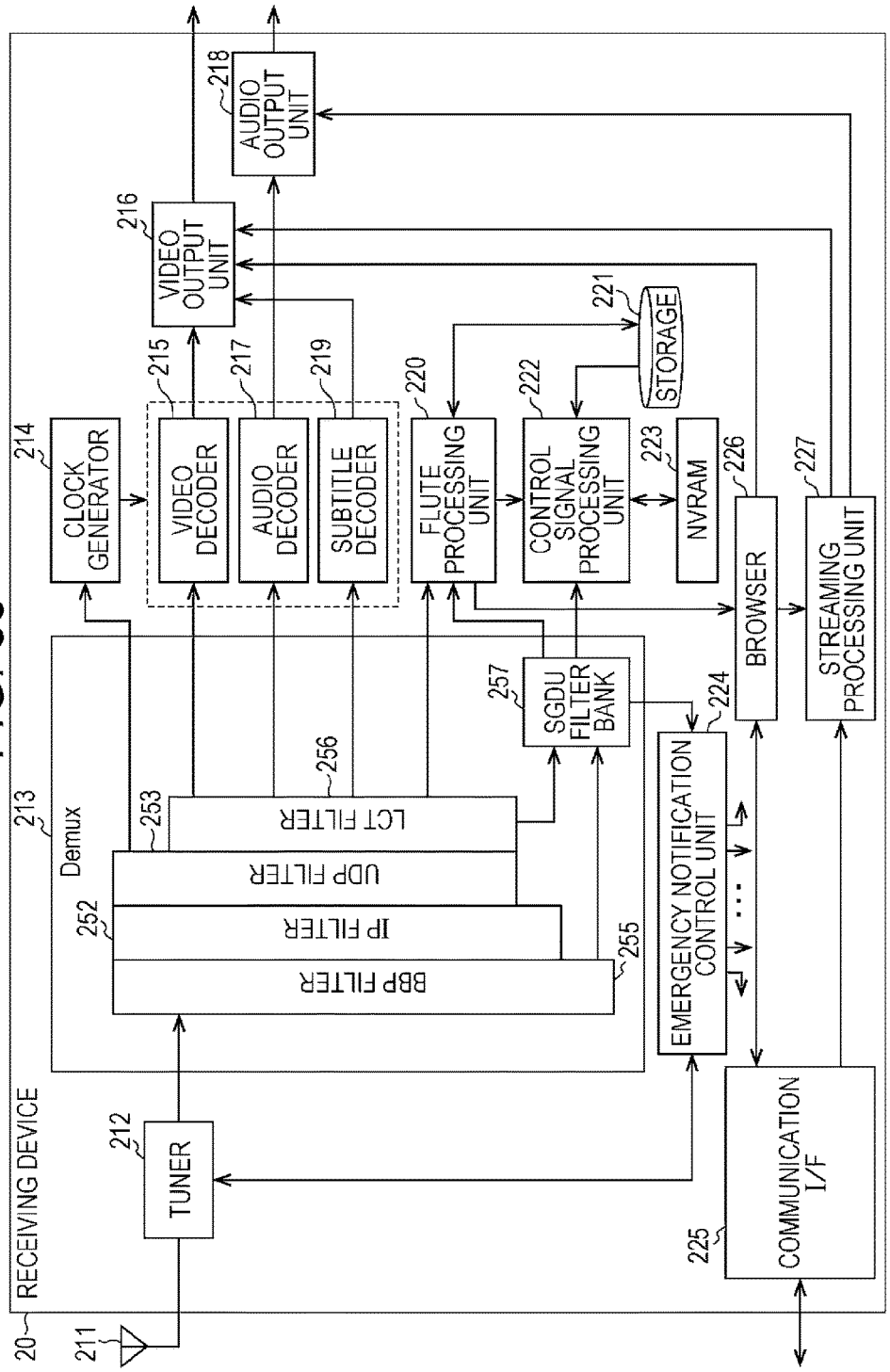
FIG. 53 is a diagram illustrating a configuration of a receiving device according to an embodiment of the present technology.

FIG. 53 is a diagram illustrating a configuration of the receiving device according to an embodiment of the present technology.

The receiving device 20 of FIG. 53 differs from the receiving device 20 of FIG. 22 in a configuration of the Demux 213. In other words, the Demux 213 illustrated in FIG. 53 includes a BBP filter 255, an IP filter 252, a UDP filter 253, an LCT filter 256, and an SGDU filter bank 257. The BBP filter 255 performs the filtering process based on the BBP header, and provides the LLS to the SGDU filter bank 257.

The IP filter 252 performs the filtering process based on the IP header. The UDP filter 253 performs the filtering process based on the UDP header. The LCT filter 256 performs the filtering process based on the LCT header. Through the filtering processes performed by the IP filter 252, the UDP filter 253, and the LCT filter 256, the NTP is provided to the clock generator 214, and the SCS is provided to the SGDU filter bank 257. Further, the video data, the audio data, and the subtitle data are provided to the video decoder 215, the audio decoder 217, and the subtitle decoder 219. Further, various kinds of file data is provided to the FLUTE processing unit 220.

The SGDU filter bank 257 performs the filtering process based on the SGDU header, and appropriately provides the LLS and the SCS to the control signal processing unit 222 or the FLUTE processing unit 220. Further, the SGDU filter bank 257 acquires the EAT of the XML format transmitted as the LLS, and provides the EAT of the XML format to the emergency notification control unit 224.

The FLUTE processing unit 220 reconstructs the ESG, the emergency notification application, the NRT content, and the like based on various kinds of file data provided from the Demux 213. For example, the FLUTE processing unit 220 records the reconstructed ESG or the NRT content in the storage 221. Further, for example, the FLUTE processing unit 220 provides the reconstructed emergency notification application to the browser 226. Furthermore, the FLUTE processing unit 220 provides the SCS provided from the Demux 213 to the control signal processing unit 222. Here, the SCS may be provided to the control signal processing unit 222 directly from the Demux 213 through intervention of the FLUTE processing unit 220.

The control signal processing unit 222 controls the operation of the respective units based on the control signal (the LLS and the SCS) provided from the Demux 213 or the FLUTE processing unit 220.

The emergency notification control unit 224 controls operations of the respective units corresponding to the emergency notification service based on the EAT provided from the SGDU filter bank 257. For example, the emergency notification control unit 224 controls the respective units of the receiving device 20 according to EAT analysis process result such that the emergency information is displayed on the display. Further, the emergency notification control unit 224 consistently monitors the tuner 212, and powers on the receiving device 20 when the compulsory emergency activation flag is detected to be set to "on" and the receiving device 20 is in the sleep state.

In the receiving device 20 of FIG. 53, the configuration excluding the above-described blocks are the same as in the receiving device 20 of FIG. 22, and thus a description thereof will be omitted.

(Details of Filtering Process)

Next, a packet filtering process performed by the Demux 213 (FIG. 53) will be described with reference to FIG. 54.

Figure 54:
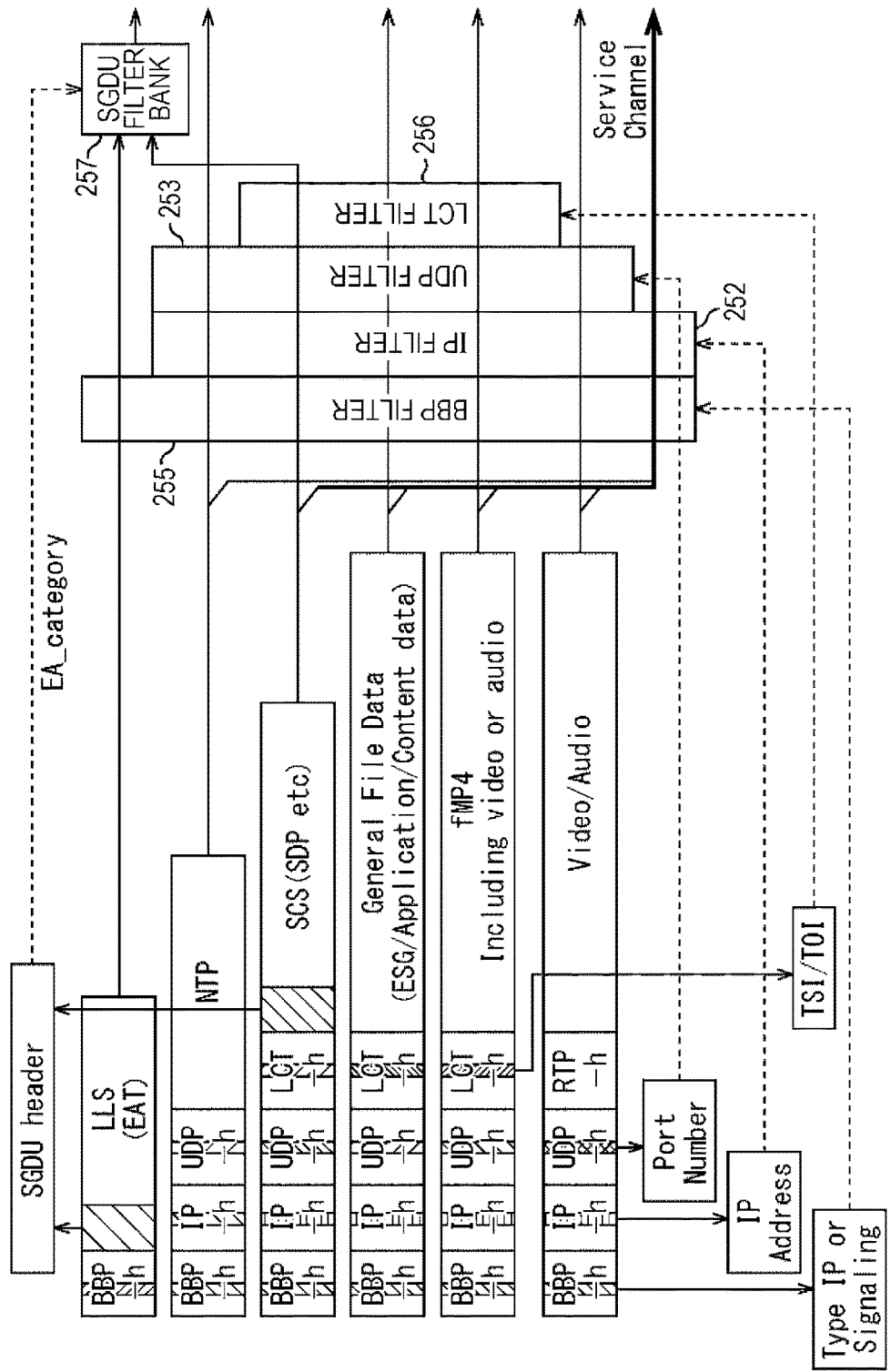
FIG. 54 is a diagram illustrating the details of a packet filtering process performed by a Demux in an IP transmission scheme of an XML format.

As illustrated in FIG. 54, each packet including various kinds of header information, and the LLS, the NTP, the SCS), various kinds of file data, video data, or audio data as a payload is input to the Demux 213.

The BBP header includes type information representing an IP or signaling. The BBP filter 255 performs the filtering process based on the type information included in the BBP header. In the example of FIG. 54, since only the type information of the packet of the LLS is signaling and other packets are an IP, only the packet of the LLS is provided to the SGDU filter bank 257.

The IP header includes an IP address. The IP filter 252 performs the filtering process based on the IP address included in the IP header. In the example of FIG. 54, among packets including the IP header added thereto, only the packets of the NTP have a different IP address, but the other packets have the same IP address.

Further, the UDP header includes a port number. The UDP filter 253 performs the filtering process based on the port number included in the UDP header. In the example of FIG. 54, the packets including the UDP header added thereto differ in a port number. Further, an LCT header is added to a packet transmitted using a FLUTE session, and an RTP header is added to a packet transmitted using an RTP session.

Then, as the filtering processes using the IP address and the port number are performed by the IP filter 252 and the UDP filter 253, the packet of the NTP including no LCT header added thereto is output to the clock generator 214. Further, the packets of the video data and the audio data to which the RTP header is added are output to the video decoder 215 and the audio decoder 217.

The LCT header includes a TSI and a transport object identifier (TOI). In the FLUTE session, a certain file is designated using the identification information. The LCT filter 256 performs the filtering process based on the TSI and the TOI included in the LCT header. In the example of FIG. 54, when the TSI and the TOI specifying the SCS (the SDP or the like) are designated, the LCT filter 256 provides the packet of the SCS (the SDP or the like) to the SGDU filter bank 257. Further, the LCT filter 256 outputs packets of various kinds of file data to the FLUTE processing unit 220 according to the TSI and the TOI included in the LCT header.

The packet of the LLS and the packet of the SCS are provided to the SGDU filter bank 257. The SGDU filter bank 257 performs the filtering process based on the SGDU header or the extension information added to the packet. Here, in the SGDU filter bank 257, only packets satisfying the filtering condition are held in buffer memories of the SGDU filter bank 257 and the section filter bank 254, and intermittently picked up by software from the CPU (the CPU 901 of FIG. 67).

For example, since version information (fragmentVersion of FIG. 47) is described in the SGDU header, the SGDU filter bank 257 may allow the packet of the SDP to pass only when a version is changed. Further, since information corresponding to EA_category illustrated in FIG. 24 is arranged in demux_filter_param of the extension information (extension_data of FIG. 47), the SGDU filter bank 257 performs the filtering process using EA_category, and can selectively notify of only the emergency information that each user desires.

For example, as illustrated in FIGS. 24 and 25, EA_priority representing an emergency degree of the emergency information, EA_scope representing a target area of the emergency information, Area_code representing a certain area code, and Category_code representing a category of the emergency information are arranged in EA_category. Further, as the user sets the filtering condition based on EA_category to the receiving device 20 in advance, the receiving device 20 receives a notification of only the emergency information filtered in units of EATs according to the filtering condition.

Further, in FIG. 54, since packets of the MLS (the SCS), various kinds of file data, the video data or the audio data of the same channel are allocated the same IP address, the IP filter 252 outputs such packets together with the packet of the NTP, and thus the control signals thereof and data can be packaged using the IP address.

<(4) Concrete Operation Example>

Next, a concrete operation example of the broadcasting system 1 that supports the digital broadcasting of the IP transmission scheme of the XML format will be described. Here, for example, when initially activated, the receiving device 20 is assumed to perform the initial scan process, acquire the SCT (tuning information), and cause the tuning information to be held in the NVRAM 223 or the like.

<(4-1) NRT Portal Service Transmission>

First, the NRT portal service transmission will be described with reference to FIGS. 55 and 56.

(NRT Portal Service Transmission Process in Sleep State)

Figure 55:
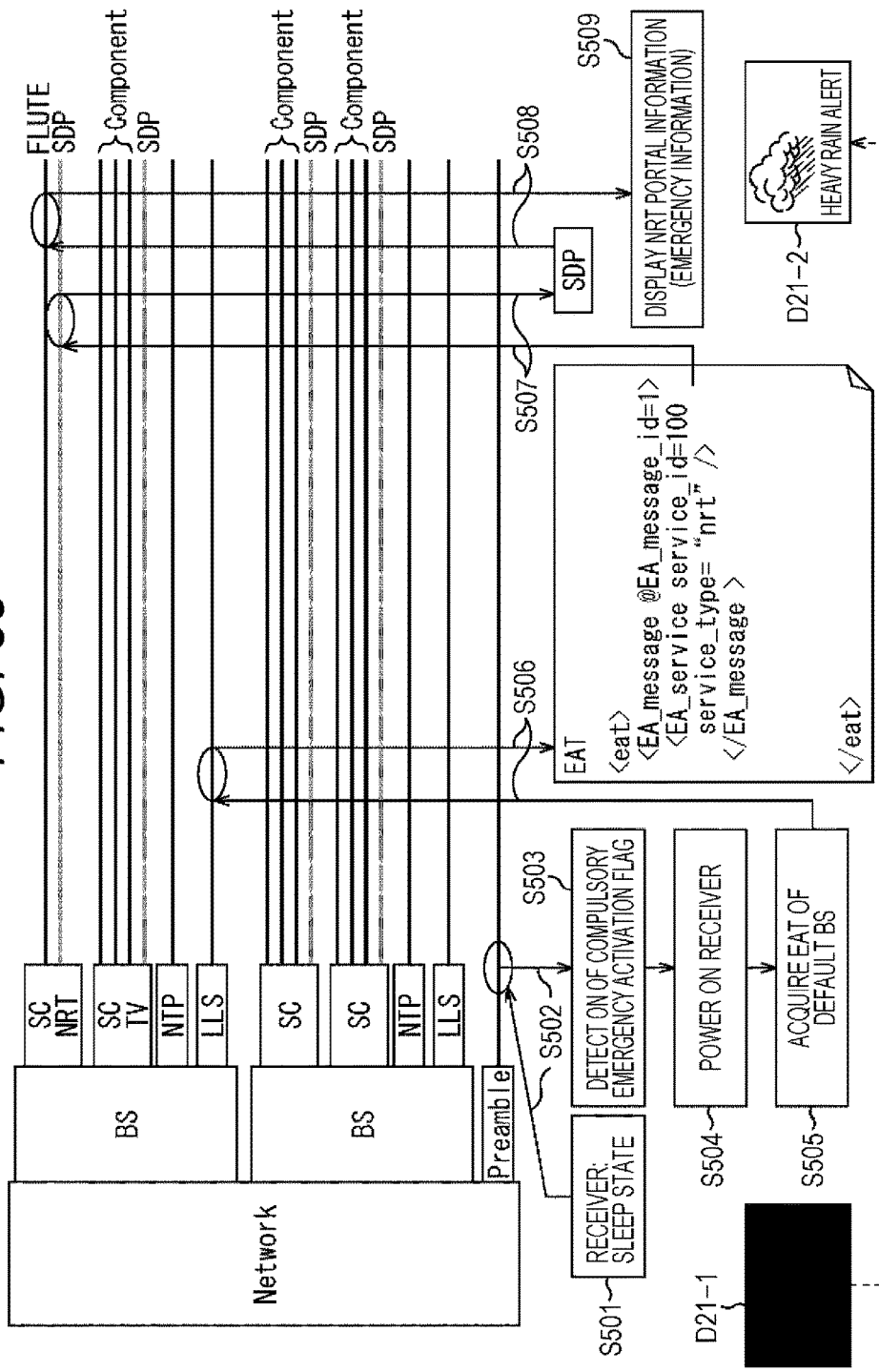
FIG. 55 is a diagram for describing an NRT portal service transmission process in a sleep state.

FIG. 55 is a diagram for describing the NRT portal service transmission process in the receiving device 20 in the sleep state.

As illustrated in FIG. 55, in the broadcast wave of the digital broadcasting using the IP transmission scheme from the transmitting device 10, video data and audio data of television program ("TV" in FIG. 55) are transmitted in a synchronous stream format, and thus an RTP session is used. Further, the emergency information ("NRT" in FIG. 55) for the NRT portal service is transmitted through the FLUTE session. Furthermore, the LLS (the EAT) and the SCS (the SDP) are transmitted in the XML format.

In FIG. 55, the receiving device 20 is in the sleep state (S501). Here, the receiving device 20 in the sleep state consistently monitors the compulsory emergency activation flag included in the preamble signal (S502), and when the emergency information having the high emergency degree is transmitted, the compulsory emergency activation flag is set to "on." The receiving device 20 is powered on and activated when the compulsory emergency activation flag set to "on" is detected (S503 and S504).

Further, the receiving device 20 acquires the EAT of the XML format from the LLS transmitted from a BS set by default (S505 and S506). As illustrated in FIG. 55, in the EAT, the EAService element appears in the EAMessage element, and "nrt" is designated as the serviceType attribute, and thus the emergency information is transmitted as the NRT portal information of the NRT portal service. Thus, the receiving device 20 performs the tuning process using the value of the serviceId attribute of the EAService element of the EAT and the tuning information, and acquires the SDP transmitted through the FLUTE session (S507).

The receiving device 20 acquires the NRT portal information transmitted through the FLUTE session according to the SDP, and causes the acquired emergency information to be displayed on the display (S508 and S509). Further, the NRT portal information is file data of an HTML format, and displayed by the browser 226.

As described above, in the NRT portal service transmission process of FIG. 55, the receiving device 20 in the sleep state is activated in an emergency situation. Then, the receiving device 20 acquires the EAT of the XML format transmitted through the LLS, and acquires the NRT portal information according to the EAT. As a result, the display compulsorily transitions from a state (a black screen) of D21-1 to a state (a screen on which "heavy rain alert" is displayed) of D21-2, and thus a screen of the emergency information transmitted as the NRT portal information is displayed. Accordingly, even the user who is not watching a television program checks the screen of the compulsorily displayed emergency information, and can recognize that a heavy rain alert has been invoked.

(NRT Portal Service Transmission Process in Active State)

Figure 56:
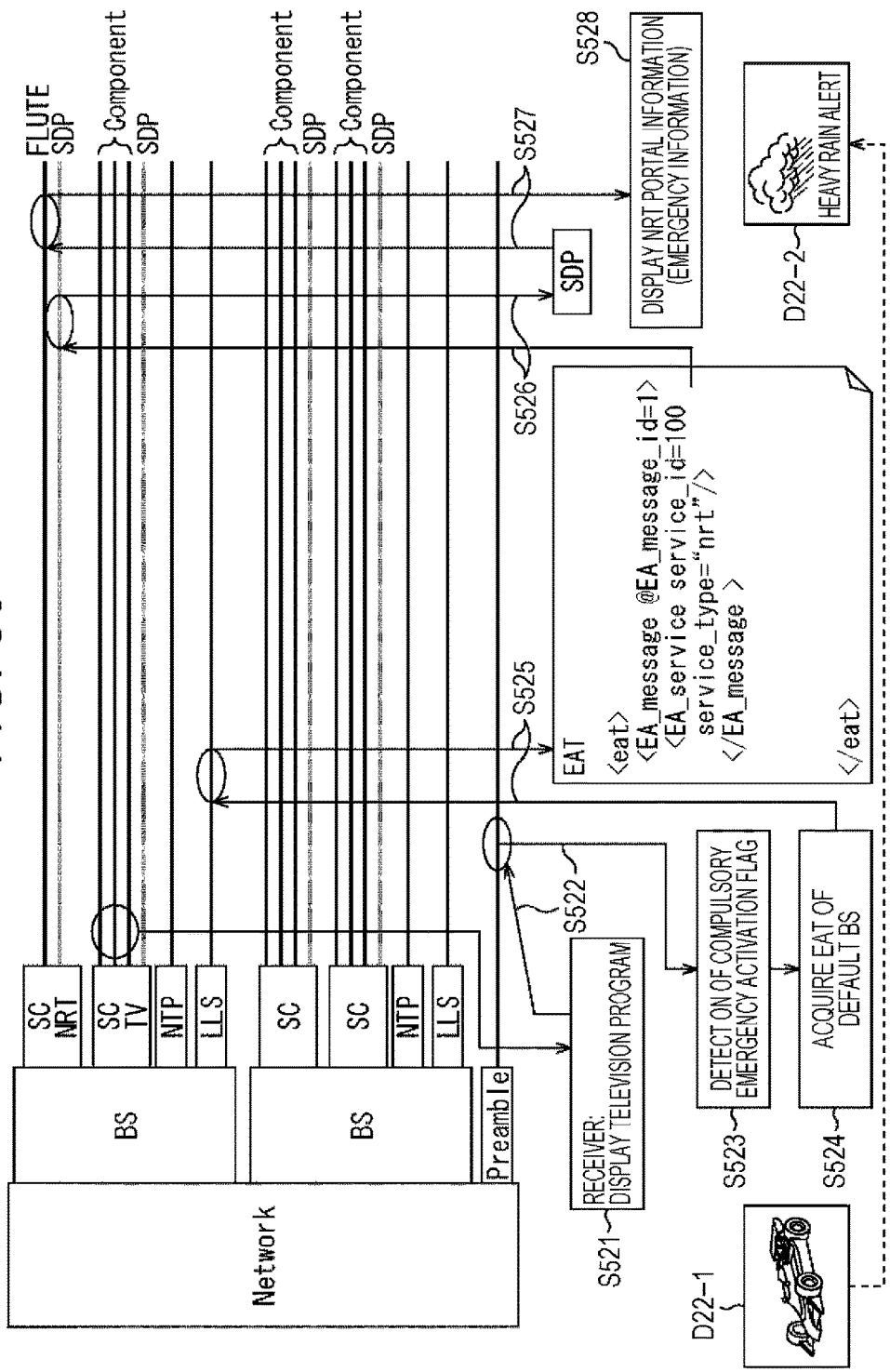
FIG. 56 is a diagram for describing an NRT portal service transmission process in an active state.

FIG. 56 is a diagram for describing the NRT portal service transmission process in the receiving device 20 in the active state.

As illustrated in FIG. 56, in the broadcast wave of the digital broadcasting using the IP transmission scheme from the transmitting device 10, video data and audio data of television program ("TV" in FIG. 56) are transmitted in a synchronous stream format, and thus an RTP session is used. Further, the emergency information ("NRT" in FIG. 56) for the NRT portal service is transmitted through the FLUTE session. Furthermore, the LLS (the EAT) and the SCS (the SDP) are transmitted in the XML format.

In FIG. 56, the receiving device 20 is in the active state and is displaying the television program unlike an operation example of FIG. 55 (S521). Here, the receiving device 20 in the active state consistently monitors the EAT transmitted through the LLS, and acquires the latest EAT from a default BS when the compulsory emergency activation flag included in the preamble signal is detected to be set to "on" (S522 to S525).

As illustrated in FIG. 56, in the EAT of the XML format, the EAService element appears in the EAMes sage element, and "nrt" is designated as the serviceType attribute, and thus the emergency information is transmitted as the NRT portal information of the NRT portal service. Thus, the receiving device 20 performs the tuning process using the value of the serviceId attribute of the EAService element of the EAT and the tuning information, and acquires the SDP transmitted through the FLUTE session (S526).

The receiving device 20 acquires the NRT portal information transmitted through the FLUTE session according to the SDP, and causes the acquired emergency information to be displayed on the display (S527 and S528).

As described above, in the NRT portal service transmission process of FIG. 56, when the compulsory emergency activation flag is detected to be set to "on," the receiving device 20 being displaying the television program acquires the EAT of the XML format transmitted through the LLS, and acquires the NRT portal information according to the EAT. As a result, the display compulsorily transitions from a state (a screen on which a television program is displayed) of D22-1 to a state (a screen on which "the heavy rain alert" is displayed) of D22-2, and thus the screen of the emergency information transmitted as the NRT portal information is displayed.

Here, FIG. 56 illustrates the example in which switching to the screen of the emergency information is compulsorily performed, but, for example, when the emergency degree represented by EA_priority of EA_category designated as the extension information of the SGDU is high, the screen may be compulsorily switched, but when the emergency degree is low, a message indicating that there is emergency information may be displayed to be superimposed on a television program, and the emergency information may be displayed only when the message is selected. Accordingly, the user who is watching the television program can check the screen of the emergency information according to the emergency degree of the emergency information and recognize that the heavy rain alert has been invoked.

<(4-2) EA Message Transmission>

Next, the EA message transmission will be described with reference to FIGS. 57 and 58. Further, this EA message transmission corresponds to the above-described EAS message transmission.

(EA Message Transmission Process in Sleep State)

Figure 57:
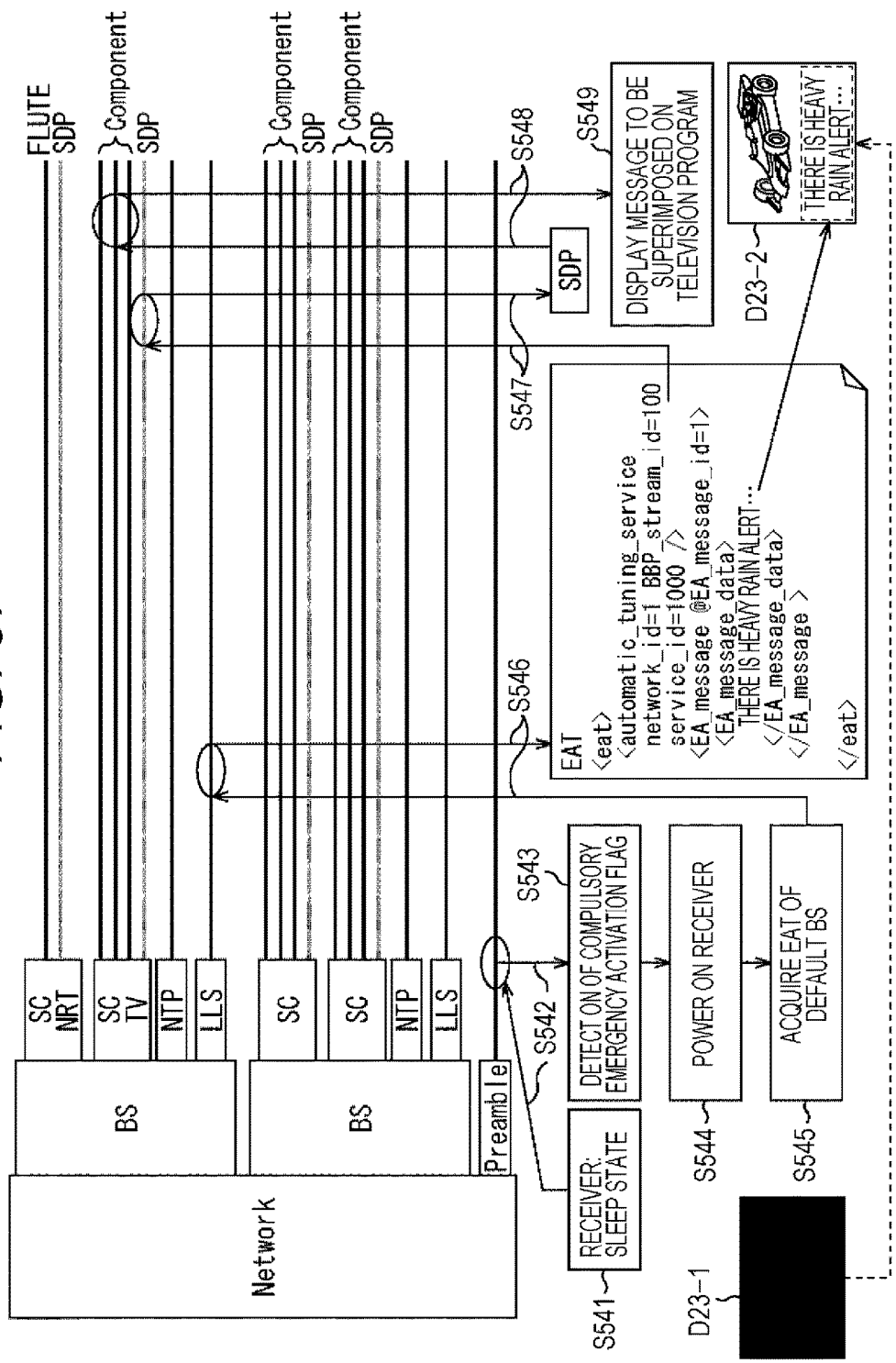
FIG. 57 is a diagram for describing an EA message transmission process in a sleep state.

FIG. 57 is a diagram for describing the EA message transmission process in the receiving device 20 in the sleep state.

As illustrated in FIG. 57, in the broadcast wave of the digital broadcasting using the IP transmission scheme from the transmitting device 10, video data and audio data of television program ("TV" in FIG. 57) are transmitted in a synchronous stream format, and thus an RTP session is used. Further, the emergency information ("NRT" in FIG. 57) for the NRT portal service is transmitted through the FLUTE session. Furthermore, the LLS (the EAT) and the SCS (the SDP) are transmitted in the XML format.

In FIG. 57, the receiving device 20 is in the sleep state (S541). Here, the receiving device 20 in the sleep state consistently monitors the compulsory emergency activation flag included in the preamble signal (S542), and is powered on and activated when the compulsory emergency activation flag is detected to be set to "on" (S543 and S544).

The receiving device 20 acquires the EAT of the XML format from the LLS transmitted from a BS set by default (S545 and S546). As illustrated in FIG. 57, in the EAT, the EAMessageData element appears in the EAMessage element, and the emergency information is transmitted as the EA message. Thus, the receiving device 20 performs the tuning process using the values of the networkId attribute, the bbp-StreamId attribute, and the serviceId attribute of the AutomaticTuningService element of the EAT and the tuning information, and acquires the SDP transmitted through the FLUTE session (S547).

The receiving device 20 acquires the video data and the audio data transmitted through the RTP session according to the SDP (S548), and causes message content ("there is heavy rain alert" of the EAT in FIG. 57) of the EAMessage element of the EAT to be displayed on the display to be superimposed on the television program (S549).

As described above, in the EA message transmission of FIG. 57, the receiving device 20 in the sleep state is activated in an emergency situation. Then, the receiving device 20 acquires the EAT of the XML format transmitted through the LLS, and acquires the message and the component of the television program according to the EAT. As a result, the display compulsorily transitions from a state (a black screen) of D23-1 to a state (a screen on which a subtitle (message) is superimposed on a television program) of D23-2, and thus the subtitle of the emergency information transmitted as the message is displayed. Accordingly, even the user who is not watching a television program can check a subtitle displayed to be compulsorily superimposed on a television program and recognize that the heavy rain alert has been invoked.

(EA Message Transmission Process in Active State)

Figure 58:
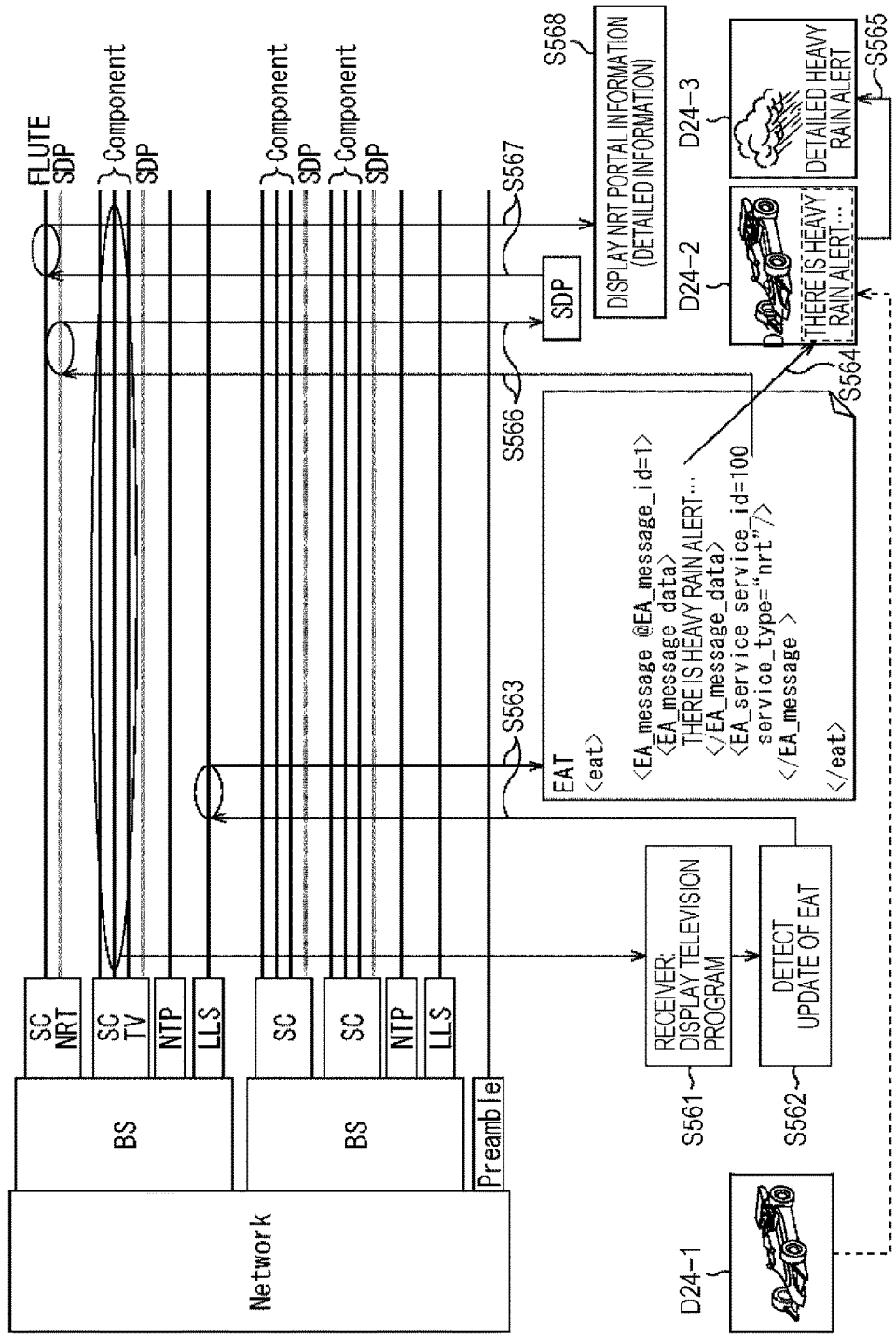
FIG. 58 is a diagram for describing an EA message transmission process in an active state.

FIG. 58 is a diagram for describing the EA message transmission process in the receiving device 20 in the active state.

As illustrated in FIG. 58, in the broadcast wave of the digital broadcasting using the IP transmission scheme from the transmitting device 10, video data and audio data of television program ("TV" in FIG. 58) are transmitted in a synchronous stream format, and thus an RTP session is used. Further, the emergency information ("NRT" in FIG. 58) for the NRT portal service is transmitted through the FLUTE session. Furthermore, the LLS (the EAT) and the SCS (the SDP) are transmitted in the XML format.

In FIG. 58, the receiving device 20 is in the active state and is displaying the television program unlike an operation example of FIG. 57 (S561). Here, the receiving device 20 in the active state consistently monitors the EAT transmitted through the LLS, and acquires the EAT when the EAT is detected to have been updated (S562 and S563). As illustrated in FIG. 58, in the EAT of the XML format, the EAMessageData element appears in the EAMessage element, and thus the emergency information is transmitted as the EA message. Thus, the receiving device 20 causes message content ("there is heavy rain alert" of the EAT in FIG. 58) of the EAMessage element of the EAT to be displayed on the display to be superimposed on the television program being displayed (S564). Accordingly, the user can check a subtitle displayed to be superimposed on a television program and recognize that the heavy rain alert has been invoked.

Here, content of the subtitle represents the fact that the heavy rain alert has been invoked, but does not represent detailed information thereof. Thus, for example, when the user operates a remote controller and gives an instruction to display the detailed information (S565), detailed information of the heavy rain alert is displayed as additional information of the emergency information (S566 to S568).

Specifically, in the EAT of the XML format of FIG. 58, the EAService element appears in the EAMesage element, and "nrt" is designated as the serviceType attribute, and thus the detailed information is transmitted as the NRT portal information of the NRT portal service. Thus, the receiving device 20 performs the tuning process using the value of the serviceId attribute of the EAService element of the EAT and the tuning information, and acquires the SDP transmitted through the FLUTE session (S566). The receiving device 20 acquires the NRT portal information transmitted through the FLUTE session according to the SDP, and causes the detailed information of the acquired emergency information to be displayed on the display (S567 and S568).

As described above, in the EA message transmission of FIG. 58, when the EAT is detected to have been updated, the receiving device 20 being displaying the television program acquires the EAT of the XML format transmitted through the LLS, and acquires the message and the component of the television program according to the EAT. As a result, the display transitions from a state (a screen on which a television program is displayed) of D24-1 to a state (a screen on which a subtitle (message) is superimposed on a television program) of D24-2, and thus the subtitle of the emergency information transmitted as the message is displayed. Accordingly, the user who is watching the television program can check a subtitle displayed to be compulsorily superimposed on a television program and recognize that the heavy rain alert has been invoked.

Further, when the user who has checked the subtitle displayed to be superimposed on the television program desires to know detailed information about the weather, the user performs a certain operation, and thus a screen (a state of D24-3) of the detailed information of the emergency information transmitted as the NRT portal information is displayed. As a result, the user can check the detailed information including information that is hardly expressed by the subtitle and obtain more detailed information about the heavy rain alert.

Further, FIG. 58 has been described in connection with the example in which the detailed information is transmitted as the NRT portal information through the FLUTE session, but, for example, the detailed information may be provided through the web server 70 connected to the Internet 90.

<(4-3) Application Transmission>

Next, the application transmission will be described with reference to FIGS. 59 and 60.

(Application Transmission Process in Sleep State)

Figure 59:
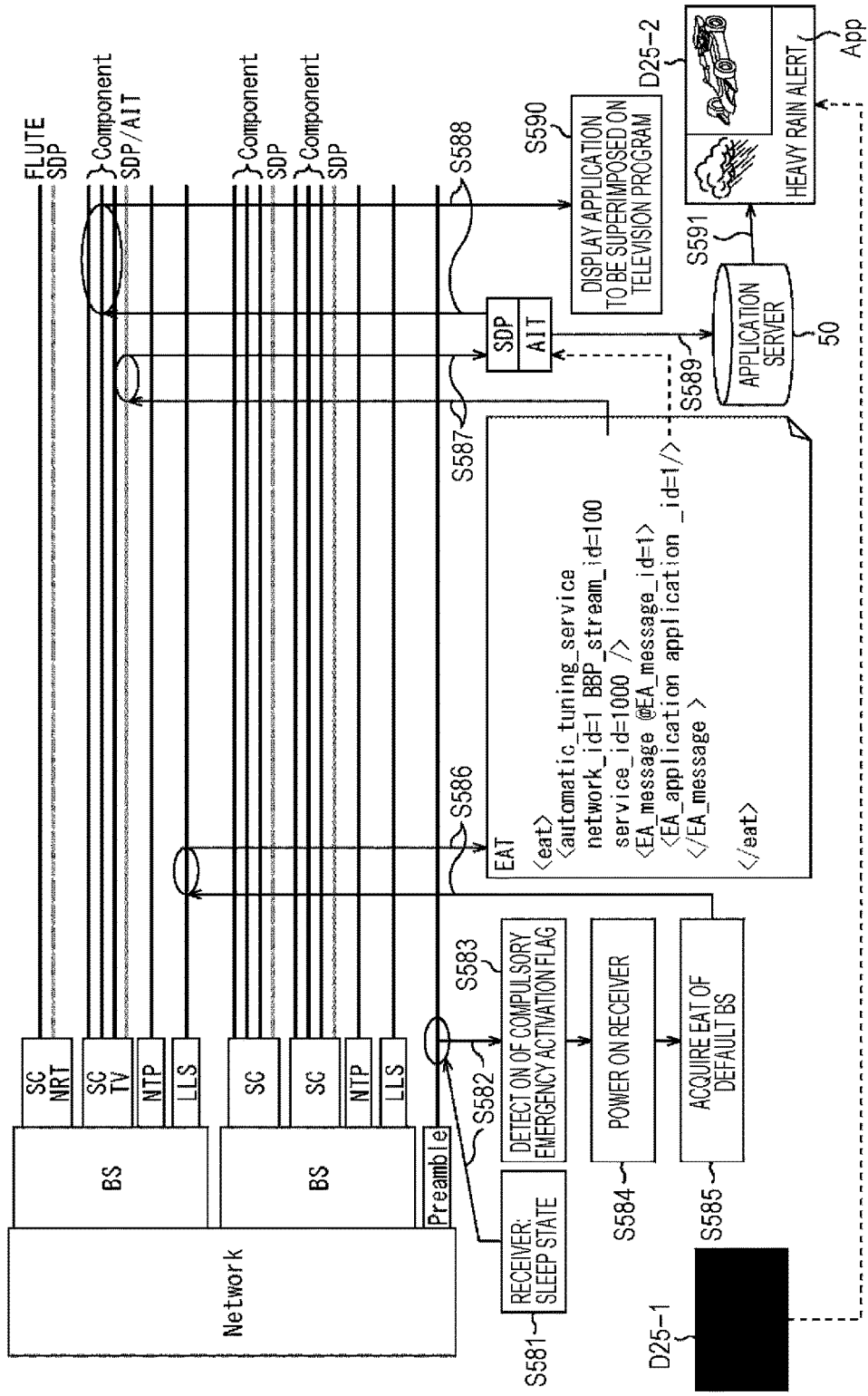
FIG. 59 is a diagram for describing an application transmission process in a sleep state.

FIG. 59 is a diagram for describing the application transmission process in the receiving device 20 in the sleep state.

As illustrated in FIG. 59, the broadcast wave of the digital broadcasting using the IP transmission scheme from the transmitting device 10, video data and audio data of television program ("TV" in FIG. 59) are transmitted in a synchronous stream format, and thus an RTP session is used. Further, the LLS (the EAT) and the SCS (the SDP and the AIT) are transmitted in the XML format. Further, the emergency information ("NRT" in FIG. 59) for the NRT portal service is transmitted through the FLUTE session.

In FIG. 59, the receiving device 20 is in the sleep state (S581). Here, the receiving device 20 in the sleep state consistently monitors the compulsory emergency activation flag included in the preamble signal (S582), and is powered on and activated when the compulsory emergency activation flag is detected to be set to "on" (S583 and S584).

The receiving device 20 acquires the EAT of the XML format from the LLS transmitted through a BS set by default (S585 and S586). As illustrated in FIG. 59, in the EAT, the EAApplication element appears in the EAMessage element, and thus the emergency information is transmitted as the emergency notification application. Thus, the receiving device 20 performs the tuning process the values of the networkId attribute, the bbpStreamId attribute, and the serviceId attribute of the AutomaticTuningService element of the EAT and the tuning information, and acquires the SDP and the AIT transmitted through the FLUTE session (S587).

The receiving device 20 acquires the video data and the audio data transmitted through the RTP session according to the SDP (S588). Further, the receiving device 20 acquires a URL for acquiring an application corresponding to the value of the applicationId attribute of the EAApplication element of the EAT with reference to the AIT, accesses the application server 50 via the Internet 90, and acquires the emergency notification application (S589).

Then, the receiving device 20 causes the emergency notification application acquired from the application server 50 to be displayed on the display to be superimposed on the television program according to the acquired video data and the audio data (S590 and S591).

As described above, in the application transmission process of FIG. 59, the receiving device 20 in the sleep state is activated in an emergency situation. Further, the receiving device 20 acquires the EAT of the XML format transmitted through the LLS, and acquires the component of the television program and the emergency notification application according to the EAT. As a result, the display compulsorily transitions from a state (a black screen) of D25-1 to a state (a screen on which the emergency notification application is superimposed on the television program) of D25-2, and displays the screen of the emergency information transmitted as the emergency notification application. Accordingly, even the user who is not watching a television program can check the emergency notification application displayed to be compulsorily superimposed on the television program and recognize that the heavy rain alert has been invoked.

(Application Transmission Process in Active State)

Figure 60:
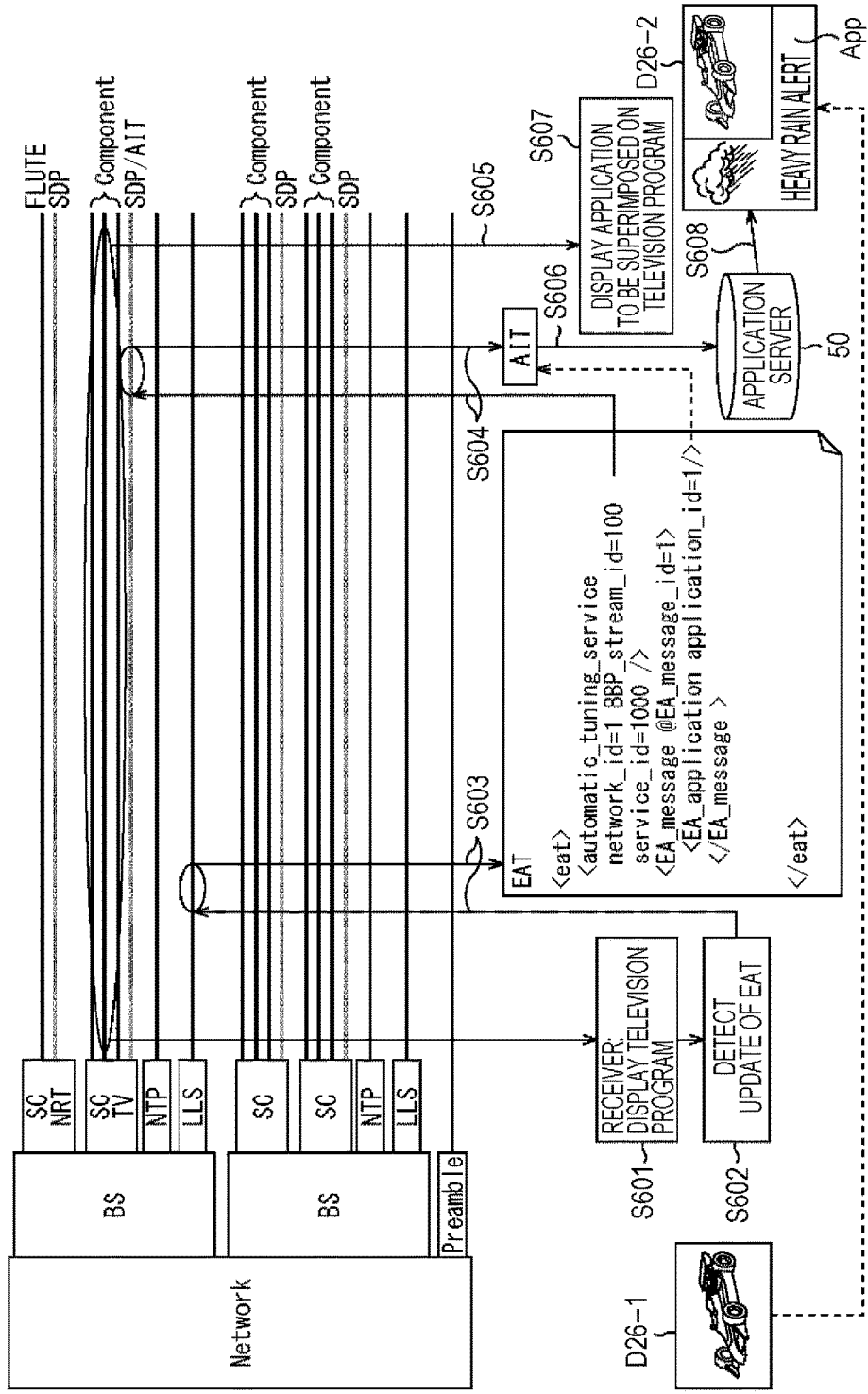
FIG. 60 is a diagram for describing an application transmission process in an active state.

FIG. 60 is a diagram for describing the application transmission process in the receiving device 20 in the active state.

As illustrated in FIG. 60, in the broadcast wave of the digital broadcasting using the IP transmission scheme from the transmitting device 10, video data and audio data of television program ("TV" in FIG. 60) are transmitted in a synchronous stream format, and thus an RTP session is used. Further, the LLS (the EAT) and the SCS (the SDP and the AIT) are transmitted in the XML format. Further, the emergency information ("NRT" in FIG. 60) for the NRT portal service is transmitted through the FLUTE session.

In FIG. 60, the receiving device 20 is in the active state and is displaying the television program unlike an operation example of FIG. 59 (S601). Here, the receiving device 20 in the active state consistently monitors the EAT transmitted through the LLS, and acquires the EAT when the EAT is detected to have been updated (S602 and S603). As illustrated in FIG. 60, in the EAT of the XML format, the EAApplication element appears in the EAMessage element, and thus the emergency information is transmitted as the emergency notification application. Thus, the receiving device 20 performs the tuning process using the values of the networkId attribute, the bbp-StreamId attribute, and the serviceId attribute of the AutomaticTuningService element of the EAT and the tuning information, and acquires the AIT transmitted through the FLUTE session (S604).

The receiving device 20 acquires a URL for acquiring an application corresponding to the value of the applicationId attribute of the EAApplication element of the EAT with reference to the AIT, accesses the application server 50 via the Internet 90, and acquires the emergency notification application (S606). Then, the receiving device 20 causes the emergency notification application acquired from the application server 50 to be displayed on the display to be superimposed on the television program being displayed (S605, S607, and S608).

As described above, in the application transmission process of FIG. 60, when the EAT is detected to have been updated, the receiving device 20 being displaying the television program acquires the EAT of the XML format transmitted through the LLS, and acquires the emergency notification application according to the EAT. As a result, the display compulsorily transitions from a state (a screen on which a television program is displayed) of D26-1 to a state (a screen on which the emergency notification application is superimposed on the television program) of D26-2, and displays the screen of the emergency information transmitted as the application. Accordingly, the user who is watching the television program can check the application displayed to be superimposed on the television program in the letter L shape and recognize that the heavy rain alert has been invoked.

Further, in order to activate the emergency notification application when another application is in the active state, the emergency notification application is activated after ending another application in the active state.

<(4-4) Shared Component Service Transmission>

Next, the shared component service transmission will be described with reference to FIG. 61.

(Shared Component Service Transmission Process in Active State)

Figure 61:
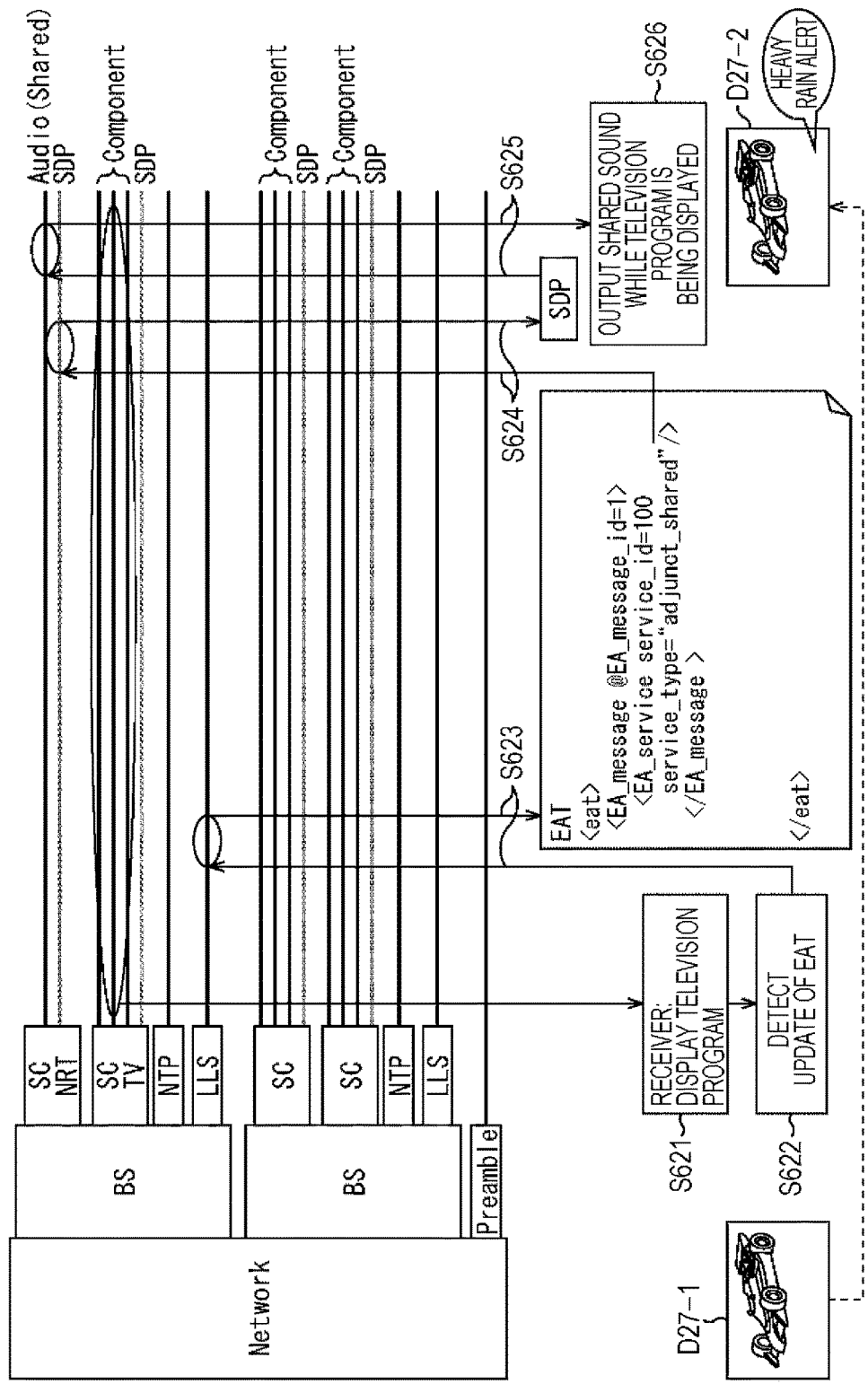
FIG. 61 is a diagram for describing a shared component service transmission process.

FIG. 61 is a diagram for describing the shared component service transmission process.

As illustrated in FIG. 61, in the broadcast wave of the digital broadcasting using the IP transmission scheme from the transmitting device 10, the IP transmission scheme from the transmitting device 10, video data and audio data of a television program ("TV" in FIG. 61) is transmitted in a synchronous stream format, and thus an RTP session is used. Further, shared audio data for emergency notification is transmitted through an RTP session. Furthermore, the LLS (the EAT) and the SCS (the SDP) are transmitted in the XML format.

In FIG. 61, the receiving device 20 is in the active state and is displaying the television program (S621). Here, the receiving device 20 in the active state consistently monitors the EAT transmitted through the LLS, and acquires the EAT when the EAT is detected to have been updated (S622 and S623). As illustrated in FIG. 61, in the EAT of the XML format, the EAService element appears in the EAMessage element, and "adjunct shared" is designated as the serviceType attribute, and thus the emergency information is transmitted through a shared component service.

In other words, in the operation example of FIG. 61, since shared audio data for emergency notification is provided as the emergency information, the receiving device 20 performs the tuning process using the value of the serviceId attribute of the EAService element of the EAT and the tuning information, and acquires the SDP transmitted through the FLUTE session (S624). The receiving device 20 acquires the shared audio data for emergency notification transmitted through the RTP session according to the SDP, and outputs a shared sound of the emergency information while the television program is being displayed (S625 and S626). Here, for example, while the television program is being displayed, only a sound is switched, and a sound such as "heavy rain alert" is output as a sub sound.

As described above, in the application transmission process of FIG. 61, when the EAT is detected to have been updated, the receiving device 20 being displaying the television program acquires the EAT of the XML format transmitted through the LLS, and acquires the shared audio data for emergency notification according to the EAT. As a result, even when transition from a state of D27-1 to a state of D27-2 is performed, the display continuously displays the television program, and only a sound is switched so that a sound such as "heavy rain alert" is output as the emergency information. Accordingly, the user who is watching the television program can check the sound of the emergency information and recognize that the heavy rain alert has been invoked while continuously watching the television program.

Further, the detailed content of the shared component service has been described above with reference to FIG. 33, and a repeated description is herein omitted.

<(5) Content of Concrete Process Executed in Each Device>

Next, content of the concrete processes executed by the devices configuring the broadcasting system 1 of FIG. 20 will be described with reference to FIGS. 62 to 66. Here, the transmission process executed by the transmitting device 10 and the reception process executed by the receiving device 20 are identical to the transmission process of FIG. 34 and the reception process of FIG. 35, and thus a description thereof is omitted.

(Emergency Notification Process)

The emergency notification process executed by the receiving device 20 of FIG. 53 will be described with reference to a flowchart of FIG. 62. The emergency notification process is executed to notify the emergency information such as the heavy rain alert when the receiving device 20 is in the sleep state, the active state, or the like.

In steps S701 to S703, similarly to steps S341 to S343 of FIG. 36, the receiving device 20 in the sleep state is powered on when the compulsory emergency activation flag is detected to be set to "on."

In step S704, the emergency notification control unit 224 acquires the EAT of the XML format transmitted through the LLS. The EAT is considered to be acquired, for example, directly after the receiving device 20 in the sleep state is powered on, when the compulsory emergency activation flag is detected to be set to "on," when the EAT is updated, or the like.

In step S705, the emergency notification control unit 224 analyzes the EAT of the XML format acquired in the process of step S704.

In step S706, the emergency notification control unit 224 determines whether or not the EAService element appears in the EAT and "nrt" is designated as the serviceType attribute based on the analysis process result of step S705. When it is determined in step S706 that the element appearance requirement is satisfied, the process proceeds to step S707.

In step S707, the emergency notification control unit 224 executes the NRT portal service transmission process. The NRT portal service transmission process corresponds to the operation example illustrated in FIGS. 55 and 56, and content of a detailed process thereof which will be described later with reference to a flowchart of FIG. 63.

Further, when it is determined in step S706 that the element appearance requirement is not satisfied, the process proceeds to step S708. In step S708, the emergency notification control unit 224 determines whether or not the EAMessageData element appears in the EAT based on the analysis process result of step S705. When it is determined in step S708 that the element appearance requirement is satisfied, the process proceeds to step S709.

In step S709, the emergency notification control unit 224 executes the EA message transmission process. The EA message transmission process corresponds to the operation example illustrated in FIGS. 57 and 58, and content of a detailed process thereof which will be described later with reference to a flowchart of FIG. 64.

Further, when it is determined in step S708 that the element appearance requirement is not satisfied, the process proceeds to step S710. In step S710, the emergency notification control unit 224 determines whether or not the EAApplication element appears in the EAT based on the analysis process result of step S705. When it is determined in step S710 that the element appearance requirement is satisfied, the process proceeds to step S711.

In step S711, the emergency notification control unit 224 executes the application transmission process. The application transmission process corresponds to the operation example illustrated in FIGS. 59 and 60, and content of a detailed process thereof which will be described later with reference to a flowchart of FIG. 65.

Further, when it is determined in step S710 that the element appearance requirement is not satisfied, the process proceeds to step S712. In step S712, the emergency notification control unit 224 determines whether or not the EAService element appears in the EAT and "adjunct_shared" is designated as the serviceType attribute based on the analysis process result of step S705. When it is determined in step S712 that the element appearance requirement is satisfied, the process proceeds to step S713.

In step S713, the emergency notification control unit 224 executes the shared component service transmission process. The shared component service transmission process corresponds to the operation example illustrated in FIG. 61, and content of a detailed process thereof which will be described later with reference to a flowchart of FIG. 66.

Further, when it is determined in step S712 that the element appearance requirement is not satisfied, the process proceeds to step S714. In step S714, for example, the stream transmission process or the like is executed according to the analysis process result of step S705.

When any one of steps S707, S709, S711, S713, and S714 ends, the emergency notification process ends.

The emergency notification process has been described so far.

(NRT Portal Service Transmission Process)

Next, the NRT portal service transmission process corresponding to step S707 of FIG. 62 will be described with reference to a flowchart of FIG. 63.

In step S721, the control signal processing unit 222 acquires the SDP based on the EAT according to control of the emergency notification control unit 224.

In step S722, the FLUTE processing unit 220 acquires the NRT portal information (the emergency information) transmitted through the FLUTE session based on the SDP received from the control signal processing unit 222 according to control of the emergency notification control unit 224.

In step S723, the browser 226 causes the NRT portal information (the emergency information) received from the FLUTE processing unit 220 to be displayed on the display through the video output unit 216 according to control of the emergency notification control unit 224. As a result, the emergency information of the heavy rain alert or the like is displayed on the display.

Figure 62:
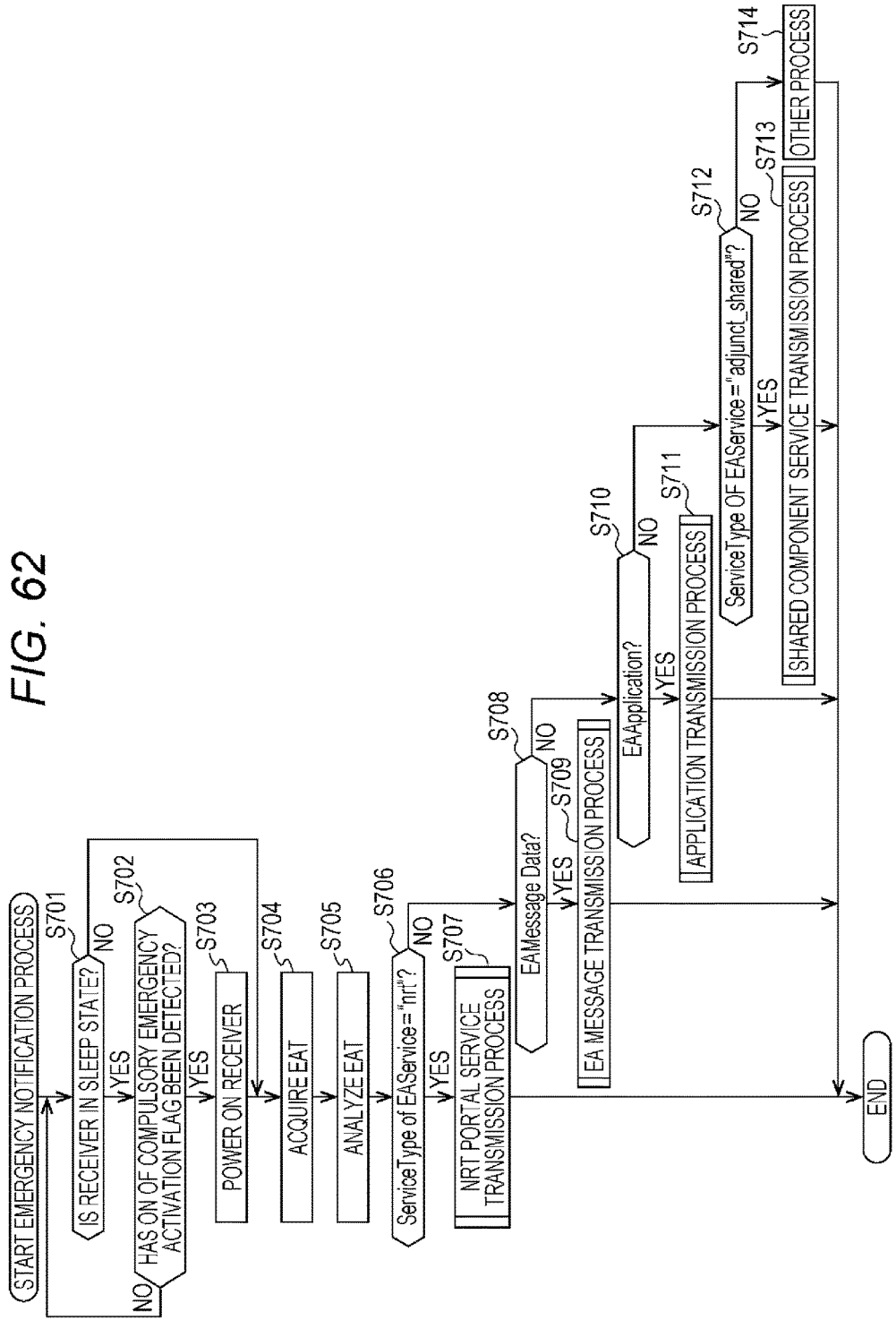
FIG. 62 is a flowchart for describing an emergency notification process.
Figure 63:
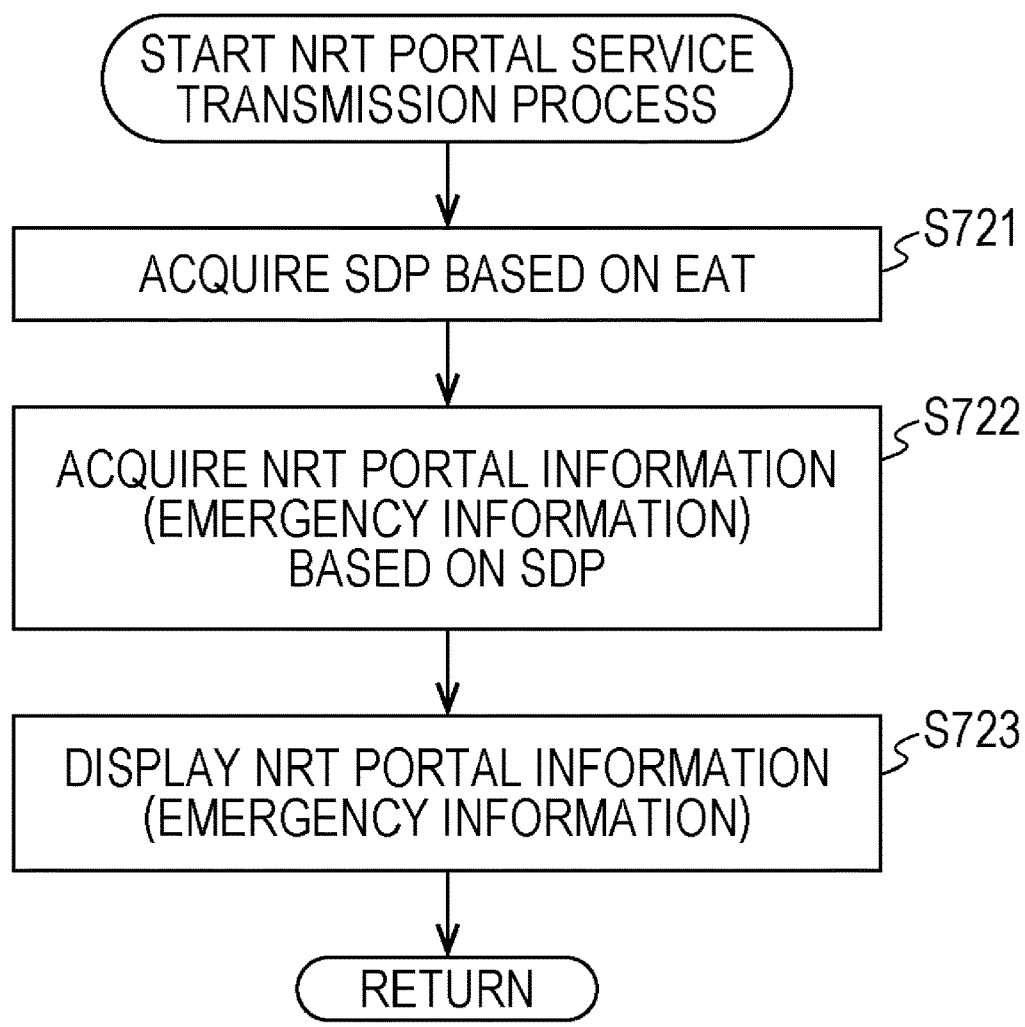
FIG. 63 is a flowchart for describing an NRT portal service transmission process.

When the process of step S723 ends, the process returns to step S707 of FIG. 62, and the process subsequent thereto is executed.

The NRT portal service transmission process has been described so far.

(EA Message Transmission Process)

Figure 64:
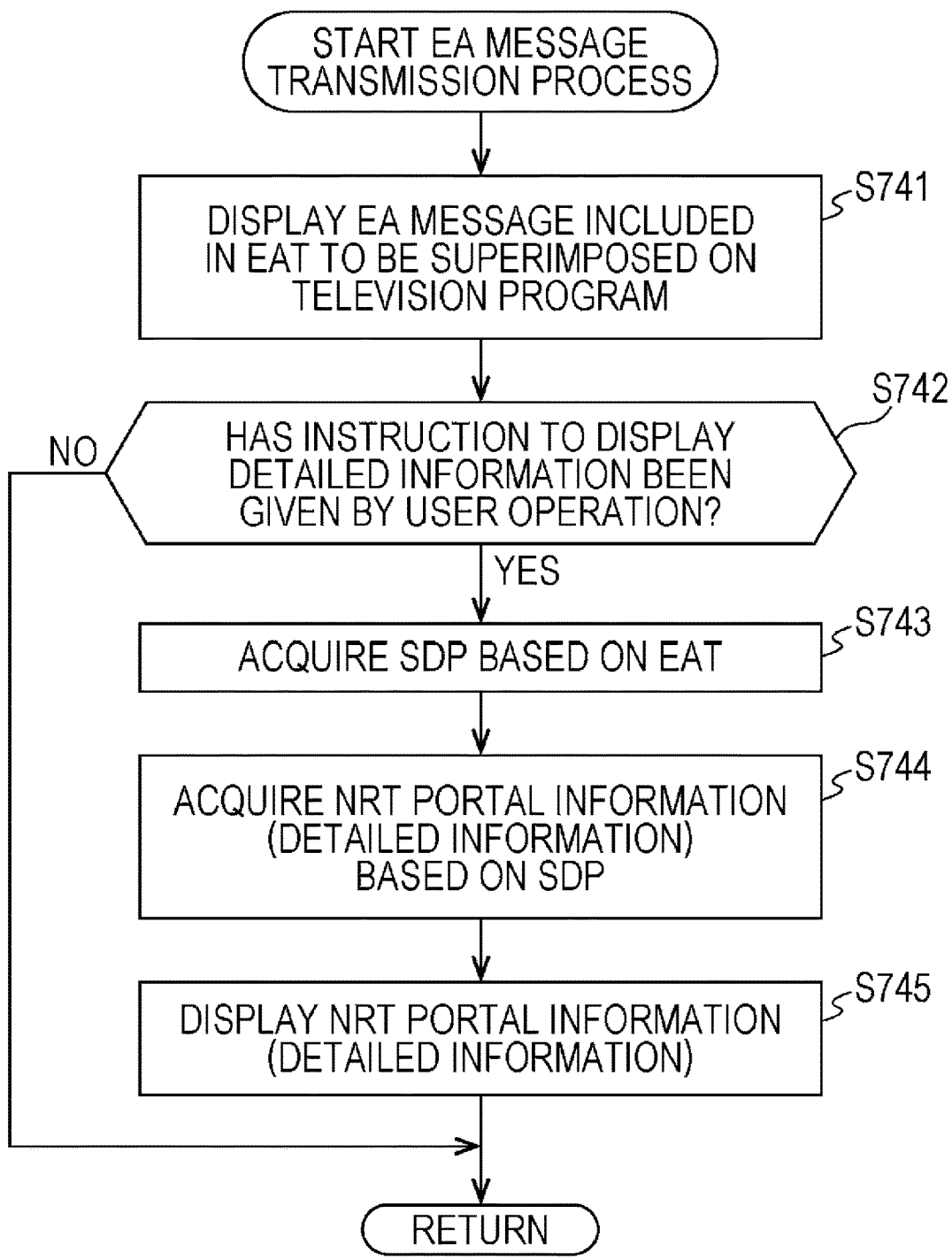
FIG. 64 is a flowchart for describing an EA message transmission process.

Next, the EA message transmission process corresponding to step S709 of FIG. 62 will be described with reference to a flowchart of FIG. 64. Here, when the receiving device 20 is in the sleep state, the power is turned on, but the tuning process of turning to a service designated by the triplet of the AutomaticTuningService element of the EAT is assumed to be performed.

In step S741, the emergency notification control unit 224 causes the EA message included in the EAT to be displayed on the display to be superimposed on the television program through the video output unit 216. As a result, the subtitle (the emergency information) of the heavy rain alert or the like is displayed to be superimposed on the television program.

In step S742, it is determined whether or not an instruction to display the detailed information has been given by the remote controller operated by the user. When the instruction to display the detailed information is determined to have been given in step S742, the process proceeds to step S743.

In step S743, the control signal processing unit 222 acquires the SDP based on the EAT according to control of the emergency notification control unit 224.

In step S744, the FLUTE processing unit 220 acquires the NRT portal information (the detailed information) transmitted through the FLUTE session based on the SDP received from the control signal processing unit 222 according to control of the emergency notification control unit 224.

In step S745, the browser 226 causes the NRT portal information (the detailed information) received from the FLUTE processing unit 220 to be displayed on the display through the video output unit 216 according to control of the emergency notification control unit 224. As a result, the detailed information of the heavy rain alert or the like is displayed on the display the additional information of the emergency information.

Further, when the instruction to display the detailed information is determined to have not been given in step S742, the process of step S743 to S745 is skipped. Then, when the process of step S745 ends, the process returns to step S709 of FIG. 62, and the process subsequent thereto is executed.

The EA message transmission process has been described so far.

(Application Transmission Process)

Figure 65:
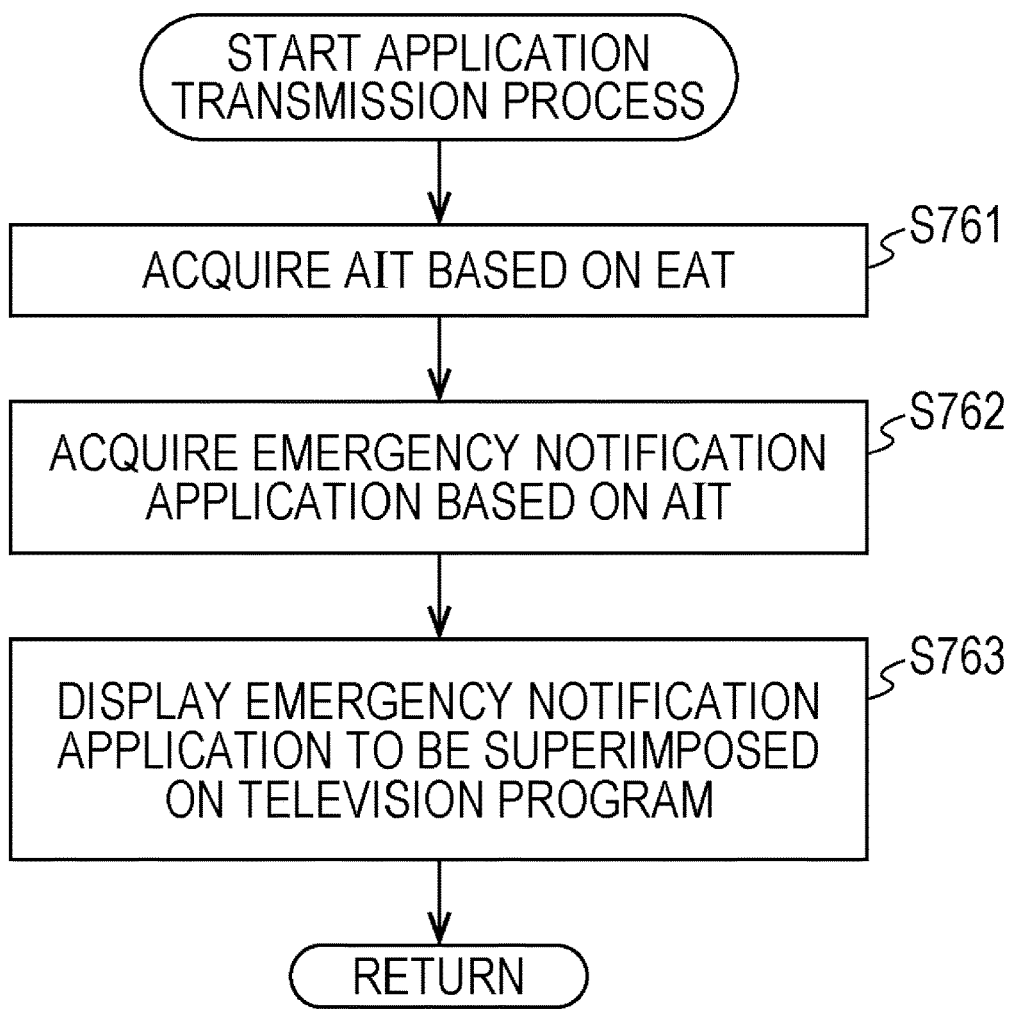
FIG. 65 is a flowchart for describing an application transmission process.

Next, the application transmission process corresponding to step S711 of FIG. 62 will be described with reference to a flowchart of FIG. 65. Here, when the receiving device 20 is in the sleep state, the power is turned on, but the tuning process of turning to a service designated by the triplet of the AutomaticTuningService element of the EAT is assumed to be performed.

In step S761, the control signal processing unit 222 acquires the AIT based on the EAT according to control of the emergency notification control unit 224. Further, the emergency notification control unit 224 acquires a URL for acquiring the emergency notification application corresponding to the value of the applicationId attribute of the EAApplication element of the EAT with reference to the AIT.

In step S762, the communication I/F 225 accesses the application server 50 via the Internet 90 based on the URL for acquiring the emergency notification application according to control of the emergency notification control unit 224, and acquires the emergency notification application.

In step S763, the browser 226 causes the emergency notification application received from the communication I/F 225 to be displayed on the display to be superimposed on the television program through the video output unit 216 according to control of the emergency notification control unit 224. As a result, the emergency information such as the heavy rain alert is displayed in the letter L shape in the television program.

When the process of step S763 ends, the process returns to step S711 of FIG. 62, and the process subsequent thereto is executed.

The application transmission process has been described so far.

(Shared Component Service Transmission Process)

Figure 66:
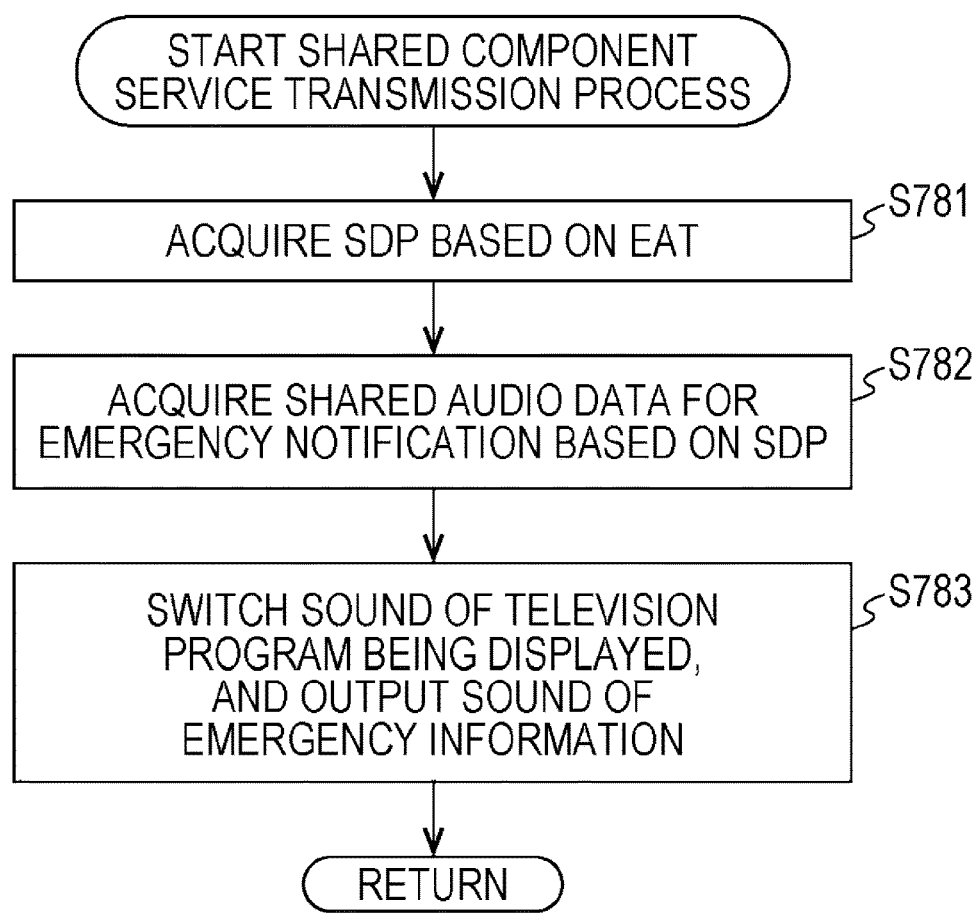
FIG. 66 is a flowchart for describing a shared component service transmission process.

Next, the shared component service transmission process corresponding to step S713 of FIG. 62 will be described with reference to a flowchart of FIG. 66. Here, the emergency information is assumed to be provided as shared audio data for an emergency alert.

In step S781, the control signal processing unit 222 acquires the SDP based on the EAT according to control of the emergency notification control unit 224.

In step S782, the audio decoder 217 acquires shared audio data for emergency notification rom the Demux 213 based on the SDP according to control of the emergency notification control unit 224. Further, the audio decoder 217 decodes the shared audio data for emergency notification according to control of the emergency notification control unit 224, and provides the decoded shared audio data for emergency notification to the audio output unit 218.

In step S783, the audio output unit 218 performs switching from the sound of the television program to the shared audio data for emergency notification according to control of the emergency notification control unit 224, and outputs the sound of the emergency information through the speaker. As a result, for example, while the television program is being displayed, only the sound is switched, and a sound such as "heavy rain alert" is output.

When the process of step S783 ends, the process returns to step S714 of FIG. 62, and the process subsequent thereto is executed.

The shared component service transmission process has been described so far.

<Explanation of Computer According to Present Technology>

The above-described series of processes may be executed by hardware or may be executed by software. When the series of processes are executed by software, a program configuring the software is installed in a computer. Here, examples of the computer include a computer incorporated in dedicated hardware or a general-purpose personal computer (PC) capable of executing various kinds of functions using various kinds of programs installed therein.

FIG. 67 is a block diagram illustrating an exemplary hardware configuration of a computer that executes the above-described series of processes through a program.

In a computer 900, a central processing unit (CPU) 901, read only memory (ROM) 902, and random access memory (RAM) 903 are connected with one another via a bus 904. An input/output (I/O) interface 905 is further connected to the bus 904. An input unit 906, an output unit 907, a recording unit 908, a communication unit 909, and a drive 910 are connected to the I/O interface 905.

The input unit 906 includes a keyboard, a mouse, a microphone, or the like. The output unit 907 includes a display, a speaker, or the like. The recording unit 908 includes a hard disk, non-volatile memory, or the like. The communication unit 909 includes a network interface or the like. The drive 910 drives a removable medium 911 such as a magnetic disk, an optical disk, a magneto optical disk, or a semiconductor memory.

In the computer 900 having the above configuration, the CPU 901, for example, as a program recorded in the recording unit 908 is loaded onto the RAM 903 via the I/O interface 905 and the bus 904 and executed, the above-described series of processes are performed.

The program executed by the computer 900 (the CPU 901) may be recorded in the removable medium 911 as a package medium and provided. The program may be provided via a wired or wireless transmission medium such as a local area network (LAN), the Internet, or digital satellite broadcasting.

In the computer 900, the removable medium 911 may be mounted in the drive 910, and then the program may be installed in the recording unit 908 through the I/O interface 905. Further, the program may be received through the communication unit 909 via a wired or wireless transmission medium and then installed in the recording unit 908. Furthermore, the program may be installed in the ROM 902 or the recording unit 908 in advance.

Further, the program executed by the computer 900 may be a program in which processes are chronologically performed according to the order described in this disclosure or a program in which processes are performed in parallel or according to a necessary timing when called.

Here, in this disclosure, processing steps of describing the program causing the computer 900 to execute various kinds of processes need not be necessarily chronologically performed according to the order described as a flowchart, and include processes (for example, a parallel process or a process by an object) that are executed in parallel or individually.

Further, the program may be processed by a single or may be distributedly processed by a plurality of computers. Furthermore, the program may be transferred and executed by a computer at a remote site.

In addition, in this disclosure, a system means a set of two or more configuration elements (devices, modulates (parts), or the like) regardless of whether or not all configuration elements are arranged in a single housing. Thus, both a plurality of devices that are accommodated in separate housings and connected via a network and a single device in which a plurality of modules are accommodated in a single housing are systems.

Further, an embodiment of the present technology is not limited to the above embodiments, and various changes can be made within the scope not departing from the gist of the present technology. For example, the present technology may have a configuration of cloud computing in which a plurality of devices via a network share and process a one function together.

Further, the steps described in the above flowcharts may be executed by a single device or may be shared and executed by a plurality of devices. Furthermore, when a plurality of processes are included in a single step, the plurality of processes included in the single step may be executed by a single device or may be shared and executed by a plurality of devices.

Further, the present technology may have the following configurations.

(1)

A receiving device, including circuitry configured to:

receive a digital broadcast signal including an Internet protocol (IP) transport stream; and control operations of modules corresponding to an emergency notification service based on emergency notification control information transmitted through the digital broadcast signal.

(2)

The receiving device according to (1), wherein the circuitry is configured to provide a notification of emergency information using at least one of video and a sound.

(3)

The receiving device according to (1) or (2), wherein the emergency notification control information includes information related to an emergency notification application, and the circuitry is configured to acquire the application based on the emergency notification control information, and execute the application while AV content is output for display to a user.

(4)

The receiving device according to (3), wherein the emergency notification control information includes identification information of the application, and the circuitry is configured to acquire the application based on the identification information of the application and application control information for controlling the application.

(5)

The receiving device according to (2), wherein the emergency notification control information includes information related to an emergency notification component, and the circuitry is configured to acquire the emergency notification component of the at least one of the video and the sound based on the emergency notification control information, and switch the at least one of the video and the sound of the AV content.

(6)

The receiving device according to (5), wherein the emergency notification component is shared by a plurality of services.

(7)

The receiving device according to (1) or (2), wherein the emergency notification control information is filtered according to a certain filtering condition that is set in advance.

(8)

The receiving device according to (7), wherein the emergency notification control information is filtered according to an emergency degree.

(9)

The receiving device according to (7) or (8), wherein the emergency notification control information is filtered according to a target area.

(10)

The receiving device according to any one of (7) to (9), wherein the emergency notification control information is filtered in units of certain areas.

(11)

The receiving device according to any one of (7) to (10), wherein the emergency notification control information is filtered according to a type.

(12)

The receiving device according to any one of (1) to (11), wherein compulsory emergency activation information is transmittable through the digital broadcast signal, and when the receiving device is in a sleep state and the compulsory emergency activation information is detected, the receiving device is powered on.

(13)

The receiving device according to any one of (1) to (12), wherein the emergency notification control information is transmitted in an XML format.

(14)

The receiving device according to any one of (1) to (12), wherein the emergency notification control information is transmitted in a section format.

(15)

The receiving device according to any one of (1) to (14), wherein the emergency notification control information is used in a first layer that is higher than an IP layer of a protocol used to transmit the digital broadcast signal.

(16)

The receiving device according to (15), wherein the digital broadcast signal is used in the first layer, and used to transmit tuning control information, and the tuning control information includes at least network identification information, stream identification information, and service identification information.

(17)

The receiving device according to (16), wherein the digital broadcast signal is used in a second layer that is higher than the IP layer, and used to transmit component control information including at least information related to a component configuring a certain service.

(18)

A receiving method of a receiving device, including:

receiving, by circuitry of the receiving device, a digital broadcast signal including an IP transport stream; and controlling, by the circuitry of the receiving device, operations of modules corresponding to an emergency notification service based on emergency notification control information transmitted through the digital broadcast signal.

(19)

A transmitting device, including circuitry configured to:

acquire emergency notification control information; and transmit the emergency notification control information through a digital broadcast signal including an IP transport stream.

(20)

A transmitting method of a transmitting device, including:

acquiring, by circuitry of the transmitting device, emergency notification control information; and transmitting, by the circuitry of the transmitting device, the emergency notification control information through a digital broadcast signal including an IP transport stream.

(21)

The receiving device according to any one of (1) to (17), wherein the emergency notification control information includes one or a combination of a category code of an emergency alert, a priority of an EAS (emergency alerting system) message when a plurality of EAS messages are included, an enforcement flag that indicates whether or not the EAS message is to be displayed when a compulsory emergency activation flag is set to on, and a transmission scheme type of the EAS message.

(22)

The receiving device according to (22), wherein the emergency notification control information includes an EAS application identifier when the transmission scheme type of the EAS message is of a first predetermined type, and wherein the emergency notification control information includes an EAS shared service type and EAS share service identifier when the transmission scheme type of the EAS message is of a second predetermined type.

It should be understood by those skilled in the art that various modifications, combinations, sub-combinations and alterations may occur depending on design requirements and other factors insofar as they are within the scope of the appended claims or the equivalents thereof.

REFERENCE SINGS LIST

1 Broadcasting system
10 Transmitting device

20 Receiving device
111 Video data acquiring unit
113 Audio data acquiring unit
117 Control signal acquiring unit
119 File data acquiring unit
121 Mux
122 Transmitting unit
212 Tuner
213 Demux
214 Clock generator
215 Video decoder
216 Video output unit
217 Audio decoder
218 Audio output unit
219 Subtitle decoder
220 FLUTE processing unit
221 Storage
222 Control signal processing unit
223 NVRAM
224 Emergency notification control unit
225 Communication I/F
226 Browser
251 GSE filter
252 IP filter
253 UDP filter
254 Section filter bank
255 BBP filter
256 LCT filter
257 SGDU filter bank
900 Computer
901 CPU

The invention claimed is:

1. A receiving device, comprising:
circuitry configured to
receive a digital broadcast signal including an Internet protocol (IP) transport stream;
detect emergency notification control information transmitted through the digital broadcast signal, the emergency notification control information including first information that identifies a shared component of emergency information, and second information that identifies a service which provides the shared component of the emergency information;
acquire the shared component of the emergency information using the second information;
decode the shared component of the emergency information; and
output the decoded shared component of the emergency information.

2. The receiving device according to claim 1, wherein the circuitry is configured to output the decoded shared component of the emergency information using at least one of video and a sound.

3. The receiving device according to claim 2, wherein the emergency notification control information includes information related to an emergency notification application, and
the circuitry is configured to acquire the emergency notification application based on the emergency notification control information, and execute the emergency notification application while AV content is output for display to a user.

4. The receiving device according to claim 3, wherein the emergency notification control information includes identification information of the emergency notification application, and
the circuitry is configured to acquire the emergency notification application based on the identification information of the emergency notification application and application control information for controlling the emergency notification application.

5. The receiving device according to claim 2, wherein
the first information includes one of a first value indicating that the shared component is only the sound, a second value indicating that the shared component is only the video, and a third value indicating that the shared component includes both the sound and the video, and
the circuitry is configured to switch to the shared component.

6. The receiving device according to claim 5, wherein the shared component of the emergency notification is shared by a plurality of services.

7. The receiving device according to claim 2, wherein the emergency notification control information is filtered according to a certain filtering condition that is set in advance.

8. The receiving device according to claim 7, wherein the emergency notification control information is filtered according to an emergency degree.

9. The receiving device according to claim 7, wherein the emergency notification control information is filtered according to a target area.

10. The receiving device according to claim 7, wherein the emergency notification control information is filtered in units of certain areas.

11. The receiving device according to claim 7, wherein the emergency notification control information is filtered according to a type.

12. The receiving device according to claim 1, wherein
compulsory emergency activation information is transmittable through the digital broadcast signal, and
when the receiving device is in a sleep state and the compulsory emergency activation information is detected, the receiving device is powered on.

13. The receiving device according to claim 1, wherein the emergency notification control information is transmitted in an XML format.

14. The receiving device according to claim 1, wherein the emergency notification control information is transmitted in a section format.

15. The receiving device according to claim 1, wherein the emergency notification control information is used in a first layer that is higher than an IP layer of a protocol used to transmit the digital broadcast signal.

16. The receiving device according to claim 15, wherein
the digital broadcast signal is used in the first layer, and used to transmit tuning control information, and
the tuning control information includes at least network identification information, stream identification information, and service identification information.

17. The receiving device according to claim 16, wherein the digital broadcast signal is used in a second layer that is higher than the IP layer, and used to transmit component control information including at least information related to a component configuring a certain service.

18. A receiving method of a receiving device, comprising:
receiving, by circuitry of the receiving device, a digital broadcast signal including an IP transport stream;
detecting, by the circuitry of the receiving device, emergency notification control information transmitted through the digital broadcast signal, the emergency notification control information including first information that identifies a shared component of emergency information, and second information that identifies a service which provides the shared component of the emergency information;

acquiring, by the circuitry of the receiving device, the shared component of the emergency information using the second information;

decoding, by the circuitry of the receiving device, the shared component of the emergency information; and outputting, by the circuitry of the receiving device, the decoded shared component of the emergency information.

19. A transmitting device, comprising:
circuitry configured to
acquire emergency notification control information including first information that identifies a shared component of the notification of emergency information, and second information that identifies a service which provides the shared component of the emergency information; and
transmit the emergency notification control information through a digital broadcast signal including an IP transport stream to a receiving device that is configured to decode and output the shared component of the emergency information.

20. A transmitting method of a transmitting device, comprising:
acquiring, by circuitry of the transmitting device, emergency notification control information including first information that identifies a shared component of the notification of emergency information, and second information that identifies a service which provides the shared component of the emergency information; and
transmitting, by the circuitry of the transmitting device, the emergency notification control information through a digital broadcast signal including an IP transport stream to a receiving device that is configured to decode and output the shared component of the emergency information.

* * * * *